US012277941B2

(12) United States Patent
Bouthéon et al.

(10) Patent No.: US 12,277,941 B2
(45) Date of Patent: Apr. 15, 2025

(54) PARAMETER ENCODING AND DECODING

(71) Applicant: Fraunhofer-Gesellschaft zur Förderung der angewandten Forschung e.V., Munich (DE)

(72) Inventors: Alexandre Bouthéon, Erlangen (DE); Guillaume Fuchs, Erlangen (DE); Markus Multrus, Erlangen (DE); Fabian Küch, Erlangen (DE); Oliver Thiergart, Erlangen (DE); Stefan Bayer, Erlangen (DE); Sascha Disch, Erlangen (DE); Jürgen Herre, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 274 days.

(21) Appl. No.: 17/550,931

(22) Filed: Dec. 14, 2021

(65) Prior Publication Data

US 2022/0108707 A1 Apr. 7, 2022

Related U.S. Application Data

(63) Continuation of application No. PCT/EP2020/066456, filed on Jun. 15, 2020.

(30) Foreign Application Priority Data

Jun. 14, 2019 (EP) .................................... 19180385

(51) Int. Cl.

| | |
|---|---|
| ***G10L 19/008*** | (2013.01) |
| ***G10L 19/08*** | (2013.01) |
| ***H04S 3/02*** | (2006.01) |

(52) U.S. Cl.

CPC ............ *G10L 19/008* (2013.01); *G10L 19/08* (2013.01); *H04S 3/02* (2013.01); *H04S 2400/01* (2013.01); *H04S 2400/03* (2013.01)

(58) Field of Classification Search

CPC ......... G10L 19/008; G10L 19/08; H04S 3/02; H04S 2400/01; H04S 2400/03

See application file for complete search history.

(56) References Cited

U.S. PATENT DOCUMENTS

| | | | |
|---|---|---|---|
| 8,126,152 | B2 | 2/2012 | Taleb |
| 8,155,971 | B2 | 4/2012 | Hellmuth et al. |

(Continued)

FOREIGN PATENT DOCUMENTS

| | | | |
|---|---|---|---|
| CN | 101411214 | A | 4/2009 |
| EP | 3022949 | B1 | 10/2017 |

(Continued)

OTHER PUBLICATIONS

Faller , et al., "Binaural Cue Coding—Part II: Schemes and Applications", IEEE Transactions on Speech and Audio Processing, vol. 11, No. 6, Nov. 2003, pp. 520-531.

(Continued)

*Primary Examiner* — Carolyn R Edwards
*Assistant Examiner* — Kuassi A Ganmavo
(74) *Attorney, Agent, or Firm* — PERKINS COIE LLP; Michael A. Glenn

(57) ABSTRACT

There are disclosed several examples of encoding and decoding technique. In particular, an audio synthesizer for generating a synthesis signal from a downmix signal, includes:

an input interface for receiving the downmix signal, the downmix signal having a number of downmix channels and side information, the side information including channel level and correlation information of an original signal, the original signal having a number of original channels; and (Continued)

a synthesis processor for generating, according to at least one mixing rule, the synthesis signal using:
channel level and correlation information of the original signal; and
covariance information associated with the downmix signal.

34 Claims, 22 Drawing Sheets

(56) References Cited

U.S. PATENT DOCUMENTS

| | | | | |
|---|---|---|---|---|
| 8,804,971 | B1* | 8/2014 | Williams | G10L 19/008 381/23 |
| 9,165,558 | B2 | 10/2015 | Dressler et al. | |
| 9,734,833 | B2 | 8/2017 | Disch et al. | |
| 10,089,990 | B2 | 10/2018 | Disch et al. | |
| 2007/0019813 | A1* | 1/2007 | Hilpert | G06F 12/0815 381/22 |
| 2007/0160218 | A1 | 7/2007 | Jakka et al. | |
| 2007/0203697 | A1* | 8/2007 | Pang | G10L 19/167 704/229 |
| 2007/0223708 | A1 | 9/2007 | Villemoes et al. | |
| 2008/0071549 | A1 | 3/2008 | Chong et al. | |
| 2009/0110203 | A1* | 4/2009 | Taleb | G10L 19/008 381/17 |
| 2009/0171676 | A1 | 7/2009 | Oh et al. | |
| 2010/0241436 | A1* | 9/2010 | Kim | G10L 19/008 704/E21.001 |
| 2012/0230497 | A1 | 9/2012 | Dressler et al. | |
| 2014/0233762 | A1* | 8/2014 | Vilkamo | G10L 19/008 381/119 |
| 2014/0321652 | A1 | 10/2014 | Schuijers | |
| 2015/0221314 | A1 | 8/2015 | Disch et al. | |
| 2015/0279377 | A1* | 10/2015 | Disch | G10L 19/02 381/23 |
| 2016/0133262 | A1* | 5/2016 | Fueg | G10L 19/005 381/22 |
| 2016/0247507 | A1 | 8/2016 | Disch et al. | |
| 2016/0261967 | A1* | 9/2016 | Villemoes | G10L 19/002 |
| 2016/0275958 | A1* | 9/2016 | Dick | H04S 1/007 |
| 2017/0084285 | A1* | 3/2017 | Engdegard | G10L 19/20 |
| 2021/0377685 | A1* | 12/2021 | Laitinen | H04S 3/02 |

FOREIGN PATENT DOCUMENTS

| | | | |
|---|---|---|---|
| RU | 2409912 | C9 | 6/2011 |
| RU | 2646375 | C2 | 3/2018 |
| TW | I395204 | B | 5/2013 |
| TW | 201423729 | A | 6/2014 |
| TW | 201521469 | A | 6/2015 |
| TW | I569260 | B | 2/2017 |
| WO | 2007111568 | A2 | 10/2007 |
| WO | 2014053548 | A1 | 4/2014 |
| WO | 2015011015 | A1 | 1/2015 |
| WO | 2021240053 | A1 | 12/2021 |

OTHER PUBLICATIONS

Hellmuth, O. , et al., "MPEG Spatial Audio Object Coding—The ISO/MPEG Standard for Efficient Coding of Interactive Audio Scenes", O. Hellmuth et al; "MPEG Spatial Audio Object Coding—The ISO/MPEG Standard for Efficient Coding of Interactive Audio Scenes"; in AES; San Francisco, 2010, 19 pp.

Herre, Jurgen , et al., "MPEG Surround—The ISO/MPEG Standard for Efficient and Compatible Multichannel Audio Coding", J. Herre et al; "MPEG Surround—The ISO/MPEG Standard for Efficient and Compatible Multichannel Audio Coding;" Audio English Society, vol. 56; No. 11; 24 pp., 2008, pp. 932-955.

Huffman, David A, "A Method for the Construction of Minimum-Redundancy Codes", D. A. Huffman; "A Method for the Construction of Minimum-Redundancy Codes"; Proceedings of the IRE; vol. 40, No. 9, Sep. 1952, 1098-1101.

ITU-R , "[Part 1 of 4] Multichannel sound technology in home and broadcasting applications", Report ITU-R BS.2159-4; Multichannel sound technology in home and broadcasting applications, BS Series; Broadcasting service (sound); 54 pp., May 2012, pp. 1-13.

ITU-R , "[Part 2 of 4] Multichannel sound technology in home and broadcasting applications", Report ITU-R BS.2159-4; Multichannel sound technology in home and broadcasting applications; BS Series; Broadcasting service (sound); 54 pp., May 2012, pp. 14-26.

ITU-R , "[Part 3 of 4] Multichannel sound technology in home and broadcasting applications", Report ITU-R BS.2159-4; Multichannel sound technology in home and broadcasting applications; BS Series; Broadcasting service (sound); 54 PP., May 2012, pp. 27-38.

ITU-R , "[Part 4 of 4] Multichannel sound technology in home and broadcasting applications", Report ITU-R BS.2159-4; Multichannel sound technology in home and broadcasting applications; BS Series; Broadcasting service (sound); 54 pp., May 2012, pp. 39-54.

Karapetyan, A. , et al., "Active Multichannel Audio Downmix", A. Karapetyan et al; "Active Multichannel Audio Downmix,"; in 145th Audio Engineering Society; New York, 2018, 10 pp.

Mikko-Ville, L. , et al., "Converting 5.1. Audio Recordings to B-Format for Directional Audio Coding Reproduction", L. Mikko-Ville et al; "Converting 5.1. Audio Recordings to B-Format for Directional Audio Coding Reproduction,"; in ICASSP; Prague, 2011, 4 pp.

Neuendorf, M. , et al., "The ISO/MPEG Unified Speech and Audio Coding Standard-Consistent High Quality for All Content Types and at all Bit R", M. Neuendorf et al; "The ISO/MPEG Unified Speech and Audio Coding Standard-Consistent High Quality for All Content Types and at all Bit R"; JAES, NY, USA; vol. 61, No. 12; XP040636948, Dec. 20, 2013, pp. 956-977.

Pulkki, V , "Spatial Sound Reproduction with Directional Audio Coding", Journal of the AES. vol. 55, No. 6. New York, NY, USA., Jun. 2007, pp. 503-516.

Vilkamo, Juha , et al., "Optimized covariance domain framework for time-frequency processing of spatial audio", J. Vilkamo et al; "Optimized Covariance Domain Framework for Time-Frequency Processing of Spatial Audio"; JAES, NY, USA; vol. 61, No. 6; 2013; XP040633057, Jun. 2013, pp. 403-411.

Wikipedia , "Combinatorial Number System", https:/en.wikipedia.org/wiki/Combinatorial number system, Jan. 31, 2022, 6 pp.

Bertrand Fatus. Parametric Coding for Spatial Audio. Master's Thesis, KTH, Stockholm, Sweden. Dec. 2015 (70 pages).

ISO/IEC DIS 23008-3. Information technology—High efficiency coding and media delivery in heterogeneous environments—Part 3: 3D audio. ISO/IEC JTC 1/SC 29/WG 11. Aug. 5, 2014—435 pages) Jul. 25, 2014.

ISO/IEC FDIS 23003-1:2006(E). Information technology—MPEG audio technologies Part 1: MPEG Surround. ISO/IEC JTC 1/SC 29/WG 11. Jul. 21, 2006 (288 pages).

ISO/IEC FDIS 23003-2:2010(E). Information technology—MPEG audio technologies—Part 2: Spatial Audio Object Coding (SAOC). ISO/IEC JTC 1/SC 29/WG 11. Mar. 10, 2010 (142 pages).

* cited by examiner simplified overview of the whole processing detailed overview of encoder overview of decoder modules

PARAMETER ENCODING AND DECODING

CROSS-REFERENCES TO RELATED APPLICATIONS

This application is a continuation of copending International Application No. PCT/EP2020/066456, filed Jun. 15, 2020, which is incorporated herein by reference in its entirety, and additionally claims priority from European Application No. EP 19 180 385.7, filed Jun. 14, 2019, which is incorporated herein by reference in its entirety.

Here there are disclosed several examples of encoding and decoding technique. In particular, an invention for encoding and decoding Multichannel audio content at low bitrates, e.g. using the DirAC framework. This method permits to obtain a high-quality output while using low bitrates. This can be used for many applications, including artistic production, communication and virtual reality.

BACKGROUND OF THE INVENTION

1.1. Known Technology

This section briefly describes the known technology.

1.1.1 Discrete Coding of Multichannel Content

The most straightforward approach to code and transmit multichannel content is to quantify and encode directly the waveforms of multichannel audio signal without any prior processing or assumptions. While this method works perfectly in theory, there is one major drawback which is the bit consumption needed to encode the multichannel content. Hence, the other methods that would be described (as well as the proposed invention) are so-called "parametric approaches", as they use meta-parameters to describe and transmit the multichannel audio signal instead of original audio multichannel signal itself.

1.1.2 MPEG Surround

MPEG Surround is the ISO/MPEG standard finalized in 2006 for the parametric coding of multichannel sound [1]. This method relies mainly on two sets of parameters:

The Interchannel coherences (ICC), which describes the coherence between each and every channels of a given multichannel audio signal.

The Channel Level Difference (CLD), which corresponds to the level difference between two input channels of the multichannel audio signal.

One particularity of MPEG Surround is the use of so-called "tree-structures", those structures allows to "describe two inputs channels by means of a single output channels" (quote from [1]). As an example, below can be found the encoder scheme of a 5.1 multichannel audio signal using MPEG Surround. On this figure, the six input channels (noted "L", "$L_S$", "R", "$R_S$", "C" and "LFE" on the figure) are successively processed through a tree structure element (noted "R_OTT" on the figure). Each of those tree structure element will produce a set of parameters, the ICCs and CLDs previously mentioned) as well as a residual signal that will be processed again through another tree structure and generate another set of parameters. Once the end of the tree is reached, the different parameters previously computed are transmitted to the decoder as well as down-mixed signal. Those elements are used by the decoder to generate an output multichannel signal, the decoder processing is basically the inverse tree structure as used by the encoder.

The main strength of MPEG Surround relies on the use of this structure and of the parameters previously mentioned. However, one of the drawbacks of MPEG Surround is its lack of flexibility due to the tree-structure. Also due to processing specificities, quality degradation might occur on some particular items.

See, inter alia, FIG. 7 showing an overview of an MPEG surround encoder for a 5.1 signal, extracted from [1].

1.2. Directional Audio Coding

Directional Audio Coding (abbreviated "DirAC") [2] is also a parametric method to reproduce spatial audio, it was developed by Ville Pulkki from the university of Aalto in Finland. DirAC relies on a frequency band processing that uses two sets of parameters to describe spatial sounds:

The Direction Of Arrival (DOA); which is an angle in degrees that describes the direction of arrival of the predominant sound in an audio signal.

Diffuseness; which is a value between 0 and 1 that describe how "diffuse" the sound is. If the value is 0, the sound is non-diffuse and can be assimilated as a point-like source coming from a precise angle, if the value is 1, the sound is completely diffuse and is assumed to come from "every" angle.

To synthetize the output signals, DirAC assumes that it is decomposed into a diffuse and non-diffuse part, the diffuse sound synthesis aims at producing the perception of a surrounding sound whereas the direct sound synthesis aims at generating the predominant sound.

Whereas DirAC provides good quality outputs, it has one major drawback: it was not intended for multichannel audio signals. Hence, the DOA and diffuseness parameters are not well-suited to describe a multichannel audio input and as a result, the quality of the output is affected.

1.3. Binaural Cue Coding

Binaural Cue Coding (BCC) [3] is a parametric approach developed by Christof Faller. This method relies on a similar set of parameters as the ones described for MPEG Surround (c.f. 1.1.2) namely:

The Interchannel Level Difference (ICLD); which is a measure of energy ratios between two channels of the multichannel input signal.

The interchannel time difference (ICTD); which is a measure of the delay between two channels of the multichannel input signal.

The interchannel correlation (ICC); which is a measure of the correlation between two channels of the multichannel input signal.

The BCC approach has very similar characteristics in terms of computation of the parameters to transmit compared to the novel invention that will be described later on but it lacks flexibility and scalability of the transmitted parameters.

1.4. MPEG Spatial Audio Object Coding

Spatial Audio Object Coding [4] will be simply mentioned here. It's the MPEG standard for coding so-called Audio Objects, which are related to multichannel signal to a certain extent. It uses similar parameters as MPEG Surround.

1.5 Motivation/Drawbacks of the Known Technology

1.5. Motivations

1.5.1.1 Use the DirAC Framework

One aspect of the invention that has to be mentioned is that the current invention has to fit within the DirAC framework. Nevertheless, it was also mentioned beforehand that the parameters of DirAC are not suitable for a multi-channel audio signal. Some more explanations shall be given on this topic.

The original DirAC processing uses either microphone signals or ambisonics signals. From those signals, parameters are computed, namely the Direction of Arrival (DOA) and the diffuseness.

One first approach that was tried in order to use the DirAC with multichannel audio signals was to convert the multi-channel signals into ambisonics content using a method proposed by Ville Pulkki, described in [5]. Then once those ambisonic signals were derived from the multichannel audio signals, the regular DirAC processing was carried using DOA and diffuseness. The outcome of this first attempt was that the quality and the spatial features of the output multichannel signal were deteriorated and didn't fulfil the requirements of the target application.

Hence, the main motivation behind this novel invention is to use a set of parameters that describes efficiently the multichannel signal and also use the DirAC framework, further explanations will be given in section 1.1.2.

1.5.1.2 Provide a System Operating at Low Bitrates

One of the goals and purpose of the present invention is to propose an approach that allows low-bitrates applications. This entails finding the optimal set of data to describe the multichannel content between the encoder and the decoder. This also entails finding the optimal trade-off in terms of numbers of transmitted parameters and output quality.

1.5.1.3 Provide a Flexible System

Another important goal of the present invention is to propose a flexible system that can accept any multichannel audio format intended to be reproduced on any loudspeaker setup. The output quality should not be damaged depending on the input setup.

1.5.2 Drawbacks of the Known Technology

The known technology previously mentioned as several drawbacks that are listed in the table below.

| Drawback | Known technology concerned | Comment |
| --- | --- | --- |
| Inappropriate bitrates | Discrete Coding of Multichannel Content | The direct coding of multichannel content leads to bitrates that are too high for our requirements and for the targeted applications. |
| Inappropriate parameters/ descriptors | Legacy DirAC | The legacy DirAC method uses diffuseness and DOA as describing parameters, it turns out those parameters are not well-suited to describe a multichannel audio signal |
| Lack of flexibility of the approach | MPEG Surround BCC | MPEG Surround and BCC are not flexible enough regarding the requirements of the targeted applications |

SUMMARY

2. Description of the Invention

2.1 Summary of the Invention

An embodiment may have an audio synthesizer for generating a synthesis signal from a downmix signal, the synthesis signal having a plural number of synthesis channels, wherein the audio synthesizer may have: an input interface configured for receiving the downmix signal, the downmix signal having a plural number of downmix channels and side information, the side information having channel level and correlation information of an original signal, the original signal having a plural number of original channels; and a synthesis processor configured for generating, according to at least one mixing rule in form of a matrix, the synthesis signal using: channel level and correlation information of the original signal; and covariance information of the downmix signal, wherein the audio synthesizer is configured to reconstruct a target version of covariance information of the original signal, wherein the audio synthesizer is configured to reconstruct the target version of the covariance information based on an estimated version of the of the original covariance information, wherein the estimated version of the of the original covariance information is reported to the number of synthesis channels, wherein the audio synthesizer is configured to acquire the estimated version of the original covariance information from covariance information of the downmix signal, wherein the audio synthesizer is configured to acquire the estimated version of the original covariance information by applying, to the covariance information of the downmix signal, an estimating rule which is, or is associated to, a prototype rule for calculating a prototype signal.

Another embodiment may have a method for generating a synthesis signal from a downmix signal, the synthesis signal having a plural number of synthesis channels, wherein the method may have the steps of: receiving a downmix signal, the downmix signal having a plural number of downmix channels, and side information, the side information having: channel level and correlation information of an original signal, the original signal having a plural number of original channels; generating the synthesis signal using the channel level and correlation information of the original signal and covariance information of the downmix signal, the method further having the step of: reconstructing a target version of the covariance information of the original signal based on an estimated version of the of the original covariance information, wherein the estimated version of the of the original covariance information is reported to the number of synthesis channels, wherein the estimated version of the original covariance information is acquired from the covariance information of the downmix signal, wherein the estimated version of the original covariance information is acquired by applying, to the covariance information of the downmix signal, an estimating rule which is, or is associated to, a prototype rule for calculating a prototype signal.

Another embodiment may have a non-transitory digital storage medium having a computer program stored thereon to perform the method for generating a synthesis signal from a downmix signal, the synthesis signal having a plural number of synthesis channels, wherein the method may have the steps of: receiving a downmix signal, the downmix signal having a plural number of downmix channels, and side information, the side information having: channel level and correlation information of an original signal, the original signal having a plural number of original channels; generating the synthesis signal using the channel level and correlation information of the original signal and covariance information of the downmix signal, the method further having the step of: reconstructing a target version of the covariance information of the original signal based on an estimated version of the of the original covariance information, wherein the estimated version of the of the original covariance information is reported to the number of synthesis channels, wherein the estimated version of the original covariance information is acquired from the covariance information of the downmix signal, wherein the estimated version of the original covariance information is acquired by applying, to the covariance information of the downmix signal, an estimating rule which is, or is associated to, a prototype rule for calculating a prototype signal, when said computer program is run by a computer.

In accordance to an aspect, there is provided an audio synthesizer (encoder) for generating a synthesis signal from a downmix signal, the synthesis signal having a number of synthesis channels, the audio synthesizer comprising:

- an input interface configured for receiving the downmix signal, the downmix signal having a number of downmix channels and side information, the side information including channel level and correlation information of an original signal, the original signal having a number of original channels; and
- a synthesis processor configured for generating, according to at least one mixing rule, the synthesis signal using:
  - channel level and correlation information of the original signal; and
  - covariance information associated with the downmix signal.

The audio synthesizer may comprise:

- a prototype signal calculator configured for calculating a prototype signal from the downmix signal, the prototype signal having the number of synthesis channels;
- a mixing rule calculator configured for calculating at least one mixing rule using:
  - the channel level and correlation information of the original signal; and
  - the covariance information associated with the downmix signal;
- wherein the synthesis processor is configured for generating the synthesis signal using the prototype signal and the at least one mixing rule.

The audio synthesizer may be configured to reconstruct a target covariance information of the original signal.

The audio synthesizer may be configured to reconstruct the target covariance information adapted to the number of channels of the synthesis signal.

The audio synthesizer may be configured to reconstruct the covariance information adapted to the number of channels of the synthesis signal by assigning groups of original channels to single synthesis channels, or vice versa, so that the reconstructed target covariance information is reported to the number of channels of the synthesis signal.

The audio synthesizer may be configured to reconstruct the covariance information adapted to the number of channels of the synthesis signal by generating the target covariance information for the number of original channels and subsequently applying a downmixing rule or upmixing rule and energy compensation to arrive at the target covariance for the synthesis channels.

The audio synthesizer may be configured to reconstruct the target version of the covariance information based on an estimated version of the of the original covariance information, wherein the estimated version of the of the original covariance information is reported to the number of synthesis channels or to the number of original channels.

The audio synthesizer may be configured to obtain the estimated version of the of the original covariance information from covariance information associated with the downmix signal.

The audio synthesizer may be configured to obtain the estimated version of the of the original covariance information by applying, to the covariance information associated with the downmix signal, an estimating rule associated to a prototype rule for calculating the prototype signal.

The audio synthesizer may be configured to normalize, for at least one couple of channels, the estimated version ($\widehat{C_y}$) of the of the original covariance information ($C_y$) onto the square roots of the levels of the channels of the couple of channels.

The audio synthesizer may be configured to construe a matrix with normalized estimated version of the of the original covariance information.

The audio synthesizer may be configured to complete the matrix by inserting entries obtained in the side information of the bitstream.

The audio synthesizer may be configured to denormalize the matrix by scaling the estimated version of the of the original covariance information by the square root of the levels of the channels forming the couple of channels.

The audio synthesizer may be configured to retrieve, among the side information of the downmix signal, the audio synthesizer being further configured to reconstruct the target version of the covariance information by both an estimated version of the of the original channel level and correlation information from both:

- covariance information for at least one first channel or couple of channels; and
- channel level and correlation information for at least one second channel or couple of channels.

The audio synthesizer may be configured to use the channel level and correlation information describing the channel or couple of channels as obtained from the side information of the bitstream rather than the covariance information as reconstructed from the downmix signal for the same channel or couple of channels.

The reconstructed target version of the original covariance information may be understood as describing an energy relationship between a couple of channels is based, at least partially, on levels associated to each channel of the couple of channels.

The audio synthesizer may be configured to obtain a frequency domain, FD, version of the downmix signal, the FD version of the downmix signal being into bands or groups of bands, wherein different channel level and correlation information are associated to different bands or groups of bands, wherein the audio synthesizer is configured to operate differently for different bands or groups of bands, to obtain different mixing rules for different bands or groups of bands.

The downmix signal is divided into slots, wherein different channel level and correlation information are associated to different slots, and the audio synthesizer is configured to operate differently for different slots, to obtain different mixing rules for different slots.

The downmix signal is divided into frames and each frame is divided into slots, wherein the audio synthesizer is configured to, when the presence and the position of the transient in one frame is signalled as being in one transient slot:

associate the current channel level and correlation information to the transient slot and/or to the slots subsequent to the frame's transient slot; and associate, to the frame's slot preceding the transient slot, the channel level and correlation information of the preceding slot.

The audio synthesizer may be configured to choose a prototype rule configured for calculating a prototype signal on the basis of the number of synthesis channels.

The audio synthesizer may be configured to choose the prototype rule among a plurality of prestored prototype rules.

The audio synthesizer may be configured to define a prototype rule on the basis of a manual selection.

The prototype rule may be based or include a matrix with a first dimension and a second dimension, wherein the first dimension is associated with the number of downmix channels, and the second dimension is associated with the number of synthesis channels.

The audio synthesizer may be configured to operate at a bitrate equal or lower than 160 kbit/s.

The audio synthesizer may further comprise an entropy decoder for obtaining the downmix signal with the side information.

The audio synthesizer further comprises a decorrelation module to reduce the amount of correlation between different channels.

The prototype signal may be directly provided to the synthesis processor without performing decorrelation.

At least one of the channel level and correlation information of the original signal, the at least one mixing rule and the covariance information associated with the downmix signal s in the form of a matrix.

The side information includes an identification of the original channels;

wherein the audio synthesizer may be further configured for calculating the at least one mixing rule using at least one of the channel level and correlation information of the original signal, a covariance information associated with the downmix signal, the identification of the original channels, and an identification of the synthesis channels.

The audio synthesizer may be configured to calculate at least one mixing rule by singular value decomposition, SVD.

The downmix signal may be divided into frames, the audio synthesizer being configured to smooth a received parameter, or an estimated or reconstructed value, or a mixing matrix, using a linear combination with a parameter, or an estimated or reconstructed value, or a mixing matrix, obtained for a preceding frame.

The audio synthesizer may be configured to, when the presence and/or the position of a transient in one frame is signalled, to deactivate the smoothing of the received parameter, or estimated or reconstructed value, or mixing matrix.

The downmix signal may be divided into frames and the frames are divided into slots, wherein the channel level and correlation information of the original signal is obtained from the side information of the bitstream in a frame-by-frame fashion, the audio synthesizer being configured to use, for a current frame, a mixing matrix (or mixing rule) obtained by scaling, the mixing matrix (or mixing rule), as calculated for the present frame, by an coefficient increasing along the subsequent slots of the current frame, and by adding the mixing matrix (or mixing rule) used for the preceding frame in a version scaled by a decreasing coefficient along the subsequent slots of the current frame.

The number of synthesis channels may be greater than the number of original channels. The number of synthesis channels may be smaller than the number of original channels. The number of synthesis channels and the number of original channels may be greater than the number of downmix channels.

At least one or all the number of synthesis channels, the number of original channels, and the number of downmix channels is a plural number.

The at least one mixing rule may include a first mixing matrix and a second mixing matrix, the audio synthesizer comprising:

a first path including:

a first mixing matrix block configured for synthesizing a first component of the synthesis signal according to the first mixing matrix calculated from:

a covariance matrix associated to the synthesis signal, the covariance matrix being reconstructed from the channel level and correlation information; and a covariance matrix associated to the downmix signal, a second path for synthesizing a second component of the synthesis signal, the second component being a residual component, the second path including:

a prototype signal block configured for upmixing the downmix signal from the number of downmix channels to the number of synthesis channels;

a decorrelator configured for decorrelating the upmixed prototype signal;

a second mixing matrix block configured for synthesizing the second component of the synthesis signal according to a second mixing matrix from the decorrelated version of the downmix signal, the second mixing matrix being a residual mixing matrix, wherein the audio synthesizer is configured to estimate the second mixing matrix from:

a residual covariance matrix provided by the first mixing matrix block; and an estimate of the covariance matrix of the decorrelated prototype signals obtained from the covariance matrix associated to the downmix signal, wherein the audio synthesizer further comprises an adder block for summing the first component of the synthesis signal with the second component of the synthesis signal.

In accordance to an aspect, there may be provided an audio synthesizer for generating a synthesis signal from a downmix signal having a number of downmix channels, the synthesis signal having a number of synthesis channels, the downmix signal being a downmixed version of an original signal having a number of original channels, the audio synthesizer comprising:

a first path including:

a first mixing matrix block configured for synthesizing a first component of the synthesis signal according to a first mixing matrix calculated from:

a covariance matrix associated to the synthesis signal; and a covariance matrix associated to the downmix signal.

a second path for synthesizing a second component of the synthesis signal, wherein the second component is a residual component, the second path including:

a prototype signal block configured for upmixing the downmix signal from the number of downmix channels to the number of synthesis channels;

a decorrelator configured for decorrelating the upmixed prototype signal;

a second mixing matrix block configured for synthesizing the second component of the synthesis signal according to a second mixing matrix from the decorrelated version of the downmix signal, the second mixing matrix being a residual mixing matrix, wherein the audio synthesizer is configured to calculate the second mixing matrix from:

the residual covariance matrix provided by the first mixing matrix block; and an estimate of the covariance matrix of the decorrelated prototype signals obtained from the covariance matrix associated to the downmix signal, wherein the audio synthesizer further comprises an adder block for summing the first component of the synthesis signal with the second component of the synthesis signal.

The residual covariance matrix is obtained by subtracting, from the covariance matrix associated to the synthesis signal, a matrix obtained by applying the first mixing matrix to the covariance matrix associated to the downmix signal.

The audio synthesizer may be configured to define the second mixing matrix from:

a second matrix which is obtained by decomposing the residual covariance matrix associated to the synthesis signal;

a first matrix which is the inverse, or the regularized inverse, of a diagonal matrix obtained from the estimate of the covariance matrix of the decorrelated prototype signals.

The diagonal matrix may be obtained by applying the square root function to the main diagonal elements of the covariance matrix of the decorrelated prototype signals.

The second matrix may be obtained by singular value decomposition, SVD, applied to the residual covariance matrix associated to the synthesis signal.

The audio synthesizer may be configured to define the second mixing matrix by multiplication of the second matrix with the inverse, or the regularized inverse, of the diagonal matrix obtained from the estimate of the covariance matrix of the decorrelated prototype signals and a third matrix.

The audio synthesizer may be configured to obtain the third matrix by SVP applied to a matrix obtained from a normalized version of the covariance matrix of the decorrelated prototype signals, where the normalization is to the main diagonal the residual covariance matrix, and the diagonal matrix and the second matrix.

The audio synthesizer may be configured to define the first mixing matrix from a second matrix and the inverse, or regularized inverse, of a second matrix, wherein the second matrix is obtained by decomposing the covariance matrix associated to the downmix signal, and the second matrix is obtained by decomposing the reconstructed target covariance matrix associated to the downmix signal.

The audio synthesizer may be configured to estimate the covariance matrix of the decorrelated prototype signals from the diagonal entries of the matrix obtained from applying, to the covariance matrix associated to the downmix signal, the prototype rule used at the prototype block for upmixing the downmix signal from the number of downmix channels to the number of synthesis channels.

The bands are aggregated with each other into groups of aggregated bands, wherein information on the groups of aggregated bands is provided in the side information of the bitstream, wherein the channel level and correlation information of the original signal is provided per each group of bands, so as to calculate the same at least one mixing matrix for different bands of the same aggregated group of bands.

In accordance to an aspect, there may be provided an audio encoder for generating a downmix signal from an original signal, the original signal having a plurality of original channels, the downmix signal having a number of downmix channels, the audio encoder comprising:

a parameter estimator configured for estimating channel level and correlation information of the original signal, and a bitstream writer for encoding the downmix signal into a bitstream, so that the downmix signal is encoded in the bitstream so as to have side information including channel level and correlation information of the original signal.

The audio encoder may be configured to provide the channel level and correlation information of the original signal as normalized values.

The channel level and correlation information of the original signal encoded in the side information represents at least channel level information associated to the totality of the original channels.

The channel level and correlation information of the original signal encoded in the side information represents at least correlation information describing energy relationships between at least one couple of different original channels, but less than the totality of the original channels.

The channel level and correlation information of the original signal includes at least one coherence value describing the coherence between two channels of a couple of original channels.

The coherence value may be normalized. The coherence value may be $$\xi_{i,j} = \frac{C_{y_{i,j}}}{\sqrt{C_{y_{i,i}} \cdot C_{y_{j,j}}}}$$

where $C_{y_{i,j}}$ is an covariance between the channels i and j $C_{y_{i,i}}$ and $C_{y_{j,j}}$ being respectively levels associated to the channels i and j.

The channel level and correlation information of the original signal includes at least one interchannel level difference, ICLD.

The at least one ICLD may be provided as a logarithmic value. The at least one ICLD may be normalized. The ICLD may be $$\chi_i = 10 \cdot \log_{10}\left(\frac{P_i}{P_{dmx,i}}\right)$$

where $\chi_i$ The ICLD for channel i.

$P_i$ The power of the current channel i $P_{dmx,i}$ is a linear combination of the values of the covariance information of the downmix signal.

The audio encoder may be configured to choose whether to encode or not to encode at least part of the channel level and correlation information of the original signal on the basis of status information, so as to include, in the side information, an increased quantity of channel level and correlation information in case of comparatively lower payload.

The audio encoder may be configured to choose which part of the channel level and correlation information of the original signal is to be encoded in the side information on the basis of metrics on the channels, so as to include, in the side information, channel level and correlation information associated to more sensitive metrics.

The channel level and correlation information of the original signal may be in the form of entries of a matrix.

The matrix may be symmetrical or Hermitian, wherein the entries of the channel level and correlation information are provided for all or less than the totality of the entries in the diagonal of the matrix and/or for less than the half of the non-diagonal elements of the matrix.

The bitstream writer may be configured to encode identification of at least one channel.

The original signal, or a processed version thereof, may be divided into a plurality of subsequent frames of equal time length.

The audio encoder may be configured to encode in the side information channel level and correlation information of the original signal specific for each frame.

The audio encoder may be configured to encode, in the side information, the same channel level and correlation information of the original signal collectively associated to a plurality of consecutive frames.

The audio encoder may be configured to choose the number of consecutive frames to which the same channel level and correlation information of the original signal may be chosen so that:

a comparatively higher bitrate or higher payload implies an increase of the number of consecutive frames to which the same channel level and correlation information of the original signal is associated, and vice versa.

The audio encoder may be configured to reduce the number of consecutive frames to which the same channel level and correlation information of the original signal is associated to the detection of a transient.

Each frame may be subdivided into an integer number of consecutive slots.

The audio encoder may be configured to estimate the channel level and correlation information for each slot and to encode in the side information the sum or average or another predetermined linear combination of the channel level and correlation information estimated for different slots.

The audio encoder may be configured to perform a transient analysis onto the time domain version of the frame to determine the occurrence of a transient within the frame.

The audio decoder may be configured to determine in which slot of the frame the transient has occurred, and:

to encode the channel level and correlation information of the original signal associated to the slot in which the transient has occurred and/or to the subsequent slots in the frame, without encoding channel level and correlation information of the original signal associated to the slots preceding the transient.

The audio encoder may be configured to signal, in the side information, the occurrence of the transient being occurred in one slot of the frame.

The audio encoder may be configured to signal, in the side information, in which slot of the frame the transient has occurred.

The audio encoder may be configured to estimate channel level and correlation information of the original signal associated to multiple slots of the frame, and to sum them or average them or linearly combine them to obtain channel level and correlation information associated to the frame.

The original signal may be converted into a frequency domain signal, wherein the audio encoder is configured to encode, in the side information, the channel level and correlation information of the original signal in a band-by-band fashion.

The audio encoder may be configured to aggregate a number of bands of the original signal into a more reduced number of bands, so as to encode, in the side information, the channel level and correlation information of the original signal in an aggregated-band-by-aggregated-band fashion.

The audio encoder may be configured, in case of detection of a transient in the frame, to further aggregate the bands so that:

the number of the bands is reduced; and/or the width of at least one band is increased by aggregation with another band.

The audio encoder may be further configured to encode, in the bitstream, at least one channel level and correlation information of one band as an increment in respect to a previously encoded channel level and correlation information.

The audio encoder may be configured to encode, in the side information of the bitstream, an incomplete version of the channel level and correlation information with respect to the channel level and correlation information estimated by the estimator.

The audio encoder may be configured to adaptively select, among the whole channel level and correlation information estimated by the estimator, selected information to be encoded in the side information of the bitstream, so that remaining non-selected information channel level and/or correlation information estimated by the estimator is not encoded.

The audio encoder may be configured to reconstruct channel level and correlation information from the selected channel level and correlation information, thereby simulating the estimation, at the decoder, of non-selected channel level and correlation information, and to calculate error information between:

the non-selected channel level and correlation information as estimated by the encoder; and the non-selected channel level and correlation information as reconstructed by simulating the estimation, at the decoder, of non-encoded channel level and correlation information; and so as to distinguish, on the basis of the calculated error information:

properly-reconstructible channel level and correlation information; from non-properly-reconstructible channel level and correlation information, so as to decide for:

the selection of the non-properly-reconstructible channel level and correlation information to be encoded in the side information of the bitstream; and the non-selection of the properly-reconstructible channel level and correlation information, thereby refraining from encoding in the side information of the bitstream the properly-reconstructible channel level and correlation information.

The channel level and correlation information may be indexed according to a predetermined ordering, wherein the encoder is configured to signal, in the side information of the bitstream, indexes associated to the predetermined ordering, the indexes indicating which of the channel level and correlation information is encoded. The indexes are provided through a bitmap. The indexes may be defined according to a combinatorial number system associating a one-dimensional index to entries of a matrix.

The audio encoder may be configured to perform a selection among:

an adaptive provision of the channel level and correlation information, in which indexes associated to the predetermined ordering are encoded in the side information of the bitstream; and a fixed provision of the channel level and correlation information, so that the channel level and correlation information which is encoded is predetermined, and ordered according to a predetermined fixed ordering, without the provision of indexes.

The audio encoder may be configured to signal, in the side information of the bitstream, whether channel level and correlation information is provided according to an adaptive provision or according to the fixed provision.

The audio encoder may be further configured to encode, in the bitstream, current channel level and correlation information as increment in respect to previous channel level and correlation information.

The audio encoder may be further configured to generate the downmix signal according to a static downmixing.

In accordance to an aspect, there is provided a method for generating a synthesis signal from a downmix signal, the synthesis signal having a number of synthesis channels the method comprising:

receiving a downmix signal, the downmix signal having a number of downmix channels, and side information, the side information including:

channel level and correlation information of an original signal, the original signal having a number of original channels;

generating the synthesis signal using the channel level and correlation information (220) of the original signal and covariance information associated with the signal.

The method may comprise:

calculating a prototype signal from the downmix signal, the prototype signal having the number of synthesis channels;

calculating a mixing rule using the channel level and correlation information of the original signal and covariance information associated with the downmix signal; and generating the synthesis signal using the prototype signal and the mixing rule.

In accordance to an aspect, there is provided a method for generating a downmix signal from an original signal, the original signal having a number of original channels, the downmix signal having a number of downmix channels, the method comprising:

estimating channel level and correlation information of the original signal, encoding the downmix signal into a bitstream, so that the downmix signal is encoded in the bitstream so as to have side information including channel level and correlation information of the original signal.

In accordance to an aspect, there is provided a method for generating a synthesis signal from a downmix signal having a number of downmix channels, the synthesis signal having a number of synthesis channels, the downmix signal being a downmixed version of an original signal having a number of original channels, the method comprising the following phases:

a first phase including:

synthesizing a first component of the synthesis signal according to a first mixing matrix calculated from:

a covariance matrix associated to the synthesis signal; and a covariance matrix associated to the downmix signal.

a second phase for synthesizing a second component of the synthesis signal, wherein the second component is a residual component, the second phase including:

a prototype signal step upmixing the downmix signal from the number of downmix channels to the number of synthesis channels;

a decorrelator step decorrelating the upmixed prototype signal;

a second mixing matrix step synthesizing the second component of the synthesis signal according to a second mixing matrix from the decorrelated version of the downmix signal, the second mixing matrix being a residual mixing matrix, wherein the method calculates the second mixing matrix from:

the residual covariance matrix provided by the first mixing matrix step; and an estimate of the covariance matrix of the decorrelated prototype signals obtained from the covariance matrix associated to the downmix signal, wherein the method further comprises an adder step summing the first component of the synthesis signal with the second component of the synthesis signal, thereby obtaining the synthesis signal.

In accordance to an aspect, there is provided an audio synthesizer for generating a synthesis signal from a downmix signal, the synthesis signal having a number of synthesis channels, the number of synthesis channels being greater than one or greater than two, the audio synthesizer comprising at least one of:

an input interface configured for receiving the downmix signal, the downmix signal having at least one downmix channel and side information, the side information including at least one of:

channel level and correlation information of an original signal, the original signal having a number of original channels, the number of original channels being greater than one or greater than two;

a part, such as a prototype signal calculator [e.g., "prototype signal computation"], configured for calculating a prototype signal from the downmix signal, the prototype signal having the number of synthesis channels;

a part, such as a mixing rule calculator [e.g., "parameter reconstruction"], configured for calculating one (or more) mixing rule [e.g., a mixing matrix] using the channel level and correlation information of the original signal, covariance information associated with the downmix signal; and a part, such as a synthesis processor [e.g., "synthesis engine"], configured for generating the synthesis signal using the prototype signal and the mixing rule.

The number of synthesis channels may be greater than the number of original channels. In alternative, the number of synthesis channels may be smaller than the number of original channels.

The audio synthesizer (and in particular, in some aspects, the mixing rule calculator) may be configured to reconstruct a target version of the original channel level and correlation information. The audio synthesizer (and in particular, in some aspects, the mixing rule calculator) may be configured to reconstruct a target version of the original channel level and correlation information adapted to the number of channels of the synthesis signal.

The audio synthesizer (and in particular, in some aspects, the mixing rule calculator) may be configured to reconstruct a target version of the original channel level and correlation information based on an estimated version of the of the original channel level and correlation information.

The audio synthesizer (and in particular, in some aspects, the mixing rule calculator) may be configured to obtain the estimated version of the of the original channel level and correlation information from covariance information associated with the downmix signal.

The audio synthesizer (and in particular, in some aspects, the mixing rule calculator) may be configured to obtain the estimated version of the of the original channel level and correlation information by applying, to the covariance information associated with the downmix signal, an estimating rule associated to a prototype rule used by the prototype signal calculator [e.g., "prototype signal computation"] for calculating the prototype signal.

The audio synthesizer (and in particular, in some aspects, the mixing rule calculator) may be configured to retrieve, among the side information of the downmix signal both:

covariance information associated with the downmix signal describing the level of a first channels or an energy relationship between a couple of channels in the downmix signal; and channel level and correlation information of the original signal describing the level of a first channel or an energy relationship between a couple of channels in the original signal, so as to reconstruct the target version of the original channel level and correlation information by using at least one of:

the covariance information of the original channel for the at least one first channel or couple of channels; and the channel level and correlation information describing the at least one second channel or couple of channels.

The audio synthesizer (and in particular, in some aspects, the mixing rule calculator) may be configured to use the channel level and correlation information describing the channel or couple of channels rather than the covariance information of the original channel for the same channel or couple of channels.

The reconstructed target version of the original channel level and correlation information describing an energy relationship between a couple of channels is based, at least partially, on levels associated to each channel of the couple of channels.

The downmix signal may be divided into bands or groups of bands: different channel level and correlation information may be associated to different bands or groups of bands; the synthesizer (the prototype signal calculator, and in particular, in some aspects, at least one of the mixing rule calculator, and the synthesis processor) operates differently for different bands or groups of bands, to obtain different mixing rules for different bands or groups of bands.

The downmix signal may be divided into slots, wherein different channel level and correlation information are associated to different slots, and at least one of the component of the synthesizer (e.g. the prototype signal calculator, the mixing rule calculator, the synthesis processor or other elements of the synthesizer) operate differently for different slots, to obtain different mixing rules for different slots.

The synthesizer (e.g. the prototype signal calculator) may be configured to choose a prototype rule configured for calculating a prototype signal on the basis of the number of synthesis channels.

The synthesizer (e.g. the prototype signal calculator) may be configured to choose the prototype rule among a plurality of prestored prototype rules.

The synthesizer (e.g. the prototype signal calculator) may be configured to define a prototype rule on the basis of a manual selection.

The synthesizer (e.g. the prototype signal calculator) may include a matrix with a first and a second dimensions, wherein the first dimension is associated with the number of downmix channels, and the second dimension is associated with the number of synthesis channels.

The audio synthesizer (e.g. the prototype signal calculator) may be configured to operate at a bitrate equal or lower than 64 kbit/s or 160 Kbit/s.

The side information may include an identification of the original channels [e.g., L, R, C, etc.].

The audio synthesizer (and in particular, in some aspects, the mixing rule calculator) may be configured for calculating [e.g., "parameter reconstruction"] a mixing rule [e.g., mixing matrix] using the channel level and correlation information of the original signal, a covariance information associated with the downmix signal, and the identification of the original channels, and an identification of the synthesis channels.

The audio synthesizer may choose [e.g., by selection, such as manual selection, or by preselection, or automatically, e.g., by recognizing the number of loudspeakers], for the synthesis signal, a number of channels irrespective of the at least one of the channel level and correlation information of the original signal in the side information.

The audio synthesizer may choose different prototype rules for different selections, in some examples. The mixing rule calculator may be configured to calculate the mixing rule.

In accordance to an aspect, there is provided a method for generating a synthesis signal from a downmix signal, the synthesis signal having a number of synthesis channels, the number of synthesis channels being greater than one or greater than two, the method comprising:

receiving the downmix signal, the downmix signal having at least one downmix channel and side information, the side information including:

channel level and correlation information of an original signal, the original signal having a number of original channels, the number of original channels being greater than one or greater than two;

calculating a prototype signal from the downmix signal, the prototype signal having the number of synthesis channels;

calculating a mixing rule using the channel level and correlation information of the original signal, covariance information associated with the downmix signal; and generating the synthesis signal using the prototype signal and the mixing rule [e.g., a rule].

In accordance to an aspect, there is provided an audio encoder for generating a downmix signal from an original signal [e.g., y], the original signal having at least two channels, the downmix signal having at least one downmix channel, the audio encoder comprising at least one of:

a parameter estimator configured for estimating channel level and correlation information of the original signal, a bitstream writer for encoding the downmix signal into a bitstream, so that the downmix signal is encoded in the bitstream so as to have side information including channel level and correlation information of the original signal.

The channel level and correlation information of the original signal encoded in the side information represents channel levels information associated to less than the totality of the channels of the original signal.

The channel level and correlation information of the original signal encoded in the side information represents correlation information describing energy relationships between at least one couple of different channels in the original signal, but less than the totality of the channels of the original signal.

The channel level and correlation information of the original signal may include at least one coherence value describing the coherence between two channels of a couple of channels.

The channel level and correlation information of the original signal may include at least one interchannel level difference, ICLD, between two channels of a couple of channels.

The audio encoder may be configured to choose whether to encode or not to encode at least part of the channel level and correlation information of the original signal on the basis of status information, so as to include, in the side information, an increased quantity of the channel level and correlation information in case of comparatively lower overload.

The audio encoder may be configured to choose whether to decide which part the channel level and correlation information of the original signal to be encoded in the side information on the basis of metrics on the channels, so as to include, in the side information, channel level and correlation information associated to more sensitive metrics [e.g., metrics which are associated to more perceptually significant covariance].

The channel level and correlation information of the original signal may be in the form of a matrix.

The bitstream writer may be configured to encode identification of at least one channel.

In accordance to an aspect, there is provided a method for generating a downmix signal from an original signal, the original signal having at least two channels, the downmix signal having at least one downmix channel.

The method may comprise:

estimating channel level and correlation information of the original signal, encoding the downmix signal into a bitstream, so that the downmix signal is encoded in the bitstream so as to have side information including channel level and correlation information of the original signal.

The audio encoder may be agnostic to the decoder. The audio synthesizer may be agnostic of the decoder.

In accordance to an aspect, there is provided a system comprising the audio synthesizer as above or below and an audio encoder as above or below.

In accordance to an aspect, there is provided a non-transitory storage unit storing instructions which, when executed by a processor, cause the processor to perform a method as above or below.

BRIEF DESCRIPTION OF THE DRAWINGS

3. Examples

3.1 Figures

Figure 1:
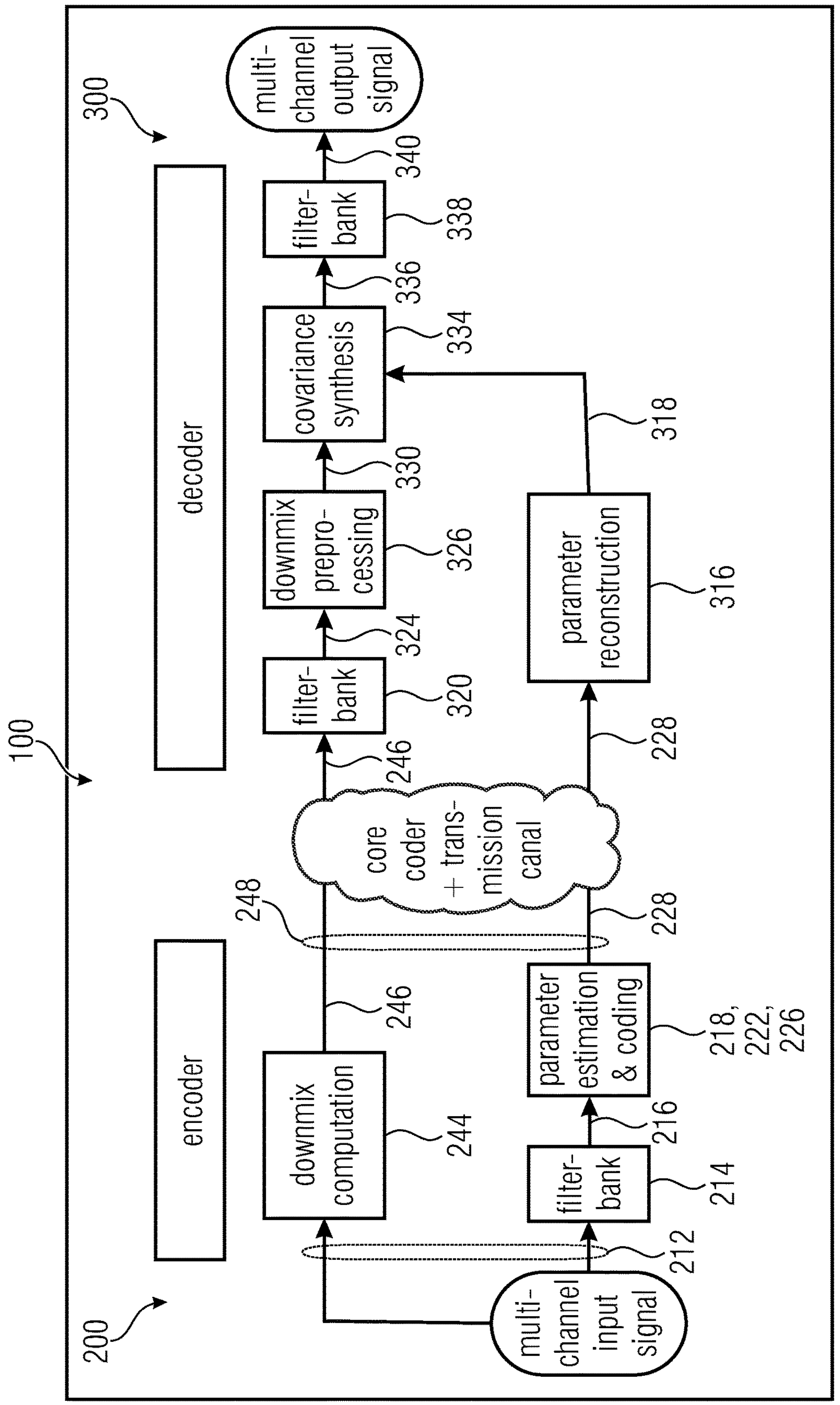
Figure 2A:
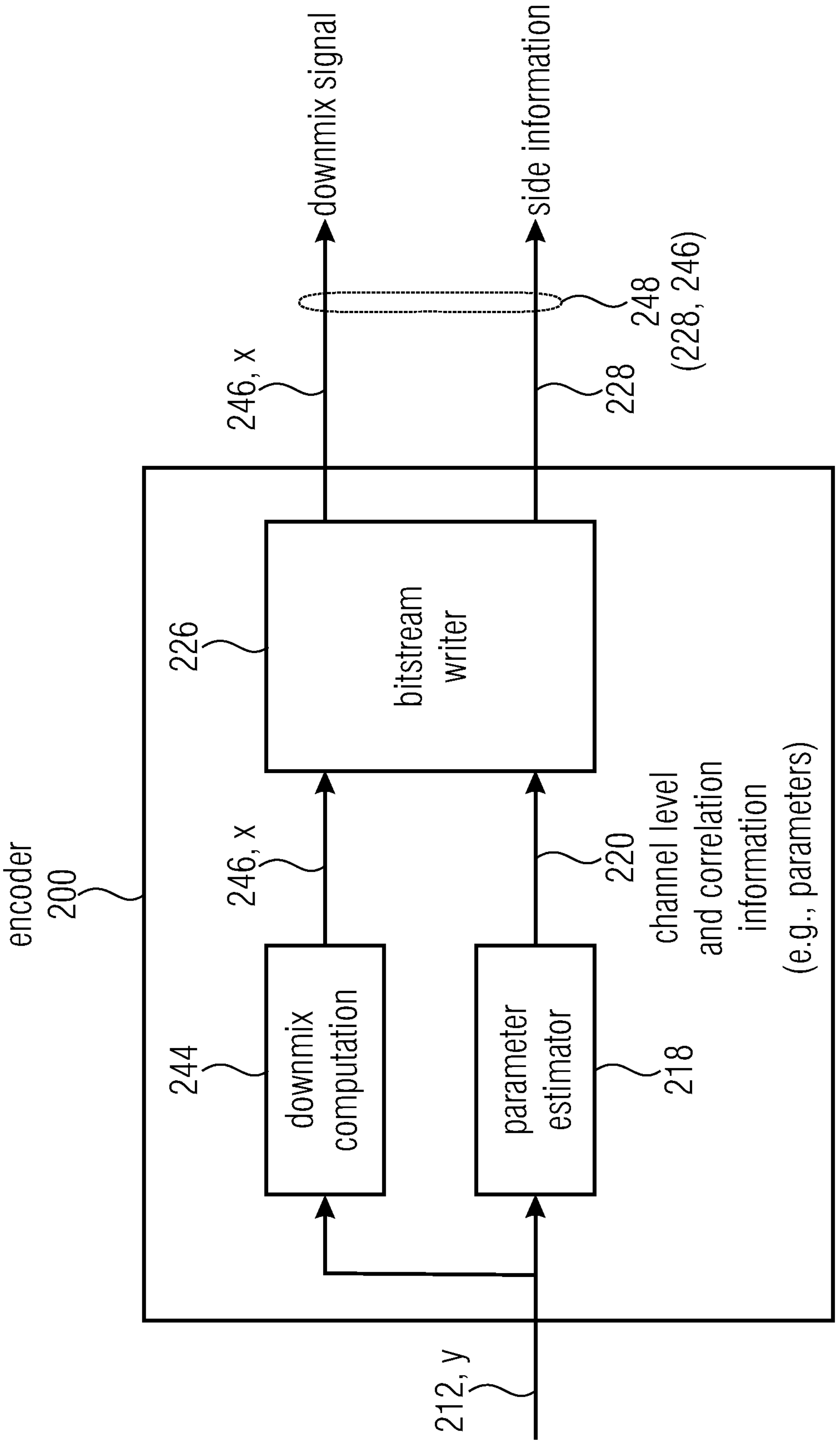
Figure 2B:
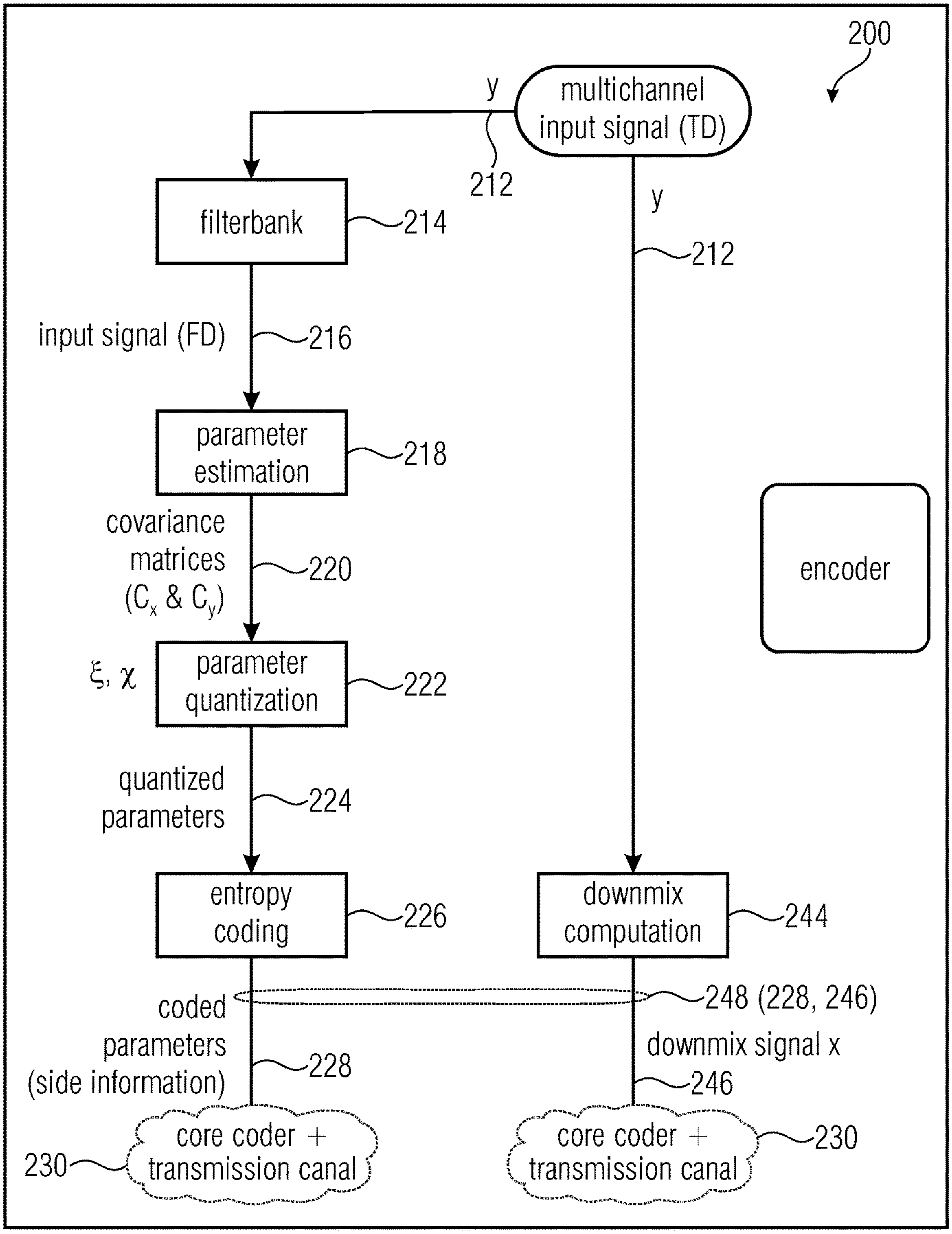
Figure 2C:
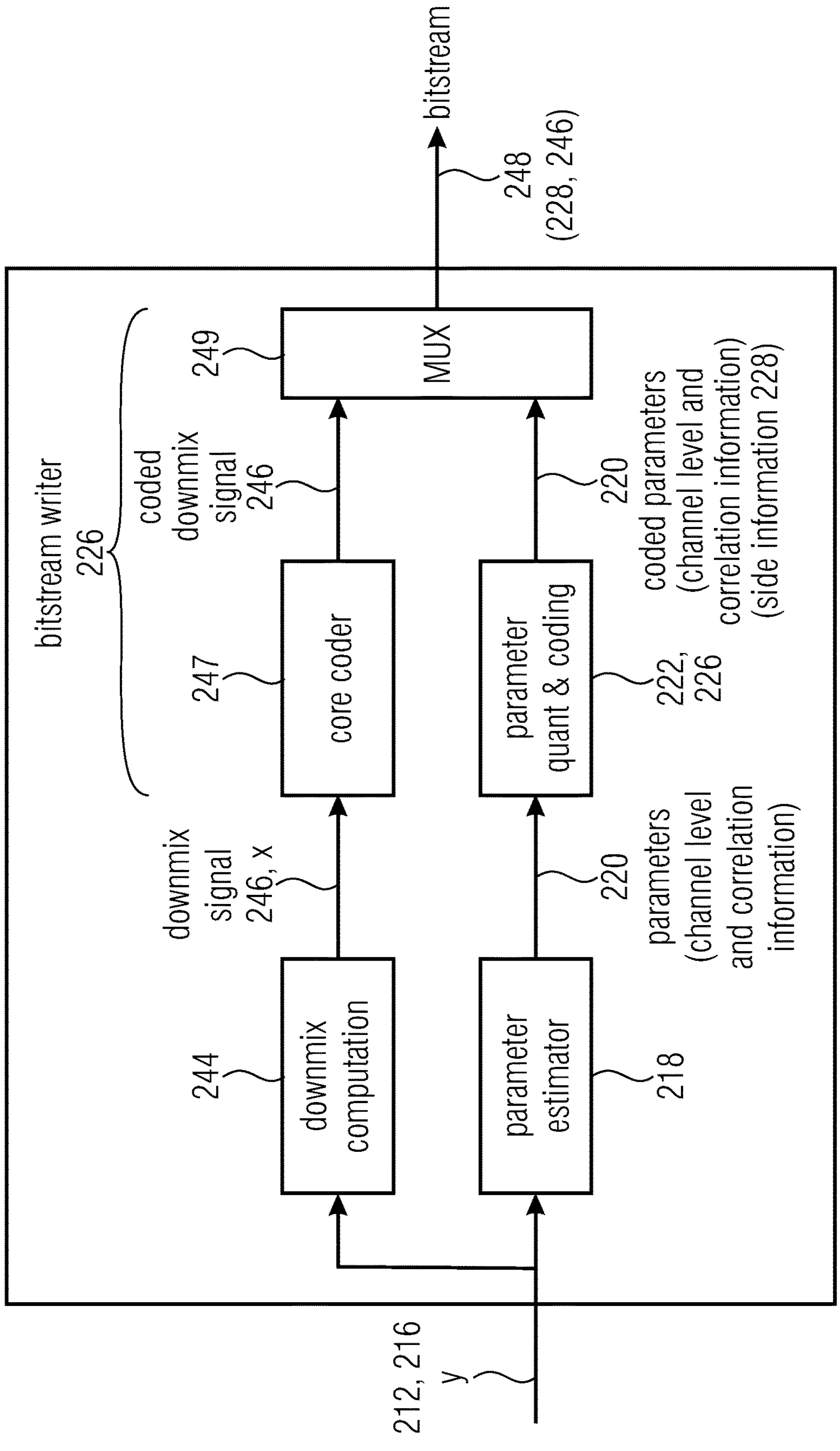
Figure 2D:
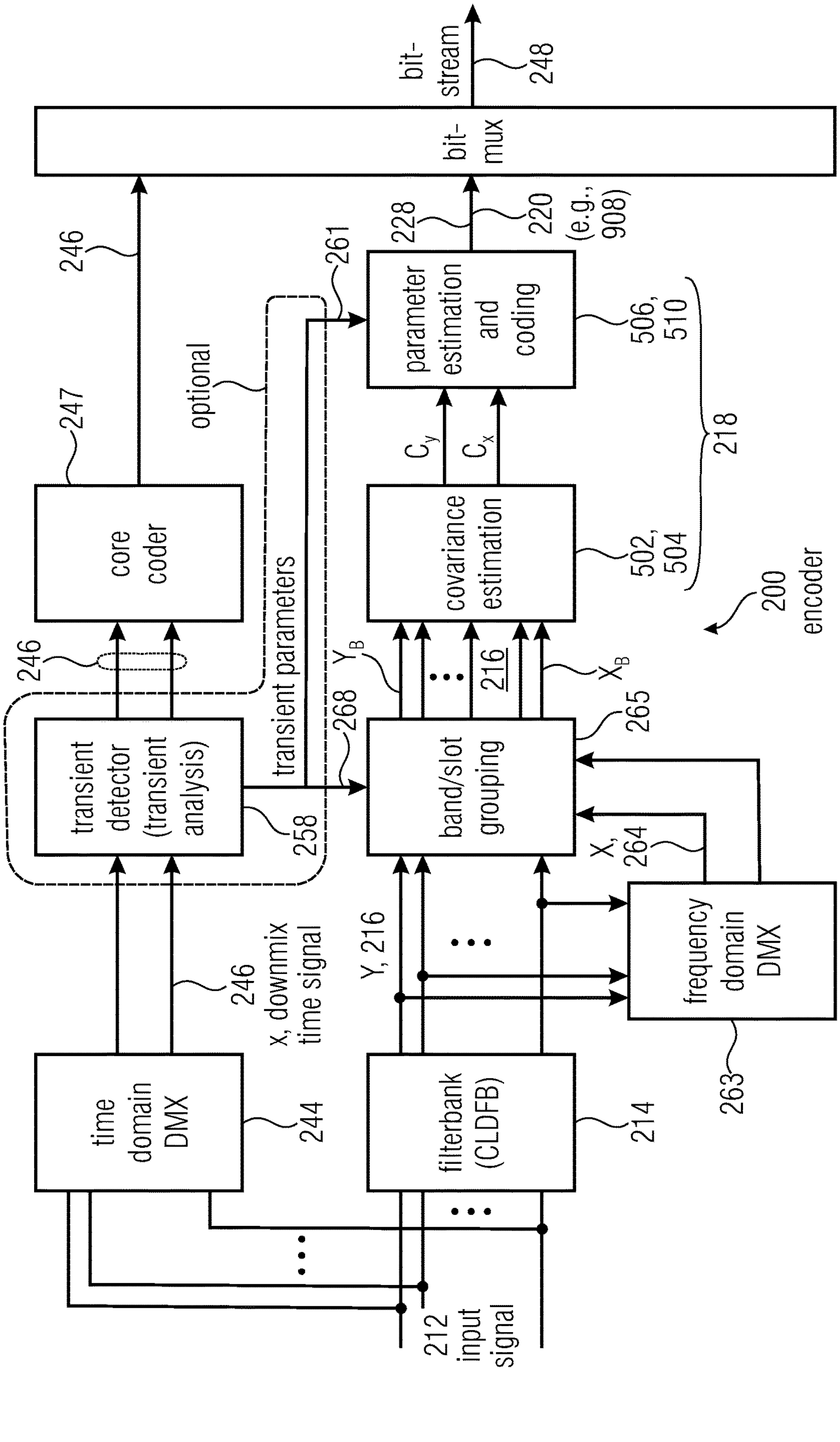
Figure 3A:
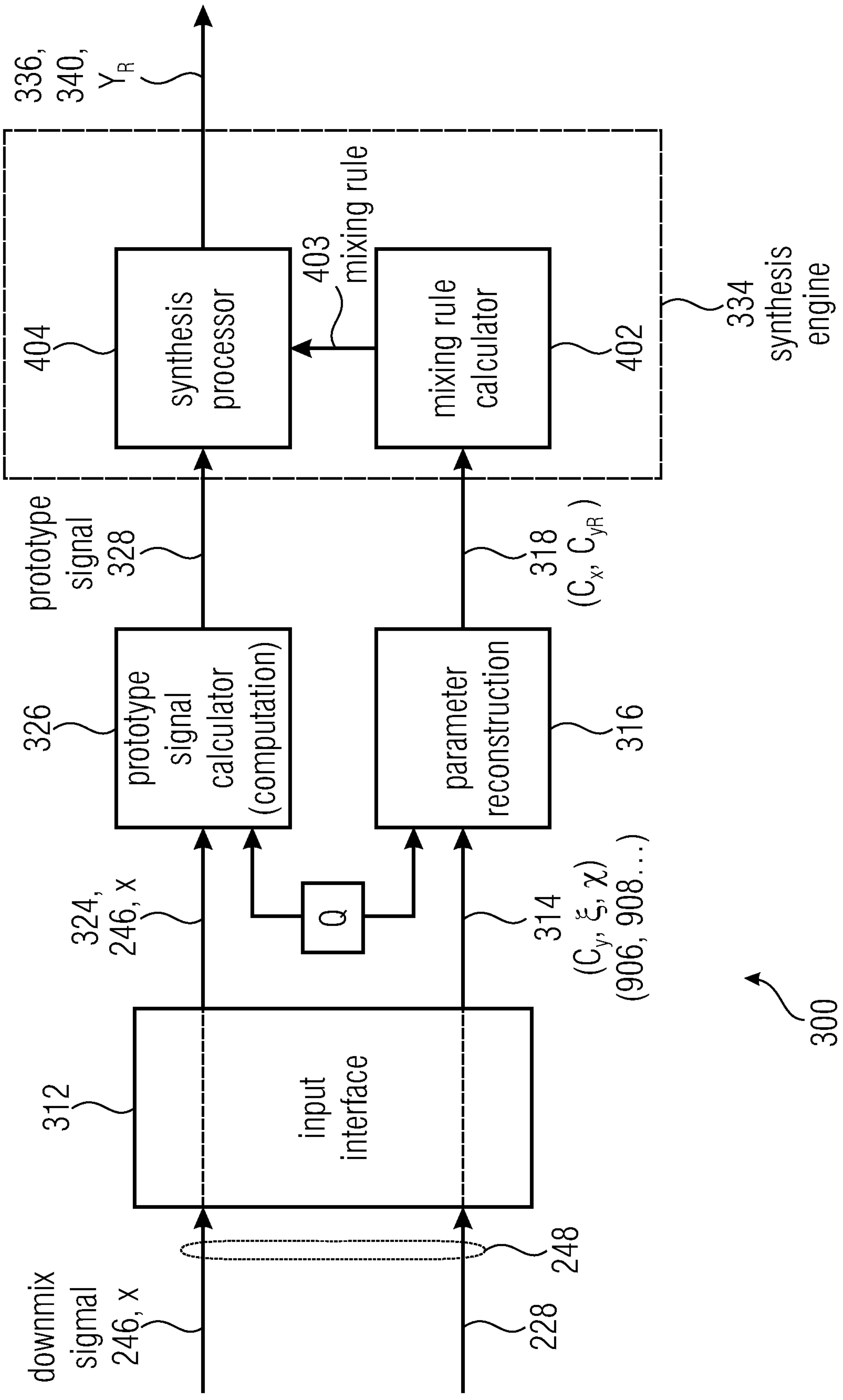
Figure 3B:
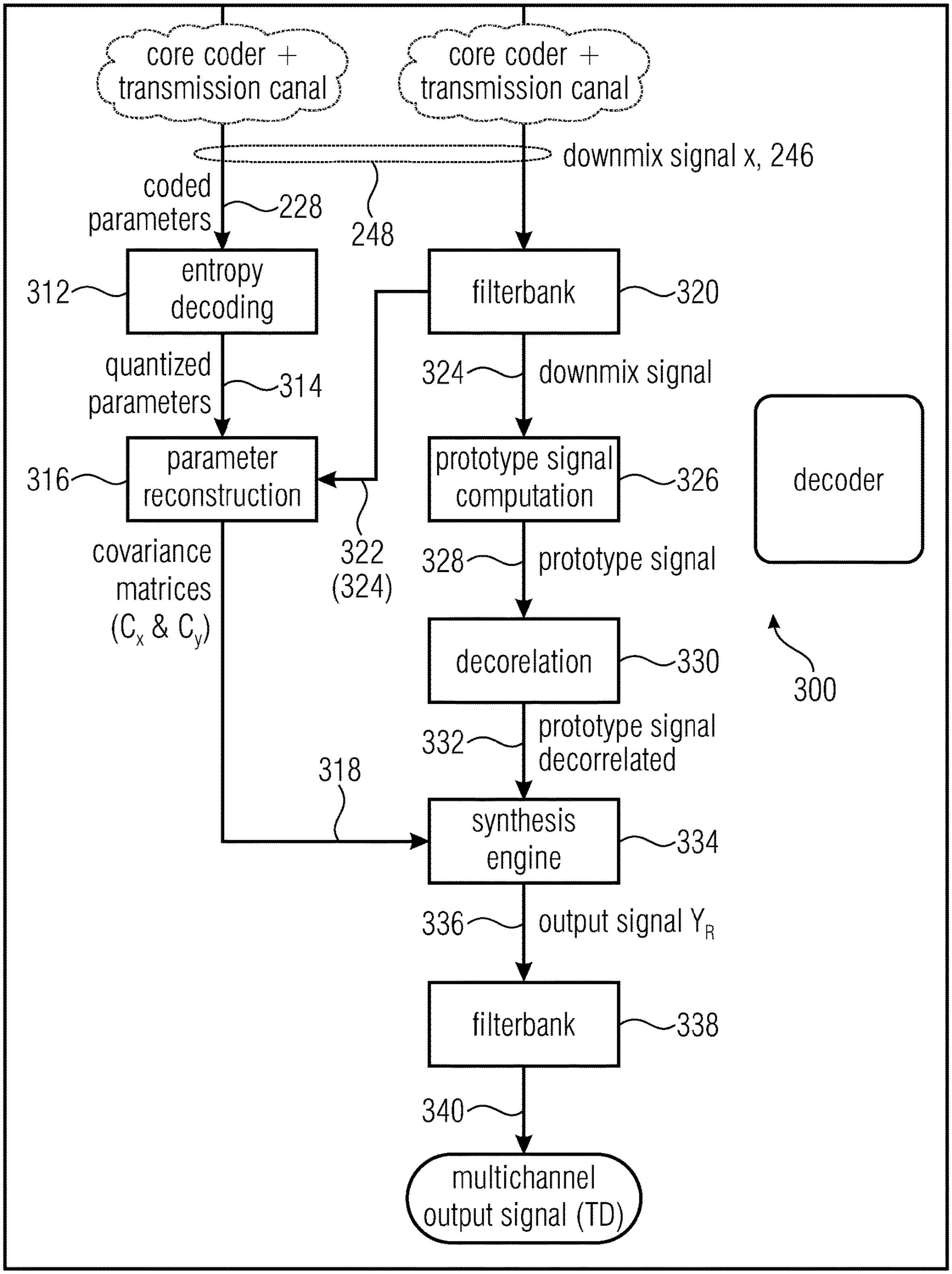
Figure 3C:
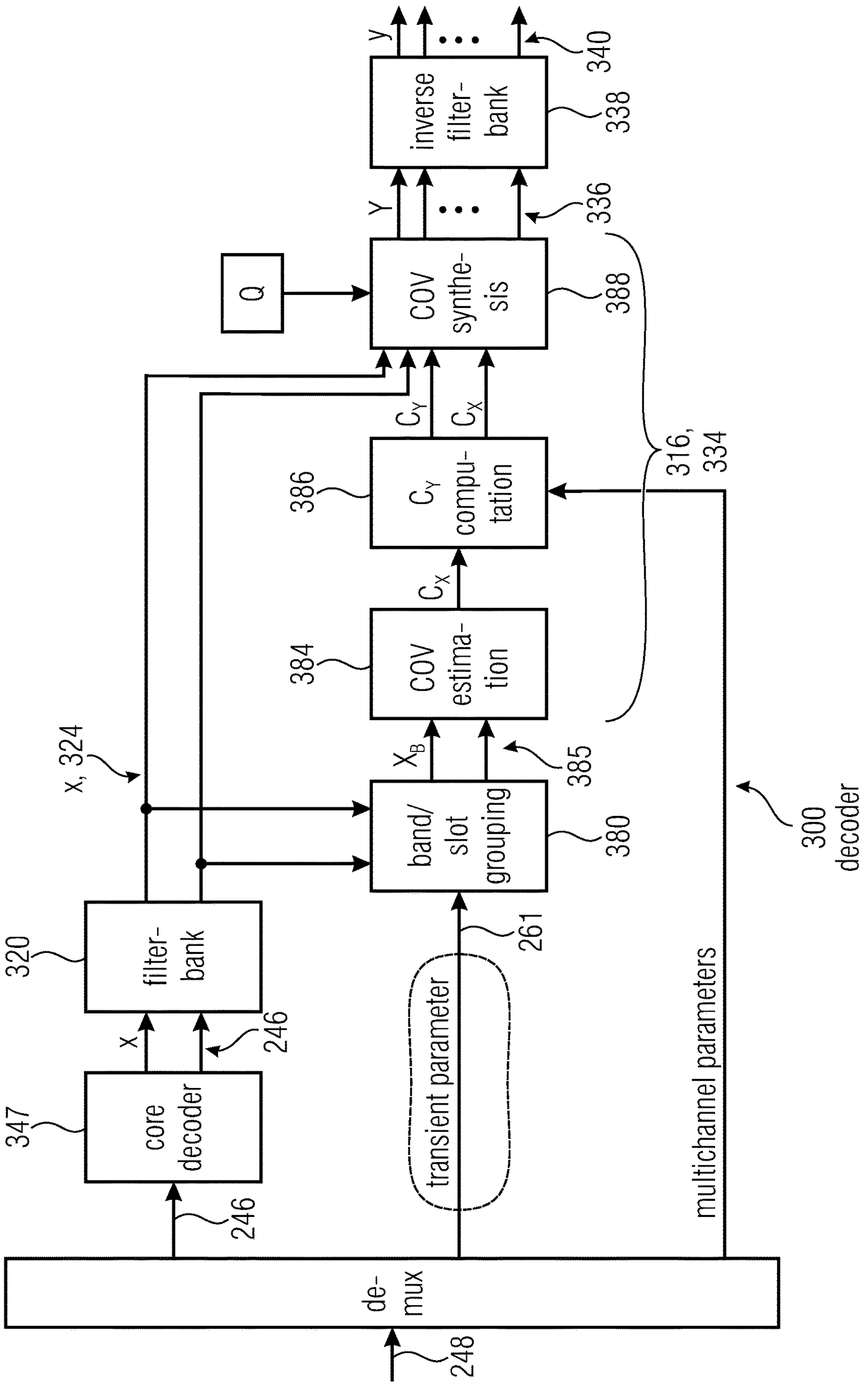
Figure 5:
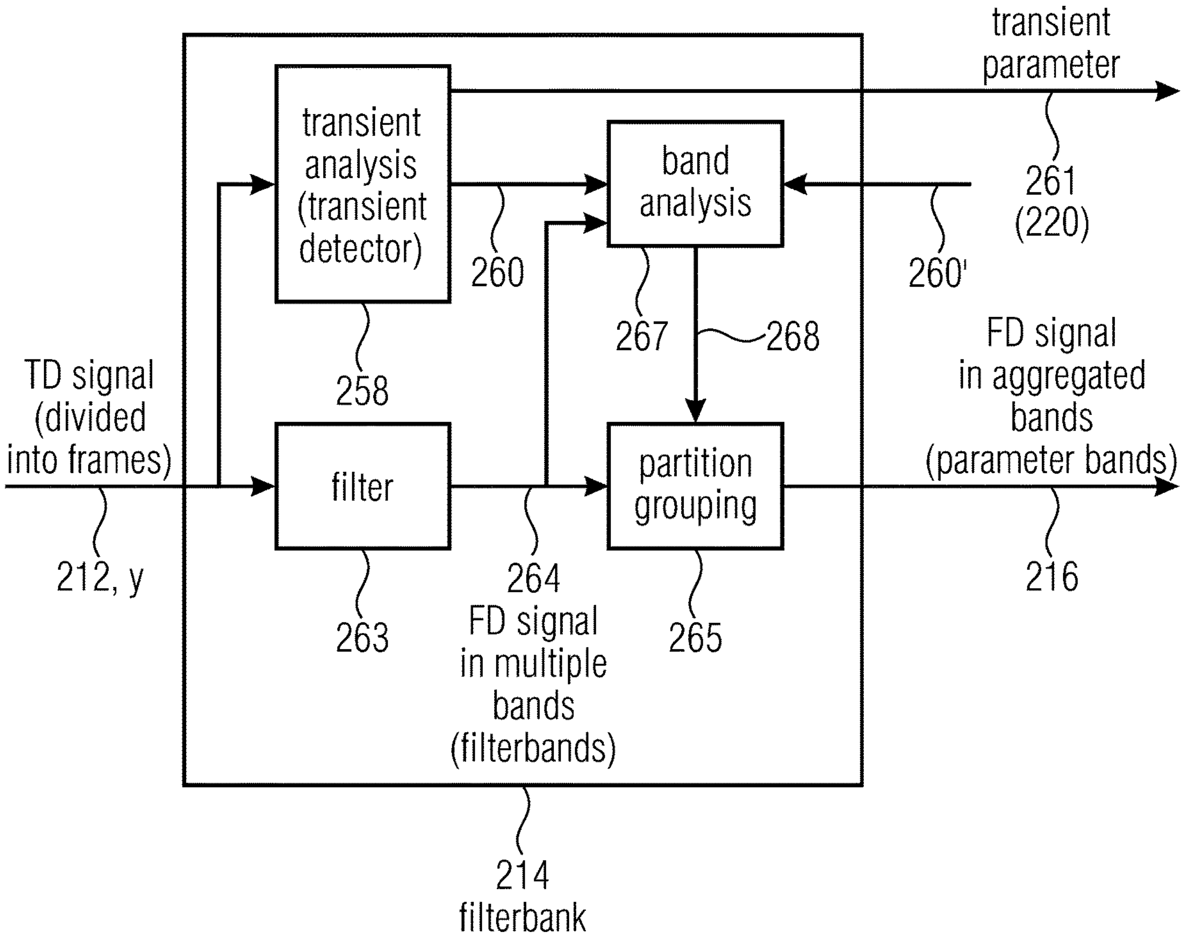
Figure 6A:
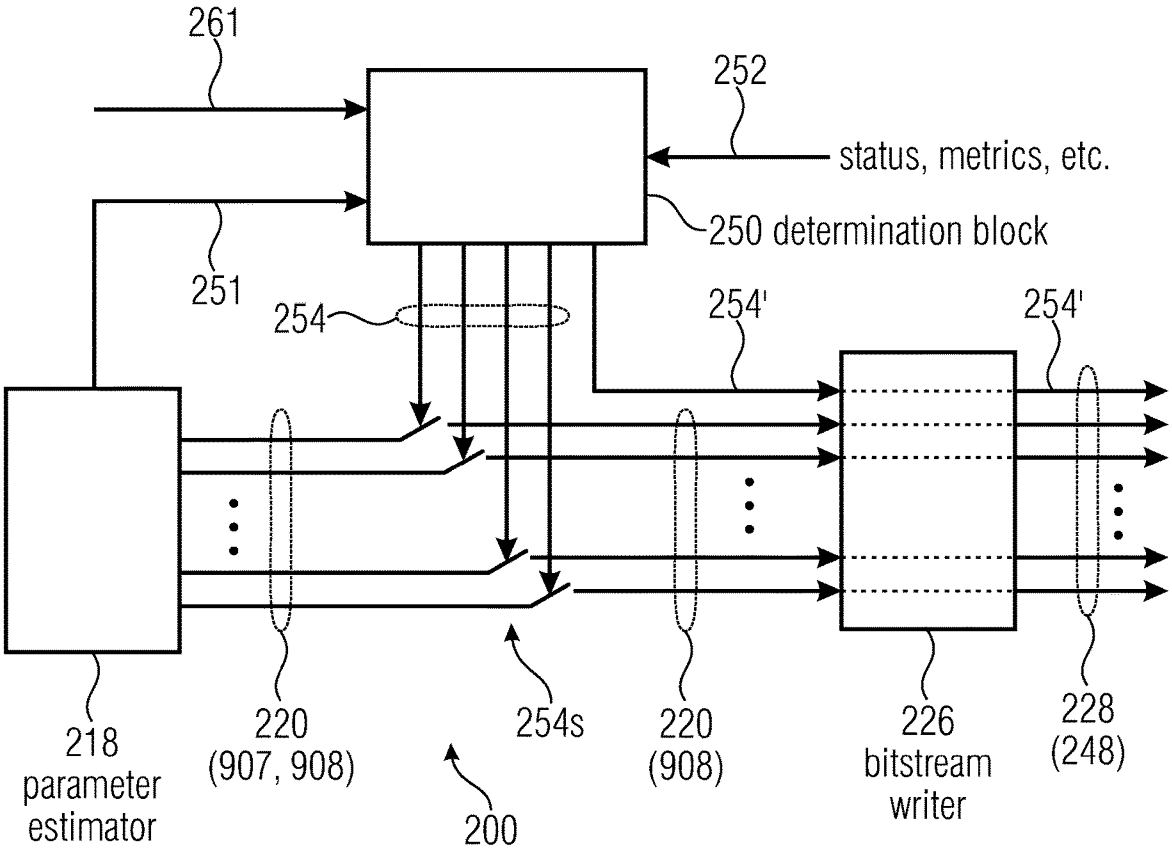
Figure 6B:
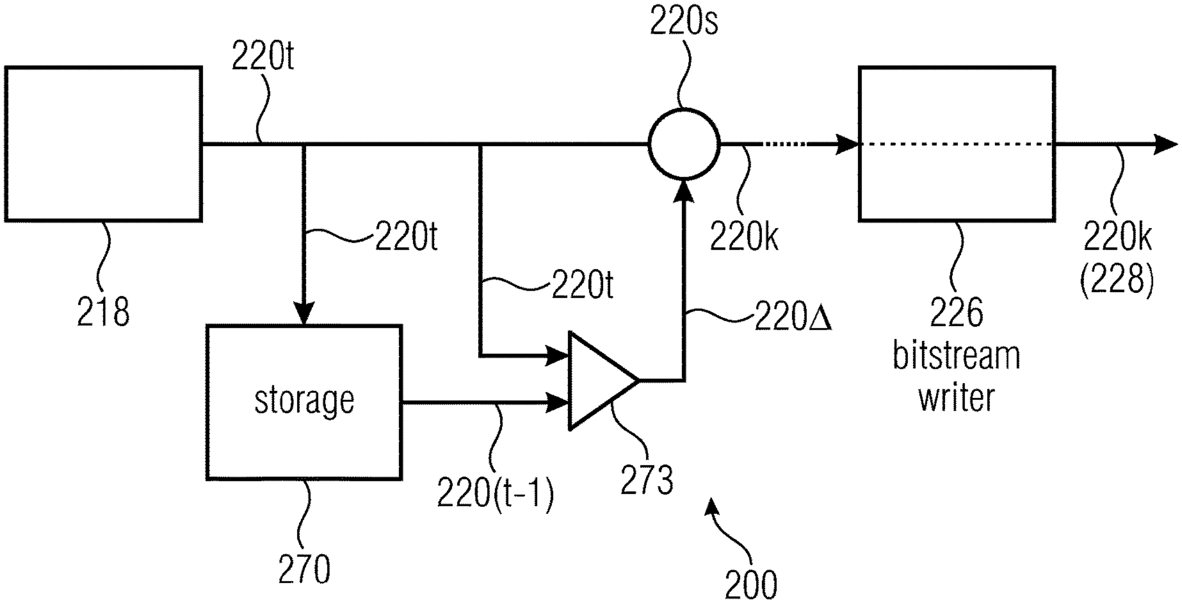
Figure 6C:
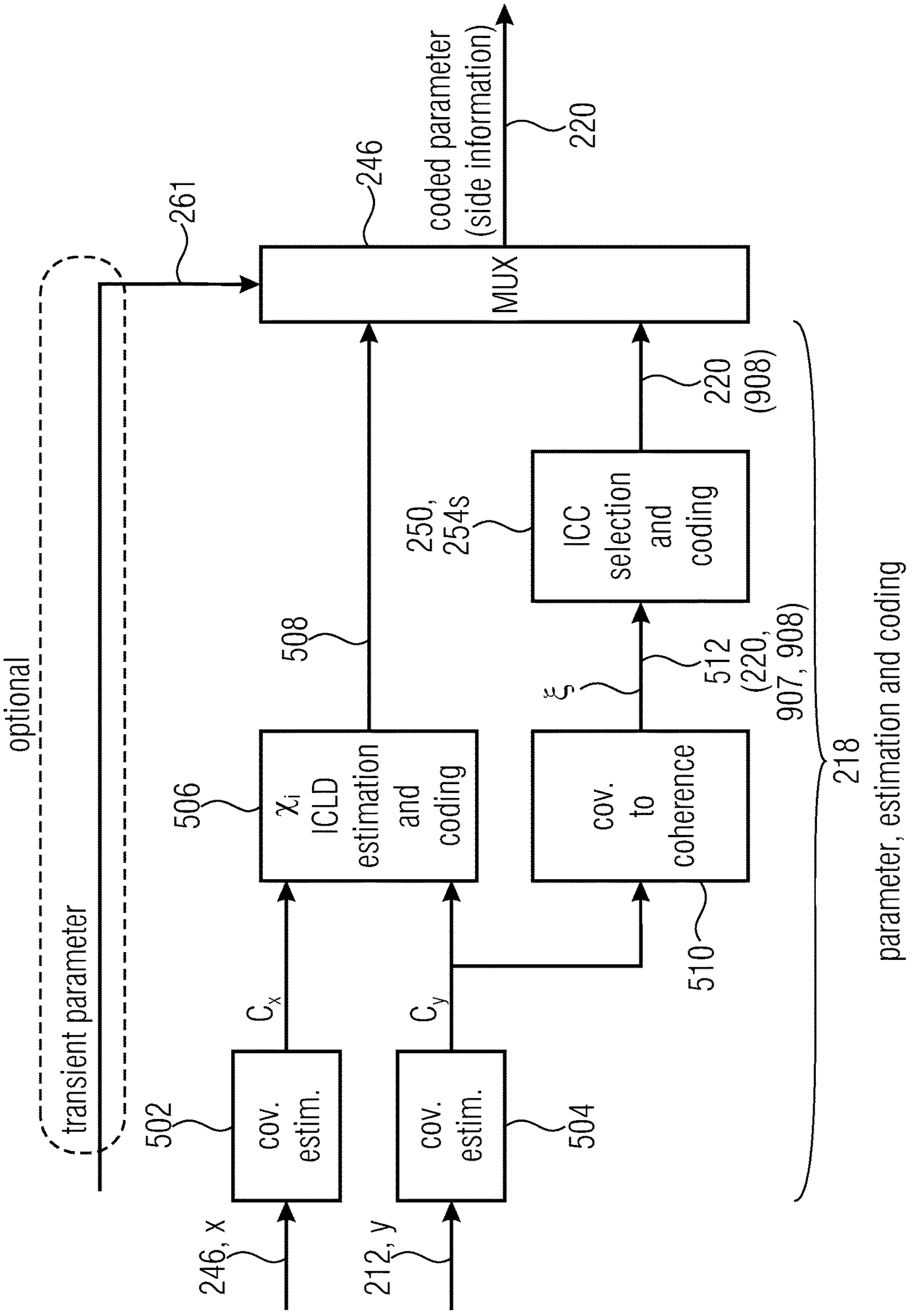
Figure 7:
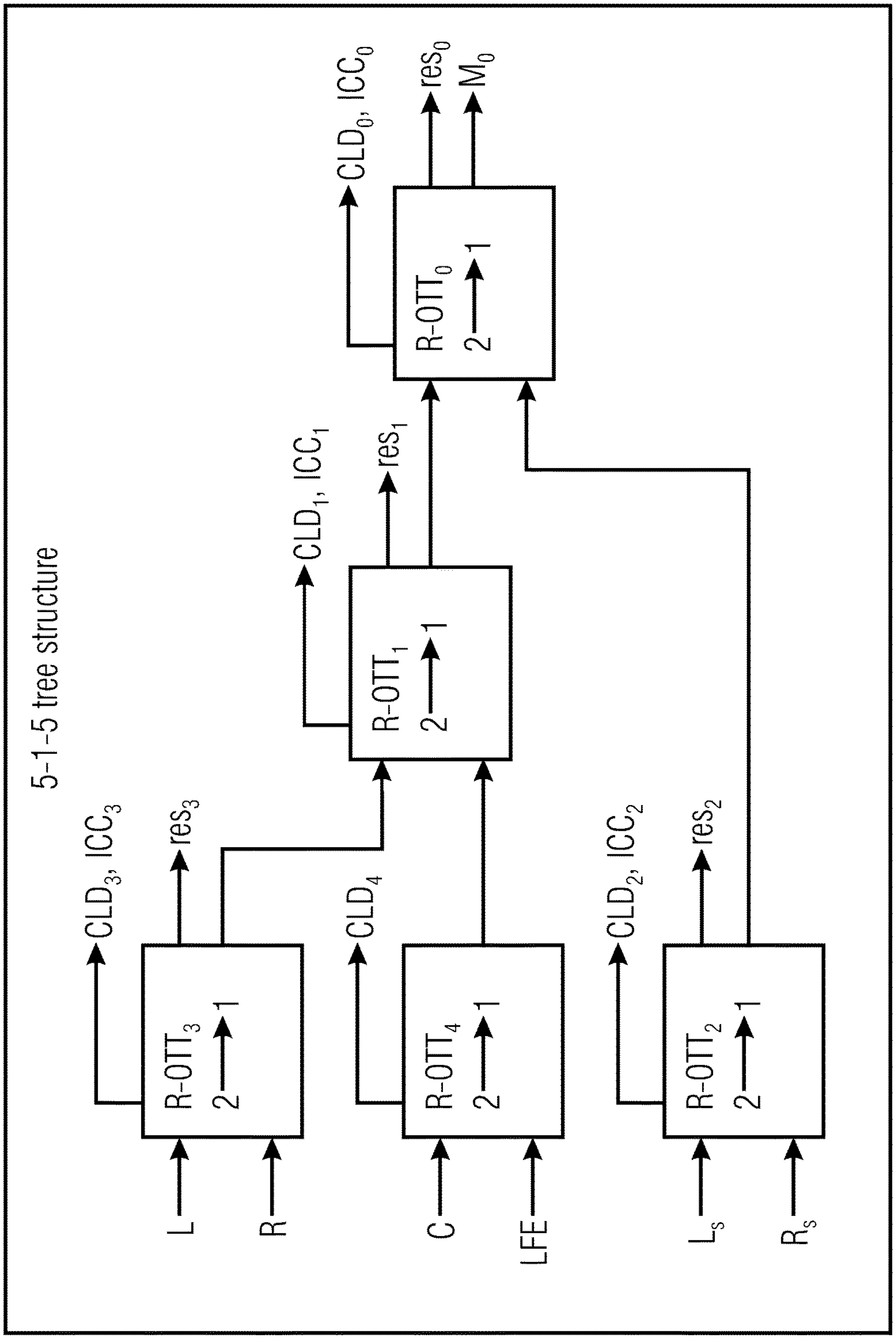
Fig. 7 (PRIOR ART)
Figure 8A:
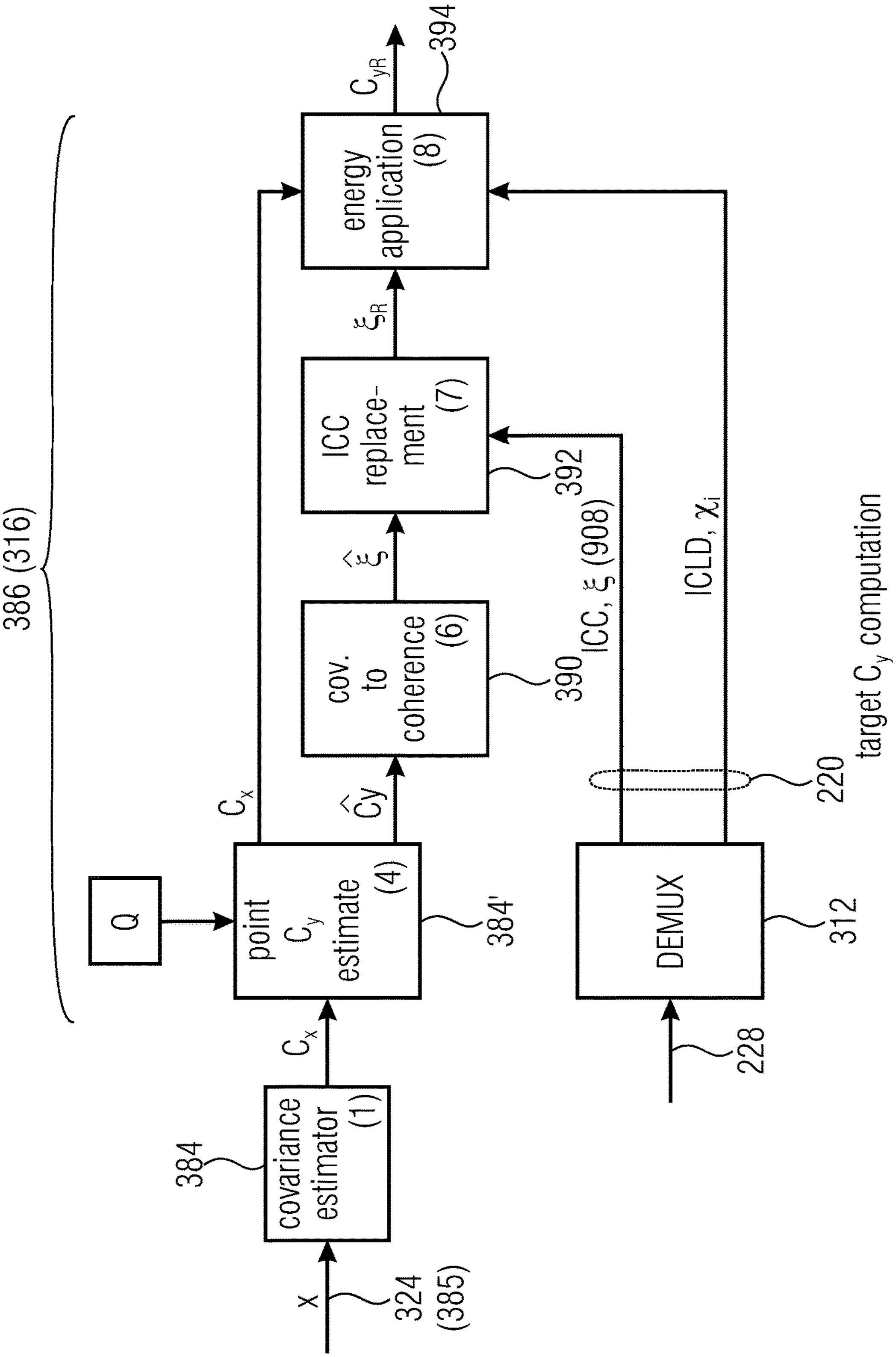
Figure 8B:
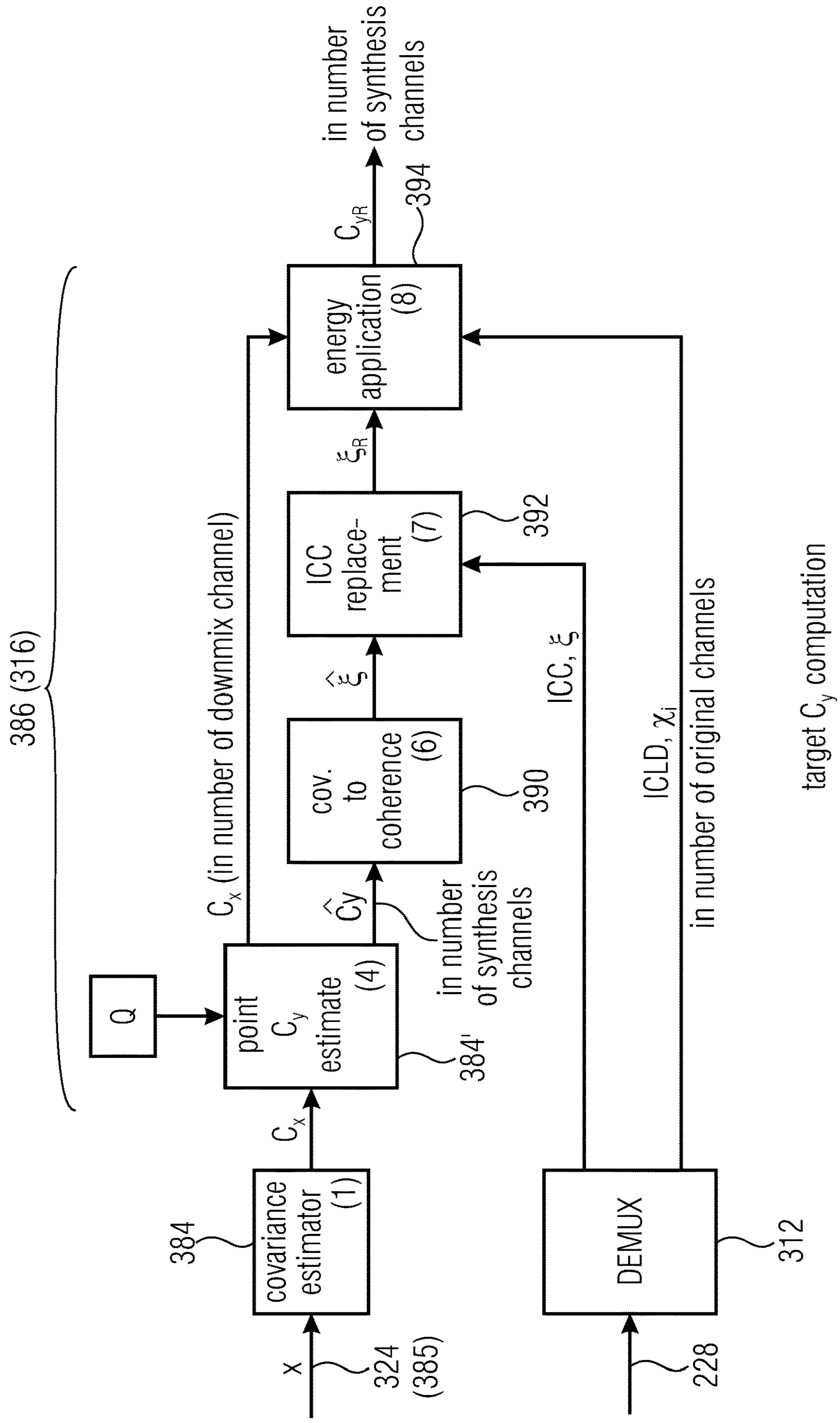
Figure 8C:
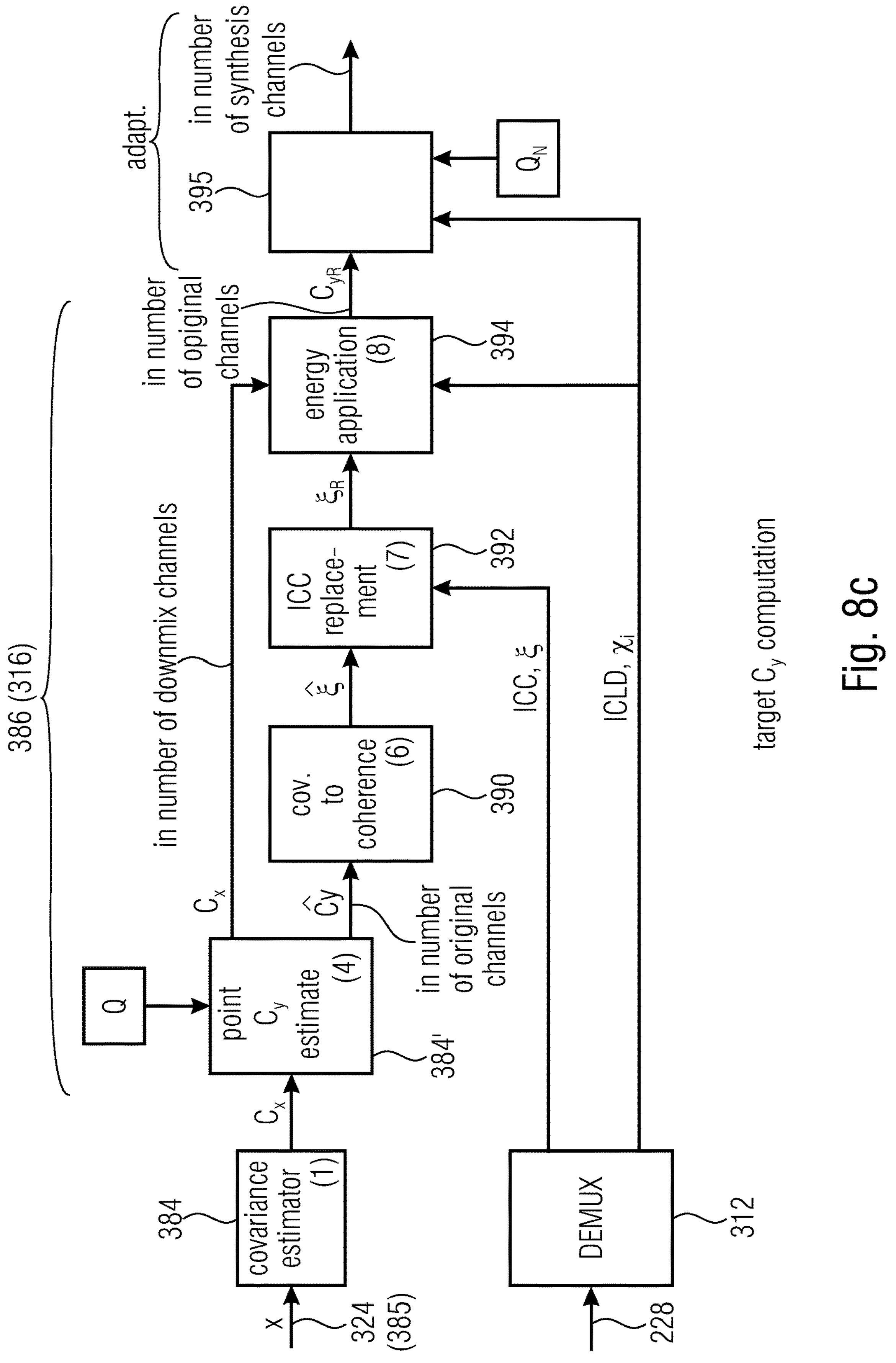
Figure 10B:
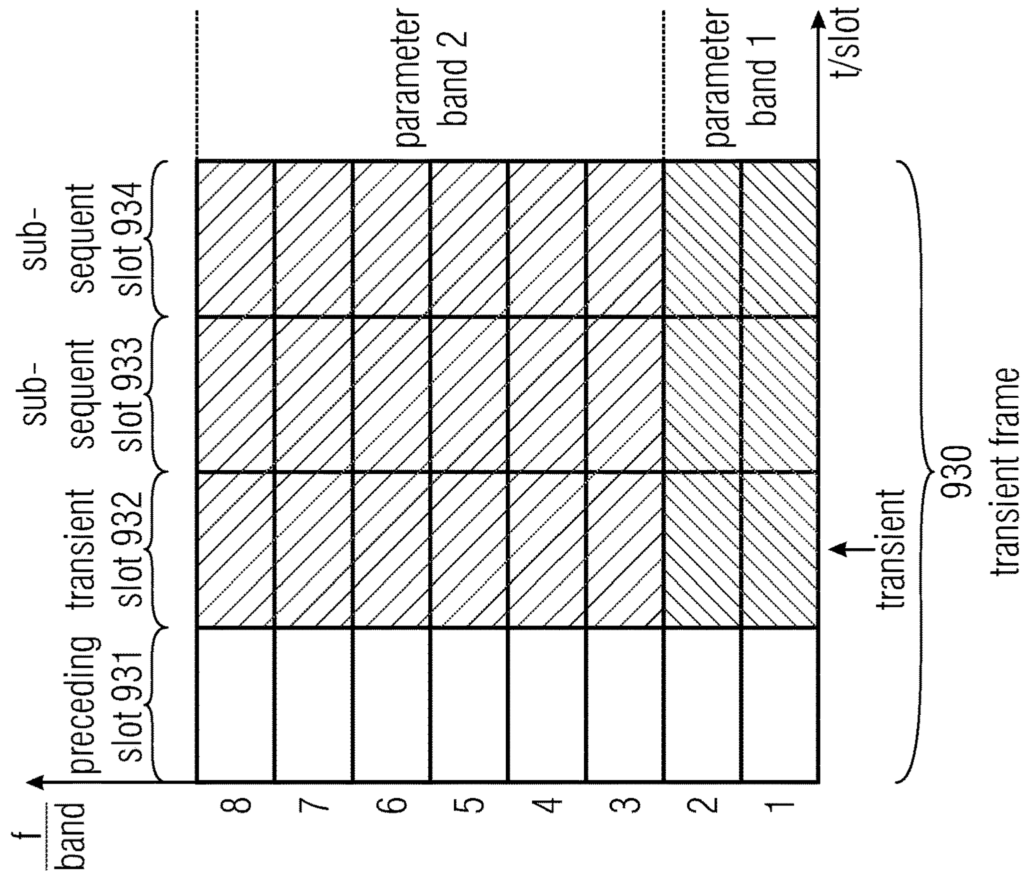
Figure 10A:
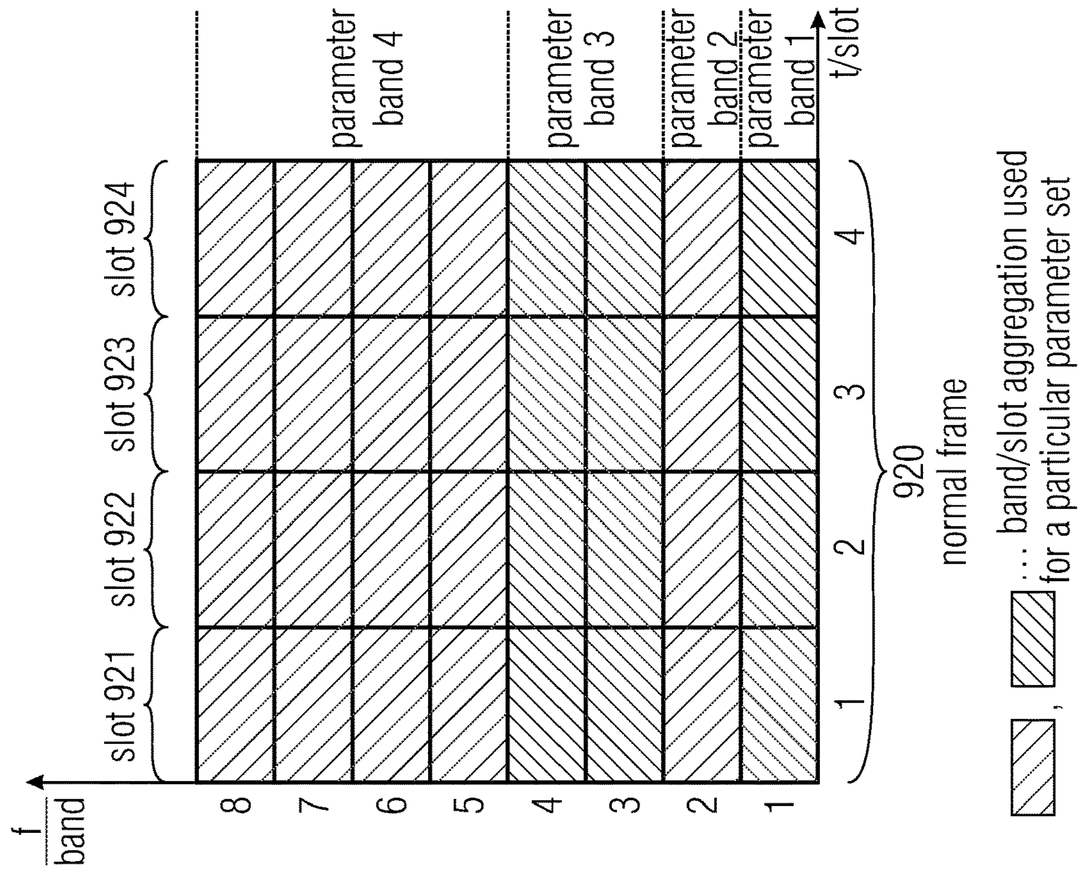
Figure 11:
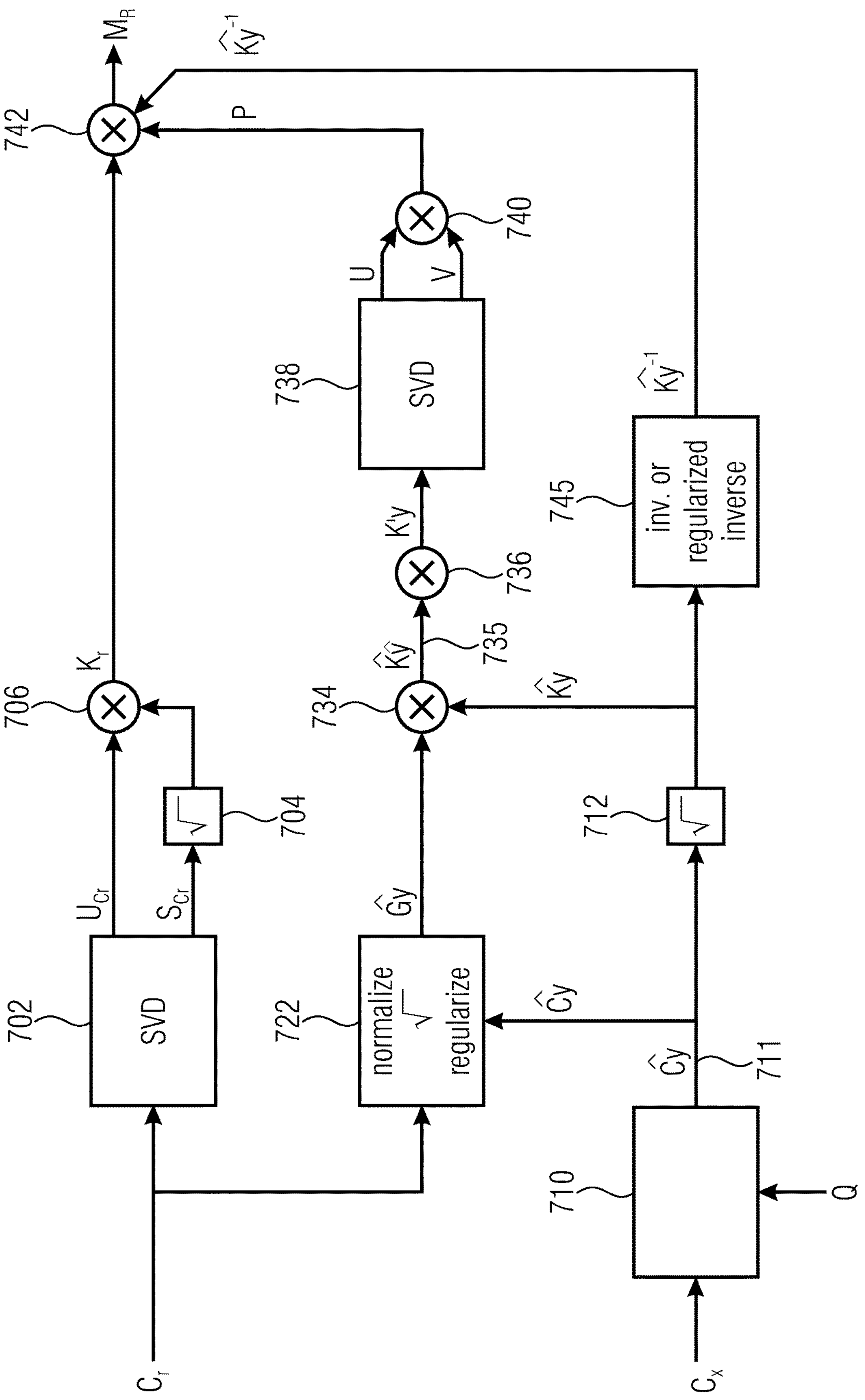

Embodiments of the present invention will be detailed subsequently referring to the appended drawings, in which:

FIG. 1 shows a simplified overview of a processing according to the invention;

FIG. 2*a* shows an audio encoder according to the invention;

FIG. 2*b* shows another view of audio encoder according to the invention;

FIG. 2*c* shows another view of audio encoder according to the invention;

FIG. 2*d* shows another view of audio encoder according to the invention;

FIG. 3*a* shows an audio synthesizer (decoder) according to the invention;

FIG. 3*b* shows another view of audio synthesizer (decoder) according to the invention;

FIG. 3*c* shows another view of audio synthesizer (decoder) according to the invention;

FIGS. 4*a*-4*d* show examples of covariance synthesis;

FIG. 5 shows an example of filterbank for an audio encoder according to the invention;

FIGS. 6*a*-6*c* show examples of operation of an audio encoder according to the invention;

FIG. 7 shows an example of the known technology;

FIGS. 8*a*-8*c* shows examples of how to obtain covariance information according to the invention;

FIGS. 9*a*-9*d* show examples of inter channel coherence matrices;

FIGS. 10*a*-10*b* show examples of frames;

FIG. 11 shows a scheme used by the decoder for obtaining a mixing matrix.

DETAILED DESCRIPTION OF THE INVENTION

3.2 Concepts Regarding the Invention

It will be shown that examples are based on the encoder downmixing a signal 212 and providing channel level and correlation information 220 to the decoder. The decoder may generate a mixing rule (e.g., mixing matrix) from the channel level and correlation information 220. Information which is important for the generation of the mixing rule may include covariance information (e.g. a covariance matrix $C_y$) of the original signal 212 and covariance information (e.g. a covariance matrix $C_x$) of the downmix signal. While the covariance matrix $C_x$ may be directly estimated by the decoder by analyzing the downmix signal, the covariance matrix $C_y$ of the original signal 212 is easily estimated by the decoder. The covariance matrix $C_y$ of the original signal 212 is in general a symmetrical matrix (e.g. a 5×5 matrix in the case of a 5 channel original signal 212): while the matrix presents, at the diagonal, level of each channel, it presents covariances between the channels at the non-diagonal entries. The matrix is diagonal, as the covariance between generic channels i and j is the same of the covariance between j and i. Hence, in order to provide to the decoder the whole covariance information, it may be useful to signal to the decoder 5 levels at the diagonal entries and 10 covariances for the non-diagonal entries. However, it will be shown that it is possible to reduce the amount of information to be encoded.

Further, it will be shown that, in some cases, instead of the levels and covariances, normalized values may be provided. For example, inter channel coherences (ICCs, also indicated with $\xi_{i,j}$) and inter channel level differences (ICLDs, also indicated with $\chi_i$), indicating values of energy, may be provided. The ICCs may be, for example, correlation values provided instead of the covariances for the non-diagonal entries of the matrix $C_y$. An example of correlation information may be in the form $$\xi_{i,j} = \frac{C_{y_{i,j}}}{\sqrt{C_{y_{i,i}} \cdot C_{y_{j,j}}}}.$$

In some examples, only a part of the are actually encoded.

In this way, an ICC matrix is generated. The diagonal entries of the ICC matrix would in principle be equally 1, and therefore it is not necessary to encode them in the bitstream. However, has been understood that it is possible for the encoder to provide to the decoder the ICLDs, e.g. in the form $$\chi_i = 10 \cdot \log_{10}\left(\frac{P_i}{P_{dmx,i}}\right)$$

(see also below). In some examples, all the $\chi_i$ are actually encoded.

FIGS. 9*a*-9*d* shows examples of an ICC matrix 900, with diagonal values “d” which may be ICLDs $\chi_i$ and non-diagonal values indicated with 902, 904, 905, 906, 907 (see below) which may be ICCs $\xi_{i,j}$.

In the present document, the product between matrices is indicated by the absence of a symbol. E.g., the product bet ween matrix A and matrix B is indicated by AB. The conjugate transpose of a matrix is indicated with an asterisk (*).

When reference is made to the diagonal, it is intended the main diagonal.

3.3 The Present Invention

FIG. 1 shows an audio system 100 with an encoder side and a decoder side. The encoder side may be embodied by an encoder 200, and may obtain ad audio signal 212 e.g. from an audio sensor unit (e.g. microphones) o may be obtained from a storage unit or from a remote unit (e.g., via a radio transmission). The decoder side may be embodied by an audio decoder (audio synthesizer) 300, which may provide audio content to an audio reproduction unit (e.g. loudspeakers). The encoder 200 and the decoder 300 may communicate with each other, e.g. through a communication channel, which may be wired or wireless (e.g., through radio frequency waves, light, or ultrasound, etc.). The encoder and/or the decoder may therefore include or be connected to communication units (e.g., antennas, transceivers, etc.) for transmitting the encoded bitstream 248 from the encoder 200 to the decoder 300. In some cases, the encoder 200 may store the encoded bitstream 248 in a storage unit (e.g., RAM memory, FLASH memory, etc.), for future use thereof. Analogously, the decoder 300 may read the bitstream 248 stored in a storage unit. In some examples, the encoder 200 and the decoder 300 may be the same device: after having encoded and saved the bitstream 248, the device may need to read it for playback of audio content.

FIGS. 2*a*, 2*b*, 2*c*, and 2*d* show examples of encoders 200. In some examples, the encoders of FIGS. 2*a* and 2*b* and 2*c* and 2*d* may be the same and only differ from each other because of the absence of some elements in one and/or in the other drawing.

The audio encoder 200 may be configured for generating a downmix signal 246 from an original signal 212 (the original signal 212 having at least two (e.g., three or more) channels and the downmix signal 246 having at least one downmix channel).

The audio encoder 200 may comprise a parameter estimator 218 configured to estimate channel level and correlation information 220 of the original signal 212. The audio encoder 200 may comprise a bitstream writer 226 for encoding the downmix signal 246 into a bitstream 248. The downmix signal 246 is therefore encoded in the bitstream 248 in such a way that it has side information 228 including channel level and correlation information of the original signal 212. In particular, the input signal 212 may be understood, in some examples, as a time domain audio signal, such as, for example, a temporal sequence of audio samples. The original signal 212 has at least two channels which may, for example, correspond to different microphones (e.g. for a stereo audio position or, however, a multichannel audio position), or for example correspond to different loudspeaker positions of an audio reproduction unit. The input signal 212 may be downmixed at a downmixer computation block 244 to obtain a downmixed version 246 (also indicated as x) of the original signal 212. This downmix version of the original signal 212 is also called downmix signal 246. The downmix signal 246 has at least one downmix channel. The downmix signal 246 has less channels than the original signal 212. The downmix signal 212 may be in the time domain.

The downmix signal 246 is encoded in the bitstream 248 by the bitstream writer 226 (e.g. including an entropy-encoder or a multiplexer, or core coder) for a bitstream to be stored or transmitted to a receiver (e.g. associated to the decoder side). The encoder 200 may include a parameter estimator (or parameter estimation block) 218. The parameter estimator 218 may estimate channel level and correlation information 220 associated to the original signal 212. The channel level and correlation information 220 may be encoded in the bitstream 248 as side information 228. In examples, channel level and correlation information 220 is encoded by the bitstream writer 226. In examples, even though FIG. 2*b* does not show the bitstream writer 226 downstream to the downmix computation block 235, the bitstream writer 226 may notwithstanding be present. In FIG. 2*c* there is shown that the bitstream writer 226 may include a core coder 247 to encode the downmix signal 246, so as to obtain a coded version of the downmix signal 246. FIG. 2*c* also shows that the bitstream writer 226 may include a multiplexer 249, which encodes in the bitstream 228 both the coded downmix signal 246 and the channel level and correlation information 220 (e.g., as coded parameters) in the side information 228.

As shown by FIG. 2*b* (missing in FIGS. 2*a* and 2*c*), the original signal 212 may be processed (e.g. by filterbank 214, see below) to obtain a frequency domain version 216 of the original signal 212.

An example of parameter estimation is shown in FIG. 6*c*, where a parameter estimator 218 defines parameters $\xi_{i,j}$ and $\chi_i$ (e.g., normalized parameters) to be subsequently encoded in the bitstream. Covariance estimators 502 and 504 estimate the covariance $C_x$ and $C_y$, respectively, for the downmix signal 246 to be encoded and the input signal 212. Then, at ICLD block 506, ICLD parameters $\chi_i$ are calculated and provided to the bitstream writer 246. At the covariance-to-coherence block 510, ICCs (412) are obtained. At block 250, only some of the ICCs are selected to be encoded.

A parameter quantization block 222 (FIG. 2*b*) may permit to obtain the channel level and correlation information 220 in a quantized version 224.

The channel level and correlation information 220 of the original signal 212 may in general include information regarding energy (or level) of a channel of the original signal 212. In addition or in alternative, the channel level and correlation information 220 of the original signal 212 may include correlation information between couples of channels, such as the correlation between two different channels. The channel level and correlation information may include information associated to covariance matrix $C_y$ (e.g. in its normalized form, such as the correlation or ICCs) in which each column and each row is associated to a particular channel of the original signal 212, and where the channel levels are described by the diagonal elements of the matrix $C_y$ and the correlation information, and the correlation information is described by non-diagonal elements of the matrix $C_y$. The matrix $C_y$ may be such that it is a symmetric matrix (i.e. it is equal to its transpose), or a Hermitian matrix (i.e. it is equal to its conjugate transpose). $C_y$ is in general positive semidefinite. In some examples, the correlation may be substituted by the covariance (and the correlation information is substituted by covariance information). It has been understood that it is possible to encode, in the side information 228 of the bitstream 248, information associated to less than the totality of the channels of the original signal 212. For example, it is not necessary to provide that a channel level and correlation information regarding all the channels or all the couples of channels. For example, only a reduced set of information regarding the correlation among couples of channels of the downmix signal 212 may be encoded in the bitstream 248, while the remaining information may be estimated at the decoder side. In general, it is possible to encode less elements than the diagonal elements of $C_y$, and it is possible to encode less elements than the elements outside the diagonal of $C_y$.

For example, the channel level and correlation information may include entries of a covariance matrix $C_y$ of the original signal 212 (channel level and correlation information 220 of the original signal) and/or the covariance matrix $C_x$ of the downmix signal 246 (covariance information of the downmix signal), e.g. in normalized form. For example, the covariance matrix may associate each line and each column to each channel so as to express the covariances between the different channels and, in the diagonal of the matrix, the level of each channel. In some examples, the channel level and correlation information 220 of the original signal 212 as encode in the side information 228 may include only channel level information (e.g., only diagonal values of the correlation matrix $C_y$) or only correlation information (e.g. only values outside the diagonal of correlation matrix $C_y$). The same applies to the covariance information of the downmix signal.

As will be shown subsequently, the channel level and correlation information 220 may include at least one coherence value ($\xi_{i,j}$) describing the coherence between two channels i and j of a couple of channels i, j. In addition or alternatively, the channel level and correlation information 220 may include at least one interchannel level difference, ICLD ($\chi_i$). In particular, it is possible to define a matrix having ICLD values or interchannel coherence, ICC, values. Hence, examples above regarding the transmission of elements of the matrixes $C_y$ and $C_x$ may be generalized for other values to be encoded (e.g. transmitted) for embodying the channel level and correlation information 220 and/or the coherence information of the downmix channel.

The input signal 212 may be subdivided into a plurality of frames. The different frames may have, for example, the same time length (e.g. each of them may be constituted, during the time elapsed for one frame, by the same number of samples in the time domain). Different frames therefore have in general equal time lengths. In the bitstream 248, the downmix signal 246 (which may be a time domain signal) may be encoded in a frame-by-frame fashion (or in any case its subdivision into frames may be determined by the decoder). The channel level and correlation information 220, as encoded as side information 228 in the bitstream 248, may be associated to each frame (e.g., the parameters of the channel level and correlation information 220 may be provided for each frame, or for a plurality of consecutive frames). Accordingly, for each frame of the downmix signal 246, an associated side information 228 (e.g. parameters) may be encoded in the side information 228 of the bitstream 248. In some cases, multiple, consecutive frames can be associated to the same channel level and correlation information 220 (e.g., to the same parameters) as encoded in the side information 228 of the bitstream 248. Accordingly, one parameter may result to be collectively associated to a plurality of consecutive frames. This may occur, in some examples, when two consecutive frames have similar properties or when the bitrate needs to be decreased (e.g. as it may be useful to reduce the payload). For example:

- in case of high payload the number of consecutive frames associated to a same particular parameter is increased, so as to reduce the amount of bits written in the bitstream;
- in case of lower payload, the number of consecutive frames associated to a same particular parameter is reduced, so as to increase the mixing quality.

In other cases, when bitrate is decreased, the number of consecutive frames associated to a same particular parameter is increased, so as to reduce the amount of bits written in the bitstream, and vice versa.

In some cases, it is possible to smooth parameters (or reconstructed or estimated values, such as covariances) using linear combinations with parameters (or reconstructed or estimated values, such as covariances) preceding a current frame, e.g. by addition, average, etc.

In some examples, a frame can be divided among a plurality of subsequent slots. FIG. 10*a* shows a frame 920 (subdivided into four consecutive slots 921-924) and FIG. 10*b* shows a frame 930 (subdivided into four consecutive slots 931-934). The time length of different slots may be the same. If the frame length is 20 ms and 1.25 ms slot size, there are 16 slots in one frame (20/1.25=16).

The slot subdivision may be performed in filterbanks (e.g., 214), discussed below.

In an example, filter bank is a Complex-modulated Low Delay Filter Bank (CLDFB) the frame size is 20 ms and the slot size 1.25 ms, resulting in 16 filter bank slots per frame and a number of bands for each slots that depends on the input sampling frequency and where the bands have a width of 400 Hz. So e.g. for an input sampling frequency of 48 kHz the frame length in samples is 960, the slot length is 60 samples and the number of filter bank samples per slot is also 60.

| Sampling frequency/kHz | Frame length/samples | Slot length/samples | Number of filter bank bands |
|---|---|---|---|
| 48 | 960 | 60 | 60 |
| 32 | 640 | 40 | 40 |
| 16 | 320 | 20 | 20 |
| 8 | 160 | 10 | 10 |

Even if each frame (and also each slot) may be encoded in the time domain, a band-by-band analysis may be performed. In examples, a plurality of bands is analyzed for each frame (or slot). For example, the filter bank may be applied to the time signal and the resulting sub-band signals may be analyzed. In some examples, the channel level and correlation information 220 is also provided in a band-by-band fashion. For example, for each band of the input signal 212 or downmix signal 246, an associated channel level and correlation information 220 (e.g. $C_y$ or an ICC matrix) may be provided. In some examples, the number of bands may be modified on the basis of the properties of the signal and/or of the requested bitrate, or of measurements on the current payload. In some examples, the more slots are needed, the less bands are used, to maintain a similar bitrate.

Since the slot size is smaller than the frame size (in time length), the slots may be opportunely used in case of transient in the original signal 212 detected within a frame: the encoder (and in particular the filterbank 214) may recognize the presence of the transient, signal its presence in the bitstream, and indicate, in the side information 228 of the bitstream 248, in which slot of the frame the transient has occurred. Further, the parameters of the channel level and correlation information 220, encoded in the side information 228 of the bitstream 248, may be accordingly associated only to the slots following the transient and/or the slot in which the transient has occurred. The decoder will therefore determine the presence of the transient and will associate the channel level and correlation information 220 only to the slots subsequent to the transient and/or the slot in which the transient has occurred (for the slots preceding the transient, the decoder will use the channel level and correlation information 220 for the previous frame). In FIG. 10*a*, no transient has occurred, and the parameters 220 encoded in the side information 228 may therefore be understood as being associated to the whole frame 920. In FIG. 10*b*, the transient has occurred at slot 932: therefore, the parameters 220 encoded in the side information 228 will refer to the slots 932, 933, and 934, while the parameters associated to the slot 931 will be assumed to be the same of the frame that has preceded the frame 930.

In view of the above, for each frame (or slot) and for each band, a particular channel level and correlation information 220 relating to the original signal 212 can be defined. For example, elements of the covariance matrix $C_y$ (e.g. covariances and/or levels) can be estimated for each band.

If the detection of a transient occurs while multiple frames are collectively associated to the same parameter, then it is possible to reduce the number of frames collectively associated to the same parameter, so as to increase the mixing quality.

FIG. 10*a* shows the frame 920 (here indicated as "normal frame") for which, in the original signal 212, eight bands are defined (the eight bands 1 . . . 8 are shown in ordinate, while the slots 921-924 are shown in abscissa). The parameters of the channel level and correlation information 220 may be in theory encoded, in the side information 228 of the bitstream 248, in a band-by-band fashion (e.g., there would be one covariance matrix for each original band). However, in order to reduce the amount of side information 228, the encoder may aggregate multiple original bands (e.g. consecutive bands), to obtain at least one aggregated band formed by multiple original bands. For example, in FIG. 10*a*, the eight original bands are grouped to obtain four aggregated bands (aggregated band 1 being associated to original band 1; aggregated band 2 being associated to original band 2; aggregated band 3 grouping original bands 3 and 5; aggregated band 4 grouping original bands 5 . . . 8). The matrices of covariance, correlation, ICCs, etc. may be associated to each of the aggregated bands. In some examples, what is encoded in the side information 228 of the bitstream 248, is parameters obtained from the sum (or average, or another linear combination) of the parameters associated to each aggregated band. Hence, the size of the side information 228 of the bitstream 248 is further reduced. In the following, "aggregated band" is also called "parameter band", as it refers to those bands used for determining the parameters 220.

FIG. 10*b* shows the frame 931 (subdivided into four consecutive slots 931-934, or in another integer number) in which a transient occurs. Here, the transient occurs in the second slot 932 ("transient slot"). In this case, the decoder may decide to refer the parameters of the channel level and correlation information 220 only to the transient slot 932 and/or to the subsequent slots 933 and 934. The channel level and correlation information 220 of the preceding slot 931 will not be provided: it has been understood that the channel level and correlation information of the slot 931 will in principle be particularly different from the channel level and correlation information of the slots, but will be probably be more similar to the channel level and correlation information of the frame preceding the frame 930. Accordingly, the decoder will apply the channel level and correlation information of the frame preceding the frame 930 to the slot 931, and the channel level and correlation information of frame 930 only to the slots 932, 933, and 934.

Since the presence and position of the slots 931 with the transient may be signaled (e.g. in 261, as shown later) in the side information 228 of the bitstream 248, a technique has been developed to avoid or reduce the increase of the size of the side information 228: the groupings between the aggregated bands may be changed: for example, the aggregated band 1 will now group the original bands 1 and 2, the aggregated band 2 grouping the original bands 3 . . . 8. Hence, the number of bands is further reduced with respect to the case of FIG. 10*a*, and the parameters will only be provided for two aggregated bands.

FIG. 6*a* shows the parameter estimation block (parameter estimator) 218 is capable of retrieving a certain number of channel level and correlation information 220.

FIG. 6*a* shows the parameter estimator 218 is capable of retrieving a certain number of parameter (channel level and correlation information 220), which may be the ICCs of the matrix 900 of FIGS. 9*a*-9*d*.

But, only a part of the estimated parameters is actually submitted to the bitstream writer 226 to encode the side information 228. This is because the encoder 200 may be configured to choose (at a determination block 250 not shown in FIGS. 1-5) whether to encode or not to encode at least part of the channel level and correlation information 220 of the original signal 212.

This is illustrated in FIG. 6*a* as a plurality of switches 254*s* which are controlled by a selection (command) 254 from the determination block 250. If each of the outputs 220 of the block parameter estimation 218 is an ICC of the matrix 900 of FIG. 9*c*, not the whole parameters estimated by the parameter estimation block 218 are actually encoded in the side information 228 of the bitstream 248: in particular, while the entries 908 (ICCs between the channels: R and L; C and L; C and R; RS and CS) are actually encoded, the entries 907 are not encoded (i.e. the determination block 250, which may be the same of that of FIG. 6*c*, may be seen as having opened the switches 254*s* for the non-encoded entries 907, but has closed the switches 254*s* for the entries 908 to be encoded in the side information 228 of the bitstream 248). It is noted that information 254' on which parameters have been selected to be encoded (entries 908) may be encoded (e.g., as a bitmap or other information on which entries 908 are encoded). In practice, the information 254' (which may for example be an ICC map) may include the indexes (schematized in FIG. 9*d*) of the encoded entries 908. The information 254' may be in form of a bitmap: e.g., the information 254' may be constituted by a fixed-length field, each position being associated to an index according to a predefined ordering, the value of each bit providing information on whether the parameter associated to that index is actually provided or not.

In general, the determination block 250 may choose whether to encode or not encode at least a part of the channel level and correlation information 220 (i.e. decide whether an entry of the matrix 900 is to be encoded or not), for example, on the basis of status information 252. The status information 252 may be based on a payload status: for example, in case of a transmission being highly loaded, it will be possible to reduce the amount of the side information 228 to be encoded in the bitstream 248. For example, and with reference to 9*c:*

- in case of high payload the number of entries 908 of the matrix 900 which are actually written in the side information 228 of the bitstream 248 is reduced;
- in case of lower payload, the number of entries 908 of the matrix 900 which are actually written in the side information 228 of the bitstream 248 is reduced.

Alternatively or additionally, metrics 252 may be evaluated to determine which parameters 220 are to be encoded in the side information 228 (e.g. which entries of the matrix 900 are destined to be encoded entries 908 and which ones are to be discarded). In this case, it is possible to only encode in the bitstream the parameters 220 (associated to more sensitive metrics, e.g. metrics which are associated to more perceptually significant covariance can be associated to entries to be chosen as encoded entries 908).

It is noted that this process may be repeated for each frame (or for multiple frames, in case of down-sampling) and for each band.

Accordingly, the determination block 250 may also be controlled, in addition to the status metrics, etc., by the parameter estimator 218, through the command 251 in FIG. 6*a*.

In some examples (e.g. FIG. 6*b*), the audio encoder may be further configured to encode, in the bitstream 248, current channel level and correlation information 220*t* as increment 220*k* in respect to previous channel level and correlation information 220(*t*−1). What is encoded by this bitstream writer 226 in the side information 228 may be an increment 220*k* associated to a current frame (or slot) with respect to a previous frame. This is shown in FIG. 6*b*. A current channel level and correlation information 220*t* is provided to a storage element 270 so that the storage element 270 stores the value current channel level and correlation information 220*t* for the subsequent frame. Meanwhile, the current channel level and correlation information 220*t* may be compared with the previously obtained channel level and correlation information 220(*t*−1). (This is shown in FIG. 6*b* as the subtractor 273). Accordingly, the result 220Δ of a subtraction may be obtained by the subtractor 273. The difference 220Δ may be used at the scaler 220*s* to obtain a relative increment 220*k* between the previous channel level and correlation information 220(*t*−1) and the current channel level and correlation information 220*t*. For example, if the present channel level and correlation information 220*t* is 10% greater than the previous channel level and correlation information 220(*t*−1), the increment 220 as encoded in the side information 228 by the bitstream writer 226 will indicate the information of the increment of the 10%. In some examples, instead of providing the relative increment 220*k*, simply the difference 220Δ may be encoded.

Figure 9A:
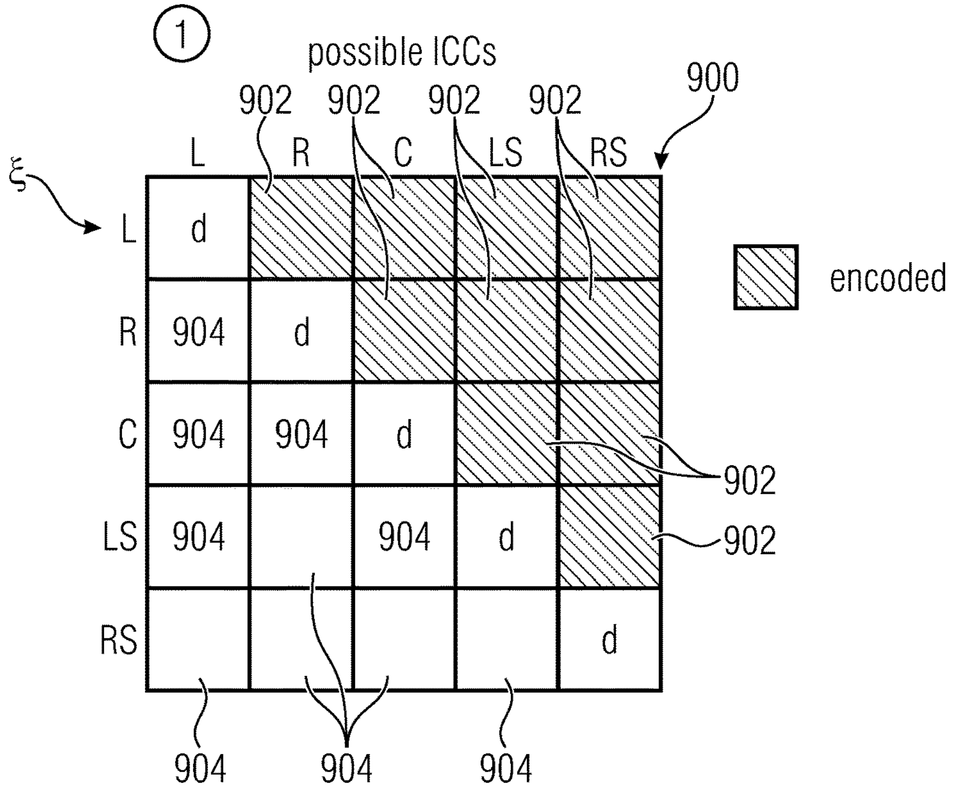
Figure 9B:
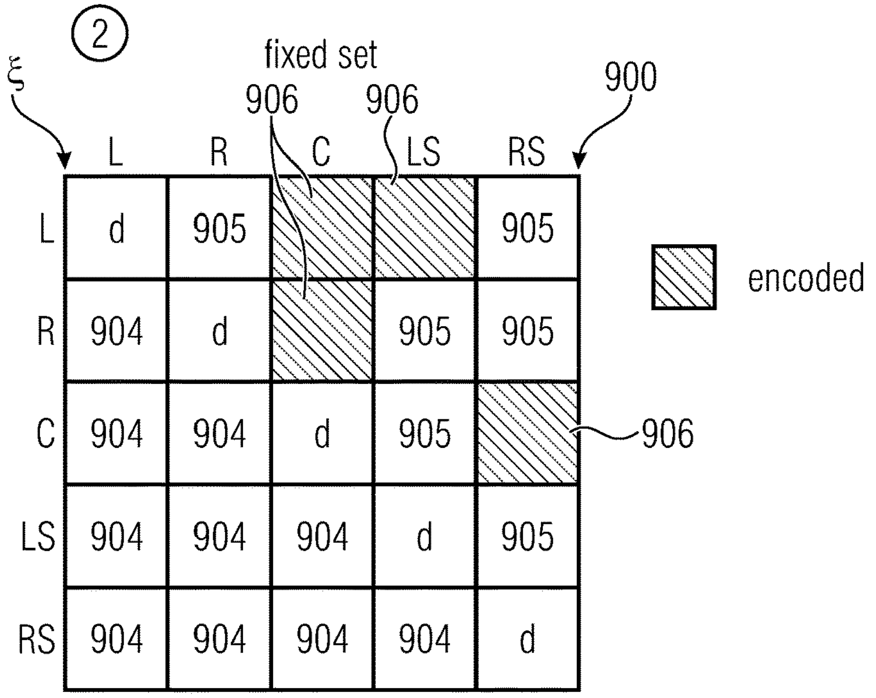
Figure 9C:
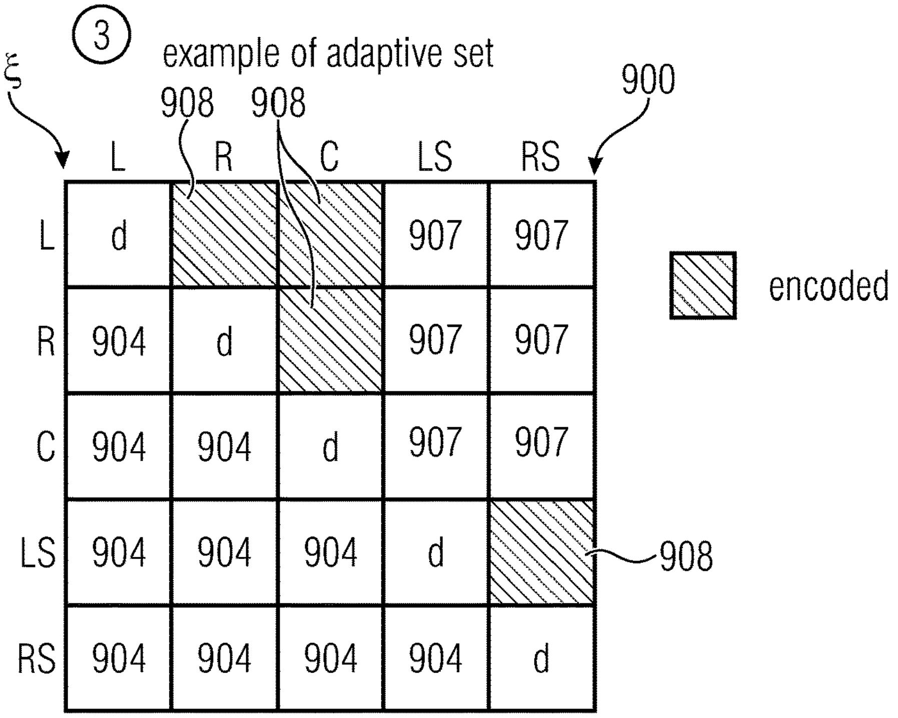

The choice of the parameters to be actually encoded, among the parameters such as ICC and ICLD as discussed above and below, may be adapted to the particular situation. For example, in some examples:

- for one first frame, only the ICCs 908 of FIG. 9*c* are selected to be encoded in the side information 228 of the bitstream 248, while the ICCs 907 are not encoded in the side information 228 of the bitstream 248;
- for a second frame, different ICCs are selected to be encoded, while different non-selected ICCs are non-encoded.

The same may be valid for slots and bands (and for different parameters, such as ICLDs). Hence, the encoder (and in particular block 250) may decide which parameter is to be encoded and which one is not to be encoded, thus adapting the selection of the parameters to be encoded to the particular situation (e.g., status, selection . . . ). A "feature for importance" may therefore be analyzed, so as to choose which parameter to encode and which not to encode. The feature for importance may be a metrics associated, for example, to results obtained in the simulation of operations performed by the decoder. For example, the encoder may simulate the decoder's reconstruction of the non-encoded covariance parameters 907, and the feature for importance may be a metrics indicating the absolute error between the non-encoded covariance parameters 907 and the same parameters as presumably reconstructed by the decoder. By measuring the errors in different simulation scenarios (e.g., each simulation scenario being associated to the transmission of some encoded covariance parameters 908 and the measurement of the errors affecting the reconstruction of the non-encoded covariance parameters 907), it is possible to determine the simulation scenario which is least affected by errors (e.g., the simulation scenario for which the metrics regarding all the errors in the reconstruction), so as to distinguish the covariance parameters 908 to be encoded from the covariance parameters 907 not to be encoded based on the least-affected simulation scenario. In the least-affected scenario, the non-selected parameters 907 are those which are most easily reconstructible, and the selected parameters 908 are tendentially those for which the metrics associated to the error would be greatest.

The same may be performed, instead of simulating parameters like ICC and ICLD, by simulating the decoder's reconstruction or estimation of the covariance, or by simulating mixing properties or mixing results. Notably, the simulation may be performed for each frame or for each slot, and may be made for each band or aggregated band.

An example may be simulating the reconstruction of the covariance using equation (4) or (6) (see below), starting from the parameters as encoded in the side information 228 of the bitstream 248. More in general, it is possible to reconstruct channel level and correlation information from the selected channel level and correlation information, thereby simulating the estimation, at the decoder (300), of non-selected channel level and correlation information (220, $C_y$), and to calculate error information between:

- the non-selected channel level and correlation information (220) as estimated by the encoder; and
- the non-selected channel level and correlation information as reconstructed by simulating the estimation, at the decoder (300), of non-encoded channel level and correlation information (220); and
- so as to distinguish, on the basis of the calculated error information:
  - properly-reconstructible channel level and correlation information; from
  - non-properly-reconstructible channel level and correlation information, so as to decide for:
- the selection of the non-properly-reconstructible channel level and correlation information to be encoded in the side information (228) of the bitstream (248); and
- the non-selection of the properly-reconstructible channel level and correlation information, thereby refraining from encoding in the side information (228) of the bitstream (248) the properly-reconstructible channel level and correlation information.

In general terms, the encoder may simulate any operation of the decoder and evaluate an error metrics from the results of the simulation.

In some examples, the feature for importance may be different (or comprise other metrics different) from the evaluation of a metrics associated to the errors. In some case, the feature for importance may be associated to a manual selection or based on an importance based on psychoacoustic criteria. For example, the most important couples of channels may be selected to be encoded (908), even without a simulation.

Now, some additional discussion is provided for explaining how the encoder may signal which parameters 908 are actually encoded in the side information 220 of the bitstream 248.

Figure 9D:
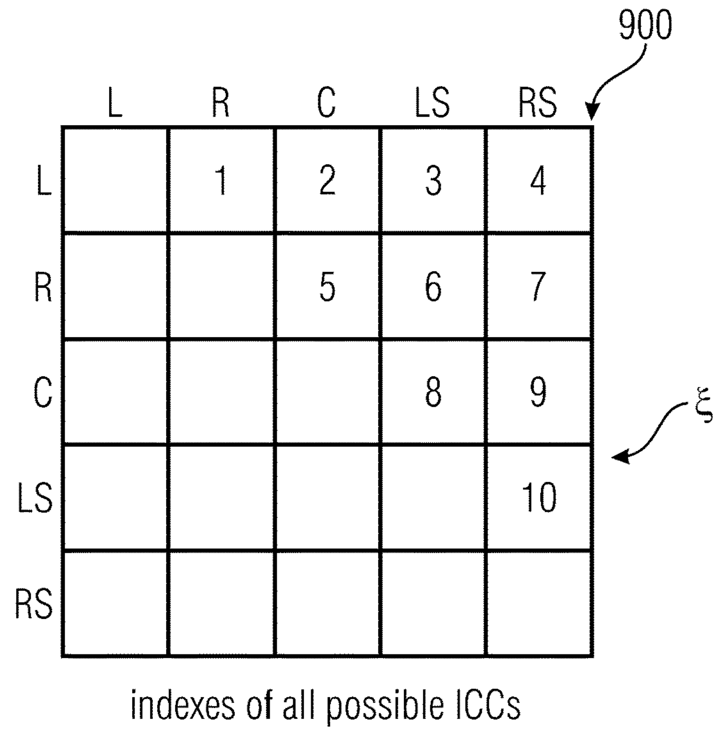

With reference to FIG. 9*d*, the parameters over the diagonal of an ICC matrix 900 are associated to ordered indexes 1 . . . 10 (the order being predetermined and known by the decoder). In FIG. 9*c* it is shown that the selected parameters 908 to be encoded are ICCs for the couples L-R, L-C, R-C, LS-RS, which are indexed by indexes 1, 2, 5, 10, respectively. Accordingly, in the side information 228 of the bitstream 248, also an indication of indexes 1, 2, 5, 10 will be provided (e.g., in the information 254' of FIG. 6*a*). Accordingly the decoder will understand that the four ICCs provided in the side information 228 of the bitstream 248 are L-R, L-C, R-C, LS-RS, by virtue of the information on the indexes 1, 2, 5, 10 also provided, by the encoder, in the side information 228. The indexes may be provided, for example, through a bitmap which associates the position of each bit in the bitmap to the predetermined. For example, to signal the indexes 1, 2, 5, 10, it is possible to write "1100100001" (in the field 254' of the side information 228), as the first, second, fifth, and tenth bits refer to indexes 1, 2, 5, 10 (other possibilities are at disposal of the skilled person). This is a so-called one-dimensional index, but other indexing strategies are possible. For example, a combinatorial number technique, according to which a number N is encoded (in the field 254' of the side information 228) which is univocally associate to a particular couple of channels (see also https://en.wikipedia.org/wiki/Combinatorial number system). The bitmap may also be called an ICC map when it refers to ICCs.

It is noted that in some cases, a non-adaptive (fixed) provision of the parameters is used. This means that, in the example of FIG. 6*a*, the choice 254 among the parameters to be encoded is fixed, and there is no necessity of indicating in field 254' the selected parameters. FIG. 9*b* shows an example of fixed provision of the parameters: the chosen ICCs are L-C, L-LS, R-C, C-RS, and there is no necessity of signaling their indices, as the decoder already knows which ICCs are encoded in the side information 228 of the bitstream 248.

In some cases, however, the encoder may perform a selection among a fixed provision of the parameters and an adaptive provision of the parameters. The encoder may signal the choice in the side information 228 of the bitstream 248, so that the decoder may know which parameters are actually encoded.

In some cases, at least some parameters may be provided without adaptation: for example:

- the ICDLs may be encoded in any case, without the necessity of indicating them in a bitmap; and
- the ICCs may be subjected to an adaptive provision.

The explanations regard each frame, or slot, or band. For a subsequent frame, or slot, or band, different parameters 908 are to be provided to the decoder, different indexes are associated to the subsequent frame, or slot, or band; and different selections (e.g., fixed vs adaptive) may be performed. FIG. 5 shows an example of a filter bank 214 of the encoder 200 which may be used for processing the original signal 212 to obtain the frequency domain signal 216. As can be seen from FIG. 5, the time domain (TD) signal 212 may be analyzed, by the transient analysis block 258 (transient detector). Further, a conversion into a frequency domain (FD) version 264 of the input signal 212, in multiple bands, is provided by filter 263 (which may implement, for example a Fourier filter, a short Fourier filter, a quadrature mirror, etc.). The frequency domain version 264 of the input signal 212 may be analyzed, for example, at band analysis block 267, which may decide (command 268) a particular grouping of the bands, to be performed at partition grouping block 265. After that, the FD signal 216 will be a signal in a reduced number of aggregated bands. The aggregation of bands has been explained above with respect to FIGS. 10*a* and 10*b*. The partition grouping block 267 may also be conditioned by the transient analysis performed by the transient analysis block 258. As explained above, it may be possible to further reduce the number of aggregated bands in case of transient: hence, information 260 on the transient may condition the partition grouping. In addition or in alternative, information 261 on the transient encoded in the side information 228 of the bitstream 248. The information 261, when encoded in the side information 228, may include, e.g., a flag indicating whether the transient has occurred (such as: "1", meaning "there was the transient in the frame" vs. "0", meaning: "there was no transient in the frame") and/or an indication of the position of the transient in the frame (such as a field indicating in which slot the transient had been observed). In some examples, when the information 261 indicates that there is no transient in the frame ("0"), no indication of the position of the transient is encoded in the side information 228, to reduce the size of the bitstream 248. Information 261 is also called "transient parameter", and is shown in FIGS. 2*d* and 6*b* as being encoded in the side information 228 of the bitstream 246.

In some examples, the partition grouping at block 265 may also be conditioned by external information 260', such as information regarding the status of the transmission (e.g. measurements associated to the transmissions, error rate, etc.). For example, the higher the payload (or the greater the error rate), the greater the aggregation (tendentially less aggregated bands which are wider), so as to have less amount of side information 228 to be encoded in the bitstream 248. The information 260' may be, in some examples, similar to the information or metrics 252 of FIG. 6*a*.

It is in general not feasible to send parameters for every band/slot combination, but the filter bank samples are grouped together over both a number of slots and a number of bands to reduce the number of parameter sets that are transmitted per frame. Along the frequency axis the grouping of the bands into parameter bands uses a non-constant division in parameter bands where the number of bands in a parameter bands is not constant but tries to follow a psychoacoustically motivated parameter band resolution, i.e. at lower bands the parameters bands contain only one or a small number of filter bank bands and for higher parameter bands a larger (and steadily increasing) number of filter bank bands is grouped into one parameter band.

So e.g. again for an input sampling rate of 48 kHz and the number of parameter bands set to 14 the following vector $grp_{14}$ describes the filter bank indices that give the band borders for the parameter bands (index starting at 0):

$$grp_{14}=[0,1,2,3,4,5,6,8,10,13,16,20,28,40,60]$$

Parameter band j contains the filter bank bands $[grp_{14}[j], grp_{14}[j+1][$

Note that the band grouping for 48 kHz can also be directly used for the other possible sampling rates by simply truncating it since the grouping both follows a psychoacoustically motivated frequency scale and has certain band borders corresponding to the number of bands for each sampling frequency (Table 1).

If a frame is non-transient or no transient handling is implemented, the grouping along the time axis is over all slots in a frame so that one parameter set is available per parameter band.

Still, the number of parameter sets would be to great, but the time resolution can be lower than the 20 ms frames (on average 40 ms). So, to further reduce the number of parameter sets sent per frame, only a subset of the parameter bands is used for determining and coding the parameters for sending in the bitstream to the decoder. The subsets are fixed and both known to the encoder and decoder. The particular subset sent in the bitstream is signalled by a field in the bitstream to indicate the decoder to which subset of parameter bands the transmitted parameters belong and the decoder than replaces the parameters for this subset by the transmitted ones (ICCs, ICLDs) and keeps the parameters from the previous frames (ICCS, ICLDs) for all parameter bands that are not in the current subset.

In an example the parameter bands may be divided into two subsets roughly containing half of the total parameter bands and continuous subset for the lower parameter bands and one continuous subset for the higher parameter bands. Since we have two subsets, the bitstream field for signalling the subset is a single bit, and an example for the subsets for 48 kHz and 14 parameter bands is:

$$s_{14}=[1,1,1,1,1,1,1,0,0,0,0,0,0,0]$$

Where $s_{14}[j]$ indicates to which subset parameter band j belongs.

It is noted that the downmix signal 246 may be actually encoded, in the bitstream 248, as a signal in the time domain: simply, the subsequent parameter estimator 218 will estimate the parameters 220 (e.g. $\xi_{i,j}$ and/or $\chi_i$) in the frequency domain (and the decoder 300 will use the parameters 220 for preparing the mixing rule (e.g. mixing matrix) 403, as will be explained below).

FIG. 2*d* shows an example of an encoder 200 which may be one of the preceding encoders or may include elements of the previously discussed encoders. A TD input signal 212 is input to the encoder and a bitstream 248 is output, the bitstream 248 including downmix signal 246 (e.g. as encoded by the core coder 247) and correlation and level information 220 encoded in the side information 228.

As can be seen from FIG. 2*d*, a filterbank 214 may be included (an example of filterbank is provided in FIG. 5). A frequency domain (FD) conversion is provided in a block 263 (frequency domain DMX), to obtain an FD signal 264 which is the FD version of the input signal 212. The FD signal 264 (also indicated with X) in multiple bands is obtained. The band/slot grouping block 265 (which may embody the grouping block 265 of FIG. 5) may be provided to obtain the FD signal 216 in aggregated bands. The FD signal 216 may be, in some examples, a version of the FD signal 264 in less bands. Subsequently, the signal 216 may be provided to the parameter estimator 218, which includes covariance estimation blocks 502, 504 (here shown as one single block) and, downstream, a parameter estimation and coding block 506, 510 (embodiments of elements 502, 504, 506, and 510 are shown in FIG. 6*c*). The parameter estimation encoding block 506, 510 may also provide the parameters 220 to be encoded in the side information 228 of the bitstream 248. A transient detector 258 (which may embody the transient analysis block 258 of FIG. 5) may find out the transients and/or the position of a transient within a frame (e.g. in which slot a transient has been identified). Accordingly, information 261 on the transient (e.g. transient parameter) may be provided to the parameter estimator 218 (e.g. to decide which parameters are to be encoded). The transient detector 258 may also provide information or commands (268) to the block 265, so that the grouping is performed by keeping into account the presence and/or the position of the transient in the frame.

FIGS. 3*a*, 3*b*, 3*c* show examples of audio decoders 300 (also called audio synthesizers). In examples, the decoders of FIGS. 3*a*, 3*b*, 3*c* may be the same decoder, only with some differences for avoiding different elements. In examples, the decoder 300 may be the same of those of FIGS. 1 and 4. In examples, the decoder 300 may also be the same device of the encoder 200.

The decoder 300 may be configured for generating a synthesis signal (336, 340, $y_R$) from a downmix signal x in TD (246) or in FD (314). The audio synthesizer 300 may comprise an input interface 312 configured for receiving the downmix signal 246 (e.g. the same downmix signal as encoded by the encoder 200) and side information 228 (e.g., as encoded in the bitstream 248). The side information 228 may include, as explained above, channel level and correlation information (220, 314), such as at least one of $\xi$,$\chi$, etc., or elements thereof (as will be explained below) of an original signal (which may be the original input signal 212, y, at the encoder side. In some examples, all the ICLDs ($\chi$) and some entries (but not all) 906 or 908 outside the diagonal of the ICC matrix 900 (ICCs or $\xi$ values) are obtained by the decoder 300.

The decoder 300 may be configured (e.g., through a prototype signal calculator or prototype signal computation module 326) for calculating a prototype signal 328 from the downmix signal (324, 246, x), the prototype signal 328 having the number of channels (greater than one) of the synthesis signal 336.

The decoder 300 may be configured (e.g., through a mixing rule calculator 402) for calculating a mixing rule 403 using at least one of:

- the channel level and correlation information (e.g. 314, $C_y$, $\xi$, $\chi$ or elements thereof) of the original signal (212, y); and
- covariance information (e.g. $C_x$ or elements thereof) associated with the downmix signal (324, 246, x).

The decoder 300 may comprise a synthesis processor 404 configured for generating the synthesis signal (336, 340, $y_R$) using the prototype signal 328 and the mixing rule 403.

The synthesis processor 404 and the mixing rule calculator 402 may be collected in one synthesis engine 334. In some examples, the mixing rule calculator 402 may be outside of the synthesis engine 334. In some examples, the mixing rule calculator 402 of FIG. 3*a* may be integrated with the parameter reconstruction module 316 of FIG. 3*b*.

The number of synthesis channels of the synthesis signal (336, 340, $y_R$) is greater than one (and in some cases is greater than two or greater than three) and may be greater, lower or the same of the number of original channels of the original signal (212, y), which is also greater than one (and in some cases is greater than two or greater than three). The number of channels of the downmix signal (246, 216, x) is at least one or two, and is less than the number the number of original channels of the original signal (212, y) and the number of synthesis channels of the synthesis signal (336, 340, $y_R$).

The input interface 312 may read an encoded bitstream 248 (e.g., the same bitstream 248 encoded by the encoder 200). The input interface 312 may be or comprise a bitstream reader and/or an entropy decoder. The bitstream 248 may encode, as explained above, the downmix signal (246, x) and side information 228. The side information 228 may contain, for example, the original channel level and correlation information 220, either in the form output by the parameter estimator 218 or by any of the elements downstream to the parameter estimator 218 (e.g. parameter quantization block 222, etc.). The side information 228 may contain either encoded values, or indexed values, or both. Even if the input interface 312 is not shown in FIG. 3*b* for the downmix signal (346, x), it may notwithstanding be applied also to the downmix signal, as in FIG. 3*a*. In some examples, the input interface 312 may quantize parameters obtained from the bitstream 248.

The decoder 300 may therefore obtain the downmix signal (246, x), which may be in the time domain. As explained, above, the downmix signal 246 may be divided into frames and/or slots (see above). In examples, a filterbank 320 may convert the downmix signal 246 in the time domain to obtain to a version 324 of the downmix signal 246 in the frequency domain. As explained above, the bands of the frequency-domain version 324 of the downmix signal 246 may be grouped in groups of bands. In examples, the same grouping performed for at the filterbank 214 (see above) may be carried out. The parameters for the grouping (e.g. which bands and/or how many bands are to be grouped . . . ) may be based, for example, on signalling by the partition grouper 265 or the band analysis block 267, the signalling being encoded in the side information 228.

The decoder 300 may include a prototype signal calculator 326. The prototype signal calculator 326 may calculate a prototype signal 328 from the downmix signal (e.g., one of the versions 324, 246, x), e.g., by applying a prototype rule (e.g., a matrix Q). The prototype rule may be embodied by a prototype matrix (Q) with a first dimension and a second dimension, wherein the first dimension is associated with the number of downmix channels, and the second dimension is associated with the number of synthesis channels. Hence, the prototype signal has the number of channels of the synthesis signal 340 to be finally generated.

The prototype signal calculator 326 may apply the so-called upmix onto the downmix signal (324, 246, x), in the sense that simply generates a version of the downmix signal (324, 246, x) in an increased number of channels (the number of channels of the synthesis signal to be generated), but without applying much "intelligence". In examples, the prototype signal calculator may 326 may simply apply a fixed, pre-determine prototype matrix (identified as "Q" in this document) to the FD version 324 of the downmix signal 246. In examples, the prototype signal calculator 326 may apply different prototype matrices to different bands. The prototype rule (Q) may be chosen among a plurality of prestored prototype rules, e.g. on the basis of the particular number of downmix channels and of the particular number of synthesis channels.

The prototype signal 328 may be decorrelated at a decorrelation module 330, to obtained a decorrelated version 332 of the prototype signal 328. However, in some examples, advantageously the decorrelation module 330 is not present, as the invention has been proved effective enough to permit its avoidance.

The prototype signal (in any of its versions 328, 332) may be input to the synthesis engine 334 (and in particular to the synthesis processor 404). Here, the prototype signal (328, 332) is processed to obtain the synthesis signal (336, $y_R$). The synthesis engine 334 (and in particular to the synthesis processor 404) may apply a mixing rule 403 (in some examples, discussed below, the mixing rules are two, e.g. one for a main component of the synthesis signal and one for a residual component). The mixing rule 403 may be embodied, for example, by a matrix. The matrix 403 may be generated, for example, by the mixing rule calculator 402, on the basis of the channel level and correlation information (314, such as $\xi$, $\chi$ or elements thereof) of the original signal (212, y).

The synthesis signal 336 as output by the synthesis engine 334 (and in particular by the synthesis processor 404) may be optionally filtered at a filterbank 338. In addition or in alternative, the synthesis signal 336 may be converted into the time domain at the filterbank 338. The version 340

(either in time domain, or filtered) of the synthesis signal 336 may therefore be used for audio reproduction (e.g. by loudspeakers).

In order to obtain the mixing rule (e.g., mixing matrix) 403, channel level and correlation information (e.g. $C_y$, $C_{y_R}$, etc.) of the original signal and covariance information (e.g. $C_x$) associated with the downmix signal, may be provided to the mixing rule calculator 402. For this goal, it is possible to make use of the channel level and correlation information 220, as encoded in the side information 228 by the encoder 200.

In some cases, however, for the sake of reducing the quantity of the information encoded in the bitstream 248, not all the parameters are encoded by the encoder 200 (e.g., not the whole channel level and correlation information of the original signal 212 and/or not the whole covariance information of the downmixed signal 246). Hence, some parameters 318 are to be estimated at the parameter reconstruction module 316.

The parameter reconstruction module 316 may be fed, for example, by at least one of:

- a version 322 of the downmix signal 246 (*x*), which may be, for example, a filtered version or a FD version of the downmix signal 246; and
- the side information 228 (including channel level and correlation information 228).

The side information 228 may include (as level and correlation information of the input signal) information associated with the correlation matrix $C_y$ of the original signal (212, y): in some case, however, not all the elements of the correlation matrix $C_y$ are actually encoded. Therefore, estimation and reconstruction techniques have been developed for reconstructing a version ($C_{y_R}$) of the correlation matrix $C_y$ (e.g., through intermediate steps which obtain an estimated version $\widehat{C_y}$).

The parameters 314 as provided to the module 316 may be obtained by the entropy decoder 312 (input interface) and may be, for example, quantized.

FIG. 3*c* shows an example of a decoder 300 which can be an embodiment of one of the decoders of FIGS. 1-3*b*. Here, the decoder 300 includes an input interface 312 represented by the demultiplexer. The decoder 300 outputs a synthesis signal 340 which may be, for example, in the TD (signal 340), to be played back by loudspeakers, or in the FD (signal 336). The decoder 300 of FIG. 3*c* may include a core decoder 347, which can also be part of the input interface 312. The core decoder 347 may therefore provide the downmix signal x, 246. A filterbank 320 may convert the downmix signal 246 from the TD to the FD. The FD version of the downmix signal x, 246 is indicated with 324. The FD downmix signal 324 may be provided to a covariance synthesis block 388. The covariance synthesis block 388 may provide the synthesis signal 336 (Y) in the FD. An inverse filterbank 338 may convert the audio signal 314 in its TD version 340. The FD downmix signal 324 may be provided to a band/slot grouping block 380. The band/slot grouping block 380 may perform the same operation that has been performed, in the encoder, by the partition grouping block 265 of FIGS. 5 and 2*d*. As the bands of the downmix signal 216 of FIGS. 5 and 2*d* had been, at the encoder, grouped or aggregated in few bands (with wide width), and the parameters 220 (ICCs, ICLDs) have been associated to the groups of aggregated bands, it is now useful to aggregate the decoded down mix signal in the same manner, each aggregated band to a related parameter. Hence, numeral 385 refers to the downmix signal $X_B$ after having been aggregated. It is noted the filter provides the unaggregted FD representation, so to be able to process the parameters in the same manner as in the encoder the band/slot grouping in the decoder (380) does the same aggregation over bands/slots as the encoder to provide the aggregated down mix $X_B$.

The band/slot grouping block 380 may also aggregate over different slots in a frame, so that the signal 385 is also aggregated in the slot dimension similar to the encoder. The band/slot grouping block 380 may also receive the information 261, encoded in the side information 228 of the bitstream 248, indicating the presence of the transient and, in case, also the position of the transient within the frame.

At covariance estimation block 384, the covariance $C_x$ of the downmix signal 246 (324) is estimated. The covariance $C_y$ is obtained at covariance computation block 386, e.g. by making use of equations (4)-(8) may be used for this purpose. FIG. 3*c* shows a "multichannel parameter", which may be, for example, the parameters 220 (ICCs and ICLDs). The covariances $C_y$ and $C_x$ are then provided to the covariance synthesis block 388, to synthesize the synthesis signal 388. In some examples, the blocks 384, 386, and 388 may embody, when taken together, both the parameter reconstruction 316, and the mixing will be calculated 402, and the synthesis processor 404 as discussed above and below.

4. Discussion

4.1 Overview

A novel approach of the present examples aims, inter alia, at performing the encoding and decoding of multichannel content at low bitrates (meaning equal or lower than 160 kbits/sec) while maintaining a sound quality as close as possible to the original signal and preserving the spatial properties of the multichannel signal. One capability of the novel approach is also to fit within the DirAC framework previously mentioned. The output signal can be rendered on the same loudspeaker setup as the input 212 or on a different one (that can be bigger or smaller in terms of loudspeakers). Also, the output signal can be rendered on loudspeakers using binaural rendering.

The current section will present an in-depth description of the invention and of the different modules that compose it.

The proposed system is composed of two main parts:

- The Encoder 200, that derives the parameters 220 from the input signal 212, quantizes them (at 222) and encodes them (at 226). The encoder 200 may also compute the down-mix signal 246 that will be encoded in the bitstream 248 (and maybe transmitted to the decoder 300).
- The Decoder 300, that uses the encoded (e.g. transmitted) parameters and a down-mixed signal 246 in order to produce a multichannel output whose quality is as close as possible to the original signal 212.

The FIG. 1 shows an overview of the proposed novel approach according to an example. Note that some examples will only use a subset of the building blocks shown in the overall diagram and discard certain processing blocks depending on the application scenario.

The input 212 (*y*) to the invention is a multichannel audio signal 212 (also referred as "multichannel stream") in the time domain or time-frequency domain (e.g., signal 216), meaning, for example, a set of audio signals that are produced or meant to be played by a set of loudspeakers.

The first part of the processing is the encoding part; from the multichannel audio signal, a so-called "down-mix" signal 246 will be computed (c.f. 4.2.6) along with a set of parameters, or side information, 228 (c.f. 4.2.2 & 4.2.3) that are derived from the input signal 212 either in the time domain or in the frequency domain. Those parameters will be encoded (c.f. 4.2.5) and, in case, transmitted to the decoder 300.

The down-mix signal 246 and the encoded parameters 228 may be then transmitted to a core coder and a transmission canal that links the encoder side and the decoder side of the process.

On the decoder side, the down-mixed signal is processed (4.3.3 & 4.3.4) and the transmitted parameters are decoded (c.f. 4.3.2). The decoded parameters will be used for the synthesis of the output signal using the covariance synthesis (c.f. 4.3.5) and this will lead to the final multichannel output signal in the time domain.

Before going into details, there are some general characteristics to establish, at least one of them being valid:

- The processing can be used with any loudspeaker setup. Keeping in mind that, when increasing the number of loudspeakers, the complexity of the process and the bits needed for encoding the transmitted parameters will increase as well.
- The whole processing may be done on a frame basis, i.e. the input signal 212 may be divided into frames that are processed independently. At the encoder side, each frame will generate a set of parameter that will be transmitted to the decoder side to be processed.
- A frame may also divided into slots; those slots present then statistical properties that couldn't be obtained at a frame scale. A frame can be divided for example in eight slots and each slots length would be equal to ⅛$^{th}$ of the frame length.

4.2 Encoder

The encoder's purpose is to extract appropriate parameters 220 to describe the multichannel signal 212, quantize them (at 222), encode them (at 226) as side information 228 and then, in case, transmit them to the decoder side. Here the parameters 220 and how they can be computed will be detailed.

A more detailed scheme of the encoder 200 can be found in FIGS. 2*a*-2*d*. This overview highlights the two main outputs 228 and 246 of the encoder.

The first output of the encoder 200 is the down-mix signal 228 that is computed from the multichannel audio input 212; the down-mixed signal 228 is a representation of the original multichannel stream (signal) on fewer channels than the original content (212). More information about its computation can be found in paragraph 4.2.6.

The second output of the encoder 200 is the encoded parameters 220 expressed as side information 228 in the bitstream 248; those parameters 220 are a key point of the present examples: they are the parameters that will be used to describe efficiently the multichannel signal on the decoder side. Those parameters 220 provide a good trade-off between quality and amount of bits needed to encode them in the bitstream 248. On the encoder side the parameter computation may be done in several steps; the process will be described in the frequency domain but can be carried as well in the time domain. The parameters 220 are first estimated from the multichannel input signal 212, then they may be quantized at the quantizer 222 and then they may be converted into a digital bit stream 248 as side information 228. More information about those steps can be found in paragraphs 4.2.2., 4.2.3 and 4.2.5.

4.2.1 Filter Bank & Partition Grouping

Filter banks are discussed for the encoder side (e.g., filterbank 214) or the decoder side (e.g. filterbanks 320 and/or 338).

The invention may make use of filter banks at various points during the process. Those filter banks may transform either a signal from the time domain to the frequency domain (the so called aggregated bands or parameter bands), in this case being referred as "analysis filter bank" or from the frequency to the time domain (e.g. 338), in this case being referred as "synthesis filter bank".

The choice of the filter bank has to match the performance and optimizations requirements desired but the rest of the processing can be carried independently from a particular choice of filter bank. For example, it is possible to use a filter bank based on quadrature mirror filters or a Short-Time Fourier transform based filter bank.

With reference to FIG. 5 output of the filter bank 214 of the encoder 200 will be a signal 216 in the frequency domain represented over a certain number of frequency bands (266 in respect to 264). Carrying the rest of the processing for all frequency bands (264) could be understood as providing a better quality and a better frequency resolution, but would also involve more important bitrates to transmit all the information. Hence, along with the filter bank process a so-called "partition grouping" (265) is performed, that corresponds to grouping some frequency together in order to represent the information 266 on a smaller set of bands.

For example, the output 264 of the filter 263 (FIG. 5) can be represented on 128 bands and the partition grouping at 265 can lead to a signal 266 (216) with only 20 bands. There are several ways to group bands together and one meaningful way can be for example, trying to approximate the equivalent rectangular bandwidth. The equivalent rectangular bandwidth is a type of psychoacoustically motivated band division that tries to model how the human auditive system processes audio events, i.e. the aim is to group the filterbanks in a way that is suited for the human hearing.

4.2.2 Parameter Estimation (e.g., Estimator 218)

Aspect 1: Use of Covariance Matrices to Describe and Synthetize Multichannel Content The parameter estimation at 218 is one of the main points of the invention; they are used on the decoder side to synthesize the output multichannel audio signal. Those parameters 220 (encoded as side information 228) have been chosen because they describe efficiently the multichannel input stream (signal) 212 and they do not require a large amount of data to be transmitted. Those parameters 220 are computed on the encoder side and are later used jointly with the synthesis engine on the decoder side to compute the output signal.

Here the covariance matrices may be computed between the channels of the multichannel audio signal and of the down-mixed signal. Namely:

- $C_y$: Covariance matrix of the multichannel stream (signal) and/or
- $C_x$: Covariance matrix of the down-mix stream (signal) 246

The processing may be carried on a parameter band basis, hence a parameter band is independent from another one and the equations can be described for a given parameter band without loss of generality.

For a given parameter band, the covariance matrices are defined as follows:

$$C_y=\Re\{Y_B Y_B{}^*\}$$

$$C_x=\Re\{X_B X_B{}^*\} \quad (1)$$

with $\Re$ Denoting the real part operator.

Instead of the real part it can be any other operation that results in a real value that has a relation to the complex value it is derived from (e.g. the absolute value)

* denoting the conjugate transpose operator

B denoting the relationship between the original number of bands and the grouped bands (C.f. 4.2.1. about partition grouping)

Y and X being respectively the original multichannel signal 212 and the down-mixed signal 246 in frequency domain $C_y$ (or elements thereof, or values obtained from $C_y$ or from elements thereof) are also indicated as channel level and correlation information of the original signal 212. $C_x$ (or elements thereof, or values obtained from $C_y$ or from elements thereof) are also indicated as covariance information associated with the downmix signal 212.

For a given frame (and band) only one or two covariance matrix(ces) $C_y$ and/or $C_x$ may be outputted e.g. by estimator block 218. The process being slot-based and not frame-based, different implementation can be carried regarding the relation between the matrices for a given slots and for the whole frame. As an example, it is possible to compute the covariance matrix(ces) for each slot within a frame and sum them in order to output the matrices for one frame. Note that the definition for computing the covariance matrices is the mathematical one, but it is also possible to compute, or at least, modify those matrices beforehand if it is wanted to obtain an output signal with particular characteristics.

As explained above, it is not necessary that all the elements of the matrix(ces) $C_y$ and/or $C_x$ are actually encoded in the side information 228 of the bitstream 248. For $C_x$ it is possible to simply estimate it from the downmix signal 246 as encoded by applying equation (1), and therefore the encoder 200 may easily refrain, tout-court, from encoding any element of $C_x$ (or more in general of covariance information on associated with the downmix signal). For $C_y$ (or for the channel level and correlation information associated to the original signal) it is possible to estimate, at the decoder side, at least one of the elements of $C_y$ by using techniques discussed below.

Aspect 2a: Transmission of the Covariance Matrices and/or Energies to Describe and Reconstruct a Multichannel Audio Signal As it's mentioned previously, covariance matrices are used for the synthesis. It is possible to transmit directly those covariance matrices (or a subset of it) from the encoder to the decoder. In some examples, the matrix $C_x$ does not have to be necessarily transmitted since it can be recomputed on the decoder side using the down-mixed signal 246, but depending on the application scenario, this matrix might be used as a transmitted parameter.

From an implementation point of view, not all the values in those matrices $C_x$, $C_y$ have to be encoded or transmitted, e.g. in order to meet certain specific requirements regarding bitrates. The non-transmitted values can be estimated on the decoder side (c.f. 4.3.2).

Aspect 2b: Transmission of Inter-Channel Coherences and Inter-Channel Level Differences to Describe and Reconstruct a Multichannel Signal From the covariance matrices $C_x$, $C_y$, an alternate set of parameters can be defined and used to reconstruct the multichannel signal 212 on the decoder side. Those parameters may be namely, for example, the Inter-channel Coherences (ICC) and/or Inter-channel Level Differences (ICLD). The Inter-channel coherences describe the coherence between each channel of the multichannel stream. This parameter may be derived from the covariance matrix $C_y$ and computed as follows (for a given parameter band and for two given channels i and j):

$$\xi_{i,j}=\frac{C_{y_{i,j}}}{\sqrt{C_{y_{i,i}}\cdot C_{y_{j,j}}}} \quad (2)$$

with $\xi_{i,j}$ The ICC between channels i and j of the input signal 212

$C_{y_{i,j}}$ The values in the Covariance matrix—previously defined in equation (1)—of the multichannel signal between channels i and j of the input signal 212

The ICC values can be computed between each and every channels of the multichannel signal, which can lead to large amount of data as the size of the multichannel signal grows. In practice, a reduced set of ICCs can be encoded and/or transmitted. The values encoded and/or transmitted have to be defined, in some examples, accordingly with the performance requirement.

For example, when dealing with a signal produced by a 5.1 (or 5.0) as defined loudspeaker setup as defined by the ITU recommendation "ITU-R BS.2159-4", it is possible to choose to transmit only four ICCs. Those four ICCs can be the one between:

The center and the right channel

The center and the left channel

The left and left surround channel

The right and right surround channel

In general, the indices of the ICCs chosen from the ICC matrix are described by the ICC map.

In general, for every loudspeaker setup a fixed set of ICCs that give on average the best quality can be chosen to be encoded and/or transmitted to the decoder. The number of ICCs, and which ICCs to be transmitted, can be dependent on the loudspeaker setup and/or the total bit rate available and are both available at the encoder and decoder without the need for transmission of the ICC map in the bit stream 248. In other words, a fixed set of ICCs and/or a corresponding fixed ICC map may be used, e.g. dependent on the loudspeaker setup and/or the total bit rate.

This fixed sets can be not suitable for specific material and produce, in some cases, significantly worse quality than the average quality for all material using a fixed set of ICCs. To overcome this in another example for every frame (or slot) an optimal set of ICCs and a corresponding ICC map can be estimated based on a feature for the importance of a certain ICC. The ICC map used for the current frame is then explicitly encoded and/or transmitted together with the quantized ICCs in the bit-stream 248.

For example the feature for the importance of an ICC can be determined by generating the estimation of the Covariance $\widehat{C_y}$ or the estimation of the ICC matrix $\widehat{\xi_{i,j}}$ using the downmix Covariance $C_x$ from Equation (1) analogous to the decoder using Equations (4) and (6) from 4.3.2. Dependent on the chosen feature the feature is computed for every ICC or corresponding entry in the Covariance matrix for every band for which parameters will be transmitted in the current frame and combined for all bands. This combined feature matrix is then used to decide the most important ICCs and therefore the set of ICCs to be used and the ICC map to be transmitted.

For example the feature for the importance of an ICC is the absolute error between the entries of the estimated Covariance $\widehat{C_y}$ and the real Covariance $C_y$ and the combined feature matrix is the sum for the absolute error for every ICC over all bands to be transmitted in the current frame. From the combined feature matrix, the n entries are chosen where the summed absolute error is the highest and n is the number of ICCs to be transmitted for the loudspeaker/bit-rate combination and the ICC map is built from these entries.

Furthermore, in another example as in FIG. 6*b*, to avoid too much changing of ICC maps between frames, the feature matrix can be emphasized for every entry that was in the chosen ICC map of the previous parameter frame, for example in the case of the absolute error of the Covariance by applying a factor >1 (220*k*) to the entries of the ICC map of the previous frame. Furthermore, in another example, a flag sent in the side information 228 of the bitstream 248 may indicate if the fixed ICC map or the optimal ICC map is used in the current frame and if the flag indicates the fixed set then the ICC map is not transmitted in the bit stream 248.

The optimal ICC map is, for example, encoded and/or transmitted as a bit map (e.g. the ICC map may embody the information 254' of FIG. 6*a*).

Another example for transmitting the ICC map is transmitting the index into a table of all possible ICC maps, where the index itself is, for example, additionally entropy coded. For example, the table of all possible ICC maps is not stored in memory but the ICC map indicated by the index is directly computed from the index.

A second parameter that may be transmitted jointly with the ICC (or alone) is the ICLDs. "ICLD" stands for Inter-channel level difference and it describe the energy relationships between each channel of the input multichannel signal 212. There is not a unique definition of the ICLD; the important aspect of this value is that it described energy ratios within the multichannel stream. As an example, the conversion from $C_y$ to ICLDs can be obtained as follows:

$$\chi_i = 10 \cdot \log_{10}\left(\frac{P_i}{P_{dmx,i}}\right) \tag{3}$$

with:

$\chi_i$ The ICLD for channel i.

$P_i$ The power of the current channel i, it can be extracted from $C_y$'s diagonal: $P_{i,i}$.

$P_{dmx,i}$ Depends on the channel i but will be a linear combination of the values in $C_x$, it also depends on the original loudspeaker setup.

In examples $P_{dmx,i}$ is not the same for every channel, but depends on a mapping related to the downmix matrix (which is also the prototype matrix for the decoder), this is mentioned in general in one of the bullet points under equation (3). Depending if the channel i is down-mixed only into one of the downmix channels or to more than one of them. In other words, $P_{dmx,i}$ may be or include the sum over all diagonal elements of $C_x$ where there is a non-zero element in the downmix matrix, so equation (3) could be rewritten as:

$$\chi_i = 10 \cdot \log_{10}\left(\frac{P_i}{P_{dmx,i}}\right)$$

$$P_{dmx,i} = \alpha_i \sum_j C_{x_{j,j}},\ j \in \{Q_{j,i} \neq 0\}$$

$$P_i = C_{y_{i,i}}$$

where $\alpha_i$ is a weighting factor related to the expected energy contribution of a channel to the downmix, this weighting factor being fixed for a certain input loudspeaker configuration and known both at encoder and decoder. The notion of the matrix Q will be provided below. Some values of $\alpha_i$ and matrices Q are also provided at the end of the document.

In case of an implementation defining a mapping for every input channel i where the mapping index either is the channel j of the downmix the input channel i is solely mixed to or if the mapping index is greater than the number of downmix channels. So, we have a mapping index $m_{ICLD,i}$ which is used to determine $P_{dmx,i}$ in the following manner:

$$P_{dmx,i} = \begin{cases} \alpha_i C_{x_{m_{ICLD,i},m_{ICLD,i}}},\ m_{ILD,i} \leq n_{DMX} \\ \alpha_i \sum_{j=1}^{n_{DMX}} C_{x_{j,j}},\ m_{ICLD,i} > n_{DMX} \end{cases}$$

4.2.3 Parameter Quantization

Examples of quantization of the parameters 220, to obtain quantization parameters 224, may be performed, for example, by the parameter quantization module 222 of FIGS. 2*b* and 4.

Once the set of parameters 220 is computed, meaning either the covariance matrices $\{C_x, C_y\}$ or the ICCs and ICLDs $\{\xi,\chi\}$, they are quantized. The choice of the quantizer may be a trade-off between quality and the amount of data to transmit but there is no restriction regarding the quantizer used.

As an example, in the case the ICCs and ICLDs are used; one could a nonlinear-quantizer involving 10 quantization steps in the interval [−1,1] for the ICCs and another nonlinear quantizer involving 20 quantization steps in the interval [−30,30] for the ICLDs.

Also, as an implementation optimization, it is possible to choose to down-sample the transmitted parameters, meaning the quantized parameters 224 are used two or more frames in a row.

In an aspect, the subset of parameters transmitted in the current frame is signaled by a parameter frame index in the bit stream.

4.2.4 Transient Handling, Down-Sampled Parameters

Some examples discussed here below may be understood as being shown in FIG. 5, which in turn may be an example of the block 214 of FIGS. 1 and 2*d*.

In the case of down-sampled parameter sets (e.g. as obtained at block 265 in FIG. 5), i.e. a parameter set 220 for a subset of parameter bands may be used for more than one processed frame, transients that appear in more than one subset can be not preserved in terms of localization and coherence. Therefore, it may be advantageous to send the parameters for all bands in such a frame. This special type of parameter frame can for example be signaled by a flag in the bit stream.

In an aspect, a transient detection at 258 is used to detect such transients in the signal 212. The position of the transient in the current frame may also be detected. The time granularity may be favorably linked to the time granularity of the used filter bank 214, so that each transient position may correspond to a slot or a group of slots of the filter bank 214. The slots for computing the covariance matrices $C_y$ and $C_x$ are then chosen based on the transient position, for example using only the slots from the slot containing the transient to the end of the current frame.

The transient detector (or transient analysis block 258) may be a transient detector also used in the coding of the down-mixed signal 212, for example the time domain transient detector of an IVAS core coder. Hence, the example of FIG. 5 may also be applied upstream to the downmix computation block 244.

In an example the occurrence of a transient is encoded using one bit (such as: "1", meaning "there was the transient in the frame" vs. "0", meaning: "there was no transient in the frame"), and if a transient is detected additionally the position of the transient is encoded and/or transmitted as encoded field 261 (information on the transient) in the bit stream 248 to allow for a similar processing in the decoder 300.

If a transient is detected and transmitting of all bands is to be performed (e.g., signaled), sending the parameters 220 using the normal partition grouping could result in a spike in the data rate needed for the transmission of the parameters 220 as side information 228 in the bitstream 248. Furthermore the time resolution is more important than the frequency resolution. It may therefore be advantageous, at block 265, to change the partition grouping for such a frame to have less bands to transmit (e.g. from many bands in the signal version 264 to less bands in the signal version 266). An example employs such a different partition grouping, for example by combining two neighboring bands over all bands for a normal down-sample factor of 2 for the parameters. In general terms, the occurrence of a transient implies that the Covariance matrices themselves can be expected to vastly differ before and after the transient. To avoid artifacts for slots before the transient, only the transient slot itself and all following slots until the end of the frame may be considered. This is also based on the assumption that the beforehand the signal is stationary enough and it is possible to use the information and mixing rules that where derived for the previous frame also for the slots preceding the transient.

Summarizing, the encoder may be configured to determine in which slot of the frame the transient has occurred, and to encode the channel level and correlation information (220) of the original signal (212, y) associated to the slot in which the transient has occurred and/or to the subsequent slots in the frame, without encoding channel level and correlation information (220) of the original signal (212, y) associated to the slots preceding the transient.

Analogously, the decoder may (e.g. at the block 380), when the presence and the position of the transient in one frame is signalled (261):

associate the current channel level and correlation information (220) to the slot in which the transient has occurred and/or to the subsequent slots in the frame; and associate, to the frame's slot preceding the slot in which the transient has occurred, the channel level and correlation information (220) of the preceding slot.

Another important aspect of the transient is that, in case of the determination of the presence of a transient in the current frame, smoothing operations are not performed anymore for the current frame. In case of a transient no smoothing is done for $C_y$ and $C_x$ but $C_{y_R}$ and $C_x$ from the current frame are used in the calculation of the mixing matrices.

4.2.5 Entropy Coding

The entropy coding module (bitstream writer) 226 may be the last encoder's module; its purpose is to convert the quantized values previously obtained into a binary bit stream that will also be referred as "side information".

The method used to encode the values can be, as an example, Huffmann coding [6] or delta coding. The coding method is not crucial and will only influence final bitrate; one should adapt the coding method depending on the bitrates he wants to achieve.

Several implementation optimizations can be carried out to reduce the size of the bitstream 248. As an example, a switching mechanism can be implemented, that switch from one encoding scheme to the other depending on which is more efficient from a bitstream size point of view.

For example the parameters may be delta coded along the frequency axis for one frame and the resulting sequence of delta indices entropy coded by a range coder.

Also, in the case of the parameter down-sampling, also as an example, a mechanism can be implemented to transmit only a subset of the parameter bands every frame in order to continuously transmit data.

Those two examples need signalization bits to signal the decoder specific aspect of the processing on the encoder side.

4.2.6 Down-mix Computation

The down-mix part 244 of the processing may be simple yet, in some examples, crucial. The down-mix used in the invention may be a passive one, meaning the way it is computed stays the same during the processing and is independent of the signal or of its characteristics at a given time. Nevertheless, it has been understood that the down-mix computation at 244 can be extended to an active one (for example as described in [7]).

The down-mix signal 246 may be computed at two different places:

The first time for the parameter estimation (see 4.2.2) at the encoder side, because it may be needed (in some examples) for the computation of the covariance matrix $C_x$.

The second time at the encoder side, between the encoder 200 and the decoder 300 (in the time domain), the down-mixed signal 246 being encoded and/or transmitted to the decoder 300 and used a basis for the synthesis at module 334.

As an example, in case of a stereophonic down-mix for a 5.1 input, the down-mix signal can be computed as follows:

- The left channel of the down-mix is the sum of left channel, the left surround channel and the center channel.

The right channel of the down-mix is the sum of the right channel, the right surround channel and the center channel. Or in the case of a monophonic down-mix for a 5.1 input, the down-mix signal is computed as the sum of every channel of the multichannel stream.

In examples, each channel of the downmix signal 246 may be obtained as a linear combination of the channels of the original signal 212, e.g. with constant parameters, thereby implementing a passive downmix.

The down-mixed signal computation can be extended and adapted for further loudspeaker setups according to the need of the processing.

Aspect 3: Low Delay Processing Using a Passive Down-Mix and a Low-Delay Filter Bank The present invention can provide low delay processing by using a passive down mix, for example the one described previously for a 5.1 input, and a low delay filter bank. Using those two elements, it is possible to achieve delays lower than 5 milliseconds between the encoder 200 and the decoder 300.

4.3 Decoder

The decoder's purpose is to synthesize the audio output signal (336, 340, $y_R$) on a given loudspeaker setup by using the encoded (e.g. transmitted) downmix signal (246, 324) and the coded side information 228. The decoder 300 can render the output audio signals (334, 240, $y_R$) on the same loudspeaker setup as the one used for the input (212, y) or on a different one. Without loss of generality it will be assumed that the input and output loudspeakers setups are the same (but in examples they may be different). In this section, different modules that may compose the decoder 300 will be described.

The FIGS. 3*a* and 3*b* depict a detailed overview of possible decoder processing. It is important to note that at least some of the modules (in particular the modules with dashed border such as 320, 330, 338) in FIG. 3*b* can be discarded depending the needs and requirement for a given application. The decoder 300 may be input by (e.g. receive) two sets of data from the encoder 200:

- The side information 228 with coded parameters (as described in 4.2.2)
- The down-mixed signal (246, y), which may be in the time domain (as described in 4.2.6).

The coded parameters 228 may need to be first decoded (e.g. by the input unit 312), e.g. with the inverse coding method that was previously used. Once this step is done, the relevant parameters for the synthesis can be reconstructed, e.g. the covariance matrices. In parallel, the down-mixed signal (246, x) may be processed through several modules: first an analysis filter bank 320 can be used (c.f. 4.2.1) to obtain a frequency domain version 324 of the downmix signal 246. Then the prototype signal 328 may be computed (c.f. 4.3.3) and an additional decorrelation step (at 330) can be carried (c.f. 4.3.4). A key point of the synthesis is the synthesis engine 334, which uses the covariance matrices (e.g. as reconstructed at block 316) and the prototype signal (328 or 332) as input and generates the final signal 336 as an output (c.f. 4.3.5). Finally, a last step at a synthesis filter bank 338 may be done (e.g. if the analysis filter bank 320 was previously used) that generates the output signal 340 in the time domain.

4.3.1 Entropy Decoding (e.g. Block 312)

The entropy decoding at block 312 (input interface) may allow obtaining the quantized parameters 314 previously obtained in 4. The decoding of the bit stream 248 may be understood as a straightforward operation; the bit stream 248 may be read according to the encoding method used in 4.2.5 and then decode it.

From an implementation point of view, the bit stream 248 may contain signaling bits that are not data but that indicates some particularities of the processing on the encoder side.

For example, the two first bits used can indicate which coding method has been used in case the encoder 200 has the possibility to switch between several encoding methods. The following bit can be also used to describe which parameters bands are currently transmitted.

Other information that can be encoded in the side information of the bitstream 248 may include a flag indicating a transient and the field 261 indicating in which slot of a frame a transient is occurred.

4.3.2 Parameter Reconstruction

Parameter reconstruction may be performed, for example, by block 316 and/or the mixing rule calculator 402.

A goal of this parameter reconstruction is to reconstruct the covariance matrices $C_x$ and $C_y$ (or more in general covariance information associated to the downmix signal 246 and level and correlation information of the original signal) from the down-mixed signal 246 and/or from side information 228 (or in its version represented by the quantized parameters 314). Those covariance matrices $C_x$ and $C_y$ may be mandatory for the synthesis because they are the ones that efficiently describe the multichannel signal 246.

The parameter reconstruction at module 316 may be a two-step process:

- first, the matrix $C_x$ (or more in general the covariance information associated to the downmix signal 246) is recomputed from the down-mix signal 246 (this step may be avoided in the cases in which the covariance information associated to the downmix signal 246 is actually encode in the side information 228 of the bitstream 248); and
- then, the matrix $C_y$ (or more in general the level and correlation information of the original signal 212) can be restored, e.g. using at least partially the transmitted parameters and $C_x$ or more in general the covariance information associated to the downmix signal 246 (this step may be avoided in the cases in which the level and correlation information of the original signal 212 is actually encoded in the side information 228 of the bitstream 248).

It is noted that, in some examples, for each frame it is possible to smooth the covariance matrix $C_x$ of the current frame using a linear combination with a reconstructed covariance matrix of the preceding the current frame, e.g. by addition, average, etc. For example, at the $t^{th}$ frame, the final covariance to be used for equation (4) may keep into account the target covariance reconstructed for the preceding frame, e.g.

$$C_{x,t}=C_{x,t}+C_{x,t-1}.$$

However, in case of the determination of the presence of a transient in the current frame, smoothing operations are not performed anymore for the current frame. In case of a transient no smoothing is done $C_x$ from the current frame is used.

An overview of the process can be found below.

Note: As for the encoder, the processing here may be done on a parameter band basis independently for each band, for clarity reasons the processing will be described for only one specific band and the notation adapted accordingly.

Aspect 4a: Reconstruction of Parameters in Case the Covariance Matrices are Transmitted For this aspect, it is assumed that the encoded (e.g. transmitted) parameters in the side information 228 (covariance matrix associated to the downmix signal 246 and channel level and correlation information of the original signal 212) are the covariance matrices (or a subset of it) as defined in aspect 2a. However, in some examples, the covariance matrix associated to the downmix signal 246 and/or the channel level and correlation information of the original signal 212 may be embodied by other information.

If the complete covariance matrices $C_x$ and $C_y$ are encoded (e.g. transmitted), there is no further processing to do at block 318 (and block 318 may therefore be avoided in such examples). If only a subset of at least one of those matrices is encoded (e.g. transmitted), the missing values have to be estimated. The final covariance matrices as used in the synthesis engine 334 (or more in particular in the synthesis processor 404) will be composed of the encoded (e.g. transmitted) values 228 and the estimated ones on the decoder side. For example, if only some elements of the matrix $C_y$ are encoded in the side information 228 of the bitstream 248, the remaining elements of $C_y$ are here estimated.

For the covariance matrix $C_x$ of the down-mixed signal 246, it is possible to compute the missing values by using the down-mixed signal 246 on the decoder side and apply equation (1).

In an aspect where the occurrence and position of a transient is transmitted or encoded the same slots for computing the covariance matrix $C_x$ of the down-mixed signal 246 are used as in the encoder side.

For the covariance matrix $C_y$, missing values can be computed, in a first estimation, as the following:

$$\widehat{C_y} = QC_xQ^* \tag{4}$$

With:

- $\widehat{C_y}$ an estimate of the covariance matrix of the original signal 212 (it is example of estimated version of the original channel level and correlation information)
- Q the so-called prototype matrix (prototype rule, estimating rule) that describes the relationship between the down-mixed and the original signal (c.f. 4.3.3) (it is an example of prototype rule)
- $C_x$ the covariance matrix of the down-mix signal (it is example of covariance information of the downmix signal 212)
- * denotes the conjugate transpose Once those steps are done, the covariance matrices are obtained again and can be used for the final synthesis.

Aspect 4b: Reconstruction of Parameters in Case the ICCs and ICLDs were Transmitted For this aspect, it may be assumed that the encoded (e.g. transmitted) parameters in the side information 228 are the ICCs and ICLDs (or a subset of them) as defined in aspect 2b.

In this case, it may be first needed to re-compute the covariance matrix $C_x$. This may be done using the down-mixed signal 212 on the decoder side and applying equation (1).

In an aspect where the occurrence and position of a transient is transmitted the same slots for computing the covariance matrix $C_x$ of the down-mixed signal are uses as in the encoder. Then, the covariance matrix $C_y$ may be recomputed from the ICCs and ICLDs; this operation may be carried as follows:

The energy (also known as level) of each channel of the multichannel input may be obtained. Those energies are derived using the transmitted ICLDs and the following formula $$P_i = P_{dmx,i} \cdot 10^{\frac{\chi_i}{10}} \tag{5}$$

where $$P_{dmx,i} = \alpha_i \sum_j C_{x_{j,j}},\ j \in \{Q_{j,i} \neq 0\}$$

$$P_i = C_{y_{i,i}}$$

where $\alpha_i$ is the weighting factor related to the expected energy contribution of a channel to the downmix, this weighting factor being fixed for a certain input loudspeaker configuration and known both at encoder and decoder. In case of an implementation defining a mapping for every input channel i where the mapping index either is the channel j of the downmix the input channel i is solely mixed to or if the mapping index is greater than the number of downmix channels. So, we have a mapping index $m_{ICLD,i}$ which is used to determine $P_{dmx,i}$ in the following manner:

$$P_{dmx,i} = \begin{cases} \alpha_i C_{x_{m_{ICLD,i},m_{ICLD,i}}},\ m_{ILD,i} \leq n_{DMX} \\ \alpha_i \sum_{j=1}^{n_{DMX}} C_{x_{j,j}},\ m_{ICLD,i} > n_{DMX} \end{cases}$$

The notations are the same as those used in the parameter estimation in 4.2.3.

Those energies may be used to normalize the estimated $C_y$. In the case not all the ICCs are transmitted from the encoder side, an estimate of $C_y$ may be computed for the non-transmitted values. The estimated covariance matrix $\widehat{C_y}$ may be obtained with the prototype matrix Q and the covariance matrix $C_x$ using equation (4).

This estimate of the covariance matrix leads to an estimate of the ICC matrix, for which the term of the index (i,j) may be given by:

$$\widehat{\xi_{i,j}} = \frac{\widehat{C_{y_{i,j}}}}{\sqrt{\widehat{C_{y_{i,i}}}\widehat{C_{y_{j,j}}}}} \tag{6}$$

Thus, the "reconstructed" matrix may be defined as follows:

$$\xi_{R_{i,j}} = \begin{cases} \xi_{i,j} \text{ if } (i, j) \in \{\text{transmitted indices}\} \\ \text{or } \widehat{\xi_{i,j}} \text{ else} \end{cases}. \tag{7}$$

Where:

The subscript R indicates the reconstructed matrix (which is an example of reconstructed version of the original level and correlation information)

The ensemble {transmitted indices} corresponds to all the (i,j) pairs that have been decoded (e.g. transmitted from the encoder to the decoder) in the side information 228.

In examples, $\xi_{i,j}$ may be used instead of $\widehat{\xi_{i,j}}$, by virtue of $\widehat{\xi_{i,j}}$ being less accurate than the encoded value $\xi_{i,j}$.

Finally, from this reconstructed ICC matrix, the reconstructed covariance matrix can be deduced $C_{y_R}$. This matrix may be obtained by applying the energies obtained in equation (5) to the reconstructed ICC matrix, hence for the indices(i,j):

$$C_{yR_{i,j}} = \xi_{R_{i,j}} \cdot \sqrt{P_i \cdot P_j} \tag{8}$$

In case the full ICC matrix is transmitted, only equations (5) and (8) are needed. The previous paragraphs depict one approach to reconstruct the missing parameters, other approaches can be used and the proposed method is not unique.

From the example in aspect 1 b using a 5.1 signal, it can be noted that the values that are not transmitted are the values that need to be estimated on the decoder side.

The covariance matrices $C_x$ and $C_{y_R}$ may now obtained. It is important to remark that the reconstructed matrix $C_{y_R}$ can be an estimate of the covariance matrix $C_y$ of the input signal 212. The trade-off of the present invention may be to have the estimate of the covariance matrix on the decoder side close-enough to the original but also transmit as few parameters as possible. Those matrices may be mandatory for the final synthesis that is depicted in 4.3.5.

It is noted that, in some examples, for each frame it is possible to smooth the reconstructed covariance matrix of the current frame using a linear combination with a reconstructed covariance matrix of the preceding the current frame, e.g. by addition, average, etc. For example, at the $t^{th}$ frame, the final covariance to be used for the synthesis may keep into account the target covariance reconstructed for the preceding frame, e.g.

$$C_{y,t} = C_{yR_t} + C_{yR_{t-1}}$$

However, in case of a transient no smoothing is done and $C_{y_R}$ is for the current frame is used in the calculation of the mixing matrices.

It is also noted that, some examples, for each frame the non-smoothed covariance matrix of the downmix channels $C_x$ is used for the parameter reconstruction while a smoothed covariance matrix $C_{x,t}$ as described in section 4.2.3 is used for the synthesis.

FIG. 8*a* resumes the operation for obtaining the covariance matrices $C_x$ and $C_{y_R}$ at the decoder 300 (e.g., as performed at blocks 386 or 316 . . . ). In the blocks of FIG. 8*a*, between brackets, there is also indicated the equation that is adopted by the particular block. As can be seen, the covariance estimator 384, through equation (1), permits to arrive at the covariance $C_x$ of the downmix signal 324 (or at its reduced-band version 385). The first covariance block estimator 384', by using equation (4) and the proper type rule Q, permits to arrive at the first estimate $\widehat{C_y}$ of the covariance $C_y$. Subsequently, a covariance-to-coherence block 390, by applying the equation (6), obtains the coherences $\xi$. Subsequently, an ICC replacement block 392, by adopting equation (7), chooses between the estimated ICCs ($\xi$) and the ICC signalled in the side information 228 of the bitstream 348. The chosen coherences $\xi_R$ are then input to an energy application block 394 which applies energy according to the ICLD ($\chi_i$). Then, the target covariance matrix $C_{y_R}$ is provided to the mixer rule calculator 402 or the covariance synthesis block 388 of FIG. 3*a*, or the mixer rule calculator of FIG. 3*c* or a synthesis engine 344 of FIG. 3*b*.

4.3.3 Prototype Signal Computation (Block 326)

A purpose of the prototype signal module 326 is to shape the down-mix signal 212 (or its frequency domain version 324) in a way that it can be used by the synthesis engine 334 (see 4.3.5). The prototype signal module 326 may performing an upmixing of the downmixed signal. The computation of the prototype signal 328 may be done by the prototype signal module 326 by multiplying the down-mixed signal 212 (or 324) by the so-called prototype matrix Q:

$$Y_p = XQ \tag{9}$$

With

Q the prototype matrix (which is an example of prototype rule)

X the down-mixed signal (212 or 324)

$Y_p$ the prototype signal (328).

The way the prototype matrix is established may be processing-dependent and may be defined so as to meet the requirement of the application. The only constraint may be that the number of channels of the prototype signal 328 has to be the same as the desired number of output channels; this directly constraint the size of the prototype matrix. For example, Q may be a matrix having the number of lines which is the number of channels of the downmix signal (212, 324) and the number of columns which is the number of channels of the final synthesis output signal (332, 340).

As an example, in the case of 5.1 or 5.0 signals, the prototype matrix can be established as follows:

$$Q = \begin{pmatrix} 1 & 0 & \sqrt{2} & 1 & 0 \\ 0 & 1 & \sqrt{2} & 0 & 1 \end{pmatrix}$$

It is noted that the prototype matrix may be predetermined and fixed. For example, Q may be the same for all the frames, but may be different for different bands. Further, there are different Qs for different relationship between the number of channels of the downmix signal and the number of channels of the synthesis signal. Q may be chosen among a plurality of prestored Q, e.g. on the basis of the particular number of downmix channels and of the particular number of synthesis channels.

Aspect 5: Reconstruction of Parameters in the Case the Output Loudspeaker Setup is Different than the Input Loudspeaker Setup:

One application of the proposed invention is to generate an output signal 336 or 340 on a loudspeaker setup that is different than the original signal 212 (meaning with a greater or lesser number of loudspeakers for example).

In order to do so, one has to modify the prototype matrix accordingly. In this scenario the prototype signal obtained with equation (9) will contain as many channels as the output loudspeaker setup. For example, if we have 5 channels signals as an input (at the side of signal 212) and want to obtain a 7 channel signal as an output (at the side of the signal 336), the prototype signal will already contain 7 channels.

This being done, the estimation of the covariance matrix in equation (4) still stands and will still be used to estimate the covariance parameters for the channels that were not present in the input signal 212.

The transmitted parameters 228 between the encoder and the decoder are still relevant and equation (7) can still be used as well. More precisely, the encoded (e.g. transmitted) parameters have to be assigned to the channel pairs that are as close as possible, in terms of geometry, to the original setup. Basically, it is needed to perform an adaptation operation.

For example, if on the encoder side an ICC value is estimated between one loudspeaker on the right and one loudspeaker on the left, this value may be assigned to the channel pair of the output setup that have the same left and right position; in the case the geometry is different, this value may be assigned to the loudspeaker pair whose positions are as close as possible as the original one.

Then, once the target covariance matrix $C_y$ is obtained for the new output setup, the rest of the processing is unchanged.

Accordingly, in order to adapt the target covariance matrix ($C_{y_R}$) to the number of synthesis channels, it is possible to:

- use a prototype matrix Q which converts from the number of downmix channels to the number of synthesis channels; this may be obtained by
  - adapting formula (9), so that the prototype signal has the number of synthesis channels;
  - adapting formula (4), hence estimating $\widehat{C_y}$ in the number of synthesis channels;
  - maintaining formulas (5)-(8), which are therefore obtained in the number of original channels;
  - but assigning groups of original channels (e.g., couples of original channels) onto single synthesis channels (e.g., choosing the assignments in terms of geometry), or vice versa.

An example is provided in FIG. 8*b*, which is a version of FIG. 8*a* in which there are indicated the number of channels of some matrix and vectors. When the ICCs (as obtained from the side information 228 of the bitstream 348) are applied to the ICC matrix at 392, groups of original channels (e.g., couples of original channels) onto single synthesis channels (e.g., choosing the assignments in terms of geometry), or vice versa.

Another possibility of generating a target covariance matrix for a number of output channels different than the number of input channels is to first generate the target covariance matrix for the number of input channels (e.g., the number of original channels of the input signal 212) and then adapt this first target covariance matrix to the number of synthesis channels, obtaining a second target covariance matrix corresponding to the number of output channels. This may be done by applying an up- or downmix rule, e.g. a matrix containing the factors for the combination of certain input (original) channels to the output channels to the first target covariance matrix $C_{y_R}$ to, and in a second step apply this matrix $C_{y_R}$ to the transmitted input channel powers (ICLDs) and get a vector of channel powers for the number of output (synthesis) channels, and adjust the first target covariance matrix according to vectors to obtain a second target covariance matrix with the requested number of synthesis channels. This adjusted second target covariance matrix can now be used in the synthesis. An example thereof is provided in FIG. 8*c*, which is a version of FIG. 8*a* in which the blocks 390-394 operate reconstructing the target covariance matrix $C_{y_r}$ to have the number of original channels of the original signal 212. After that, at block 395 a prototype signal $Q_N$ (to transform onto the number of synthesis channels) and the vector ICLD may be applied. Notably, the block 386 of FIG. 8*c* is the same of block 386 of FIG. 8*a*, apart from the fact that in FIG. 8*c* the number of channels of the reconstructed target covariance is exactly the same of the number of original channels of the input signal 212 (and in FIG. 8*a*, for generality, reconstructed target covariance has the number of synthesis channels).

4.3.4 Decorrelation

The purpose of the decorrelation module 330 is to reduce the amount of correlation between each channel of the prototype signal. Highly correlated loudspeakers signal may lead to phantom sources and degrade the quality and the spatial properties of the output multichannel signal. This step is optional and can be implemented or not according to the application requirement. In the present invention decorrelation is used prior to the synthesis engine. As an example, an all-pass frequency decorrelator can be used.

Note Regarding MPEG Surround:

In MPEG Surround according to the known technology, there is the use of so-called "Mix-matrices" (denoted $M_1$ and $M_2$ in the standard). The matrix $M_1$ controls how the available down-mixed signals are input to the decorrelators. Matrix $M_2$ describes how the direct and the decorrelated signals shall be combined in order to generate the output signal.

While there might be similarities with the prototype matrix defined in 4.3.3 and also with the use of decorrelators described in this present section, it is important to note that:

- The prototype matrix Q has a completely different function than the matrices used in MPEG Surround, the point of this matrix is to generate the prototype signal. This prototype signal's purpose is to be input into the synthesis engine.
- The prototype matrix is not meant to prepare the down-mixed signals for the decorrelators and can be adapted depending on the requirements and the target application. E.g. the prototype matrix can generate a prototype signal for an output loudspeaker setup greater than the input one.
- The use of the decorrelators in the proposed invention is not mandatory; the processing relies on the use of the covariance matrix within the synthesis engine (c.f. 5.1).
- The proposed invention does not generate the output signal by combined a direct and a decorrelated signal.
- The computation of $M_1$ and $M_2$ is highly depending on tree structure, the different coefficients of those matrices are case-dependent from the structure point of view. This is not the case in the proposed invention, the processing is agnostic of the down mixed computation (c.f. 5.2) and conceptually the proposed processing aims at considering the relationship between every channels instead of only channels pairs as it can be done with a tree structure.

Hence, the present invention differs from MPEG Surround according to the known technology.

4.3.5 Synthesis Engine, Matrix Calculation

The last step of the decoder includes the synthesis engine 334 or synthesis processor 402 (and additionally a synthesis filter bank 338 if needed). A purpose of the synthesis engine 334 is to generate the final output signal 336 in the with respect to certain constraints. The synthesis engine 334 may compute an output signal 336 whose characteristics are constrained by the input parameters. In the present invention, the input parameters 318 of the synthesis engine 338, except from the prototype signal 328 (or 332) are the covariance matrices $C_x$ and $C_y$. Especially $C_y$, is referred as the target covariance matrix because the output signal characteristics should be as close as possible to the one defined by $C_y$ (it will be shown that an estimated version and preconstructed version of the target covariance matrix are discussed).

The synthesis engine 334 that can be used is not unique, as an example, a prior-art covariance synthesis can be used [8], which is here incorporated by reference. Another synthesis engine 333 that could be used would be the one described in the DirAC processing in [2].

The output signal of the synthesis engine 334 might need additional processing through the synthesis filter bank 338.

As a final result, the output multichannel signal 340 in the time-domain is obtained.

Aspect 6: High Quality Output Signals Using the "Covariance Synthesis"

As mentioned above, the synthesis engine 334 used is not unique and any engine that uses the transmitted parameters or a subset of it can be used. Nevertheless, one aspect of the present invention may be to provide high quality output signals 336, e.g. by using the covariance synthesis [8].

This synthesis method aims to compute an output signal 336 whose characteristics are defined by the covariance matrix $C_{y_R}$. In order to so, the so-called optimal mixing matrices are computed, those matrices will mix the prototype signal 328 into the final output signal 336 and will provide the optimal—from a mathematical point of view—result given a target covariance matrix $C_{y_R}$. The mixing matrix M is the matrix that will transform the prototype signal $x_p$ into the output signal $y_R$(336) via the relation $y_R=Mx_p$.

The mixing matrix may also be a matrix that will transform the downmix signal x into the output signal via the relation $y_R=Mx$. From this relation, we can also deduce $C_{y_R}=MC_xM^*$.

In the presented processing $C_{y_R}$ and $C_x$ may be in some examples already known (as they're respectively the target covariance matrix $C_{y_R}$ and the covariance matrix $C_x$ of the downmix signal 246).

One solution from a mathematical point of view is given by $M=K_yPK_x^{-1}$, where $K_y$ and $K_x^{-1}$ are all matrices obtained by performing singular value decomposition on $C_x$ and $C_{y_R}$. For P, it's the free parameter here, but an optimal solution (from a perceptual point of view for the listener) can be found with respect to the constraint dictated by the prototype matrix Q. The mathematical proof of what's stated here can be found in [8].

This synthesis engine 334 provides high quality output 336 because the approach is designed to provide the optimal mathematical solution to the reconstruction of the output signal problem.

In less mathematical terms, it is important to understand that the covariance matrices represent energy relationships between the different channels of a multichannel audio signal. The matrix $C_y$ for the original multichannel signal 212 and the matrix $C_x$ for the down mixed multichannel signal 246. Each value of those matrices traduces the energy relationship between two channels of the multichannel stream.

Hence, the philosophy behind the covariance synthesis is to produce a signal whose characteristics are driven by the target covariance matrix $C_{y_R}$ This matrix $C_{y_R}$ was computed in a way that it describes the original input signal 212 (or the output signal we want to obtain, in case it's different than the input signal). Then, having those elements, the covariance synthesis will optimally mix the prototype signal in order to generate the final output signal.

In a further aspect the mixing matrix used for the synthesis of a slot is a combination of the mixing matrix M of the current frame and the mixing matrix $M_p$ of the previous to assure a smooth synthesis, for example a linear interpolation based on the slot index within the current frame.

In a further aspect where the occurrence and position of a transient is transmitted the previous mixing matrix $M_p$ is used for all slots before the transient position and the mixing matrix M is used for the slot containing the transient position and all following slots in the current frame. It is noted that, in some examples, for each frame or slot it is possible to smooth the mixing matrix of a current frame or slot using a linear combination with a mixing matrix used for the preceding frame or slot, e.g. by addition, average, etc. Let us suppose that, for a current frame t, the slot s band i of the output signal is obtained by $Y_{s,i}=M_{s,i}X_{s,i}$, where $M_{s,i}$ is a combination of $M_{t-1,i}$ the mixing matrix used for the previous frame and $M_{t,i}$ is the mixing matrix calculated for the current frame, for example linear interpolation between them:

$$M_{s,i} = \left(1 - \frac{s}{n_s}\right)M_{t-1,i} + \frac{s}{n_s}M_{t,i}$$

where $n_s$ is the number of slots in a frame (e.g. 16) and t−1 and t indicate the previous and current frame. More in general, the mixing matrix $M_{s,i}$ associated to each slot may be obtained by scaling along the subsequent slots of a current frame t the mixing matrix $M_{t,i}$, as calculated for the present frame, by an increasing coefficient, and by adding, along the subsequent slots of the current frame t, the mixing matrix $M_{t-1,i}$ scaled by a decreasing coefficient. The coefficients may be linear.

It may be provided that, in case of a transient (e.g. as signalled in the information 261) the current and past mixing matrices are not combined but the previous one up to the slot containing the transient and the current one for the slot containing the transient and all following slots until the end of the frame.

$$Y_{s,i} = \begin{cases} M_{t-1,i}X_{s,i},\ s < s_t \\ M_{t,i}X_{s,i},\ s \ge s_t \end{cases}$$

Where s is the slot index, i is the band index, t and t−1 indicate the current and previous frame and $s_t$ is the slot containing the transient.

Differences with the Document [8] from Known Technology

It is also important to note that the proposed invention goes beyond the scope of the method proposed in [8]. Notable differences are, inter alia:

The target covariance matrix $C_{y_R}$ is computed at the encoder side of the proposed processing.

The target covariance matrix $C_{y_R}$ may also be computed in a different way (in the proposed invention, the covariance matrix is not the sum of a diffuse and direct part).

The processing is not carried for each frequency band individually but grouped for parameter bands (as mentioned in 0).

From a more global perspective: the covariance synthesis is here only one block of the whole process and has to be use jointly with all the other elements on the decoder side.

4.3. Advantageous Aspects as a List

At least one of the following aspects may characterize the invention:

1. On the encoder side
   a. Input a multichannel audio signal 246.
   b. Convert the signal 212 from the time domain to the frequency domain (216) using a filter bank 214
   c. Compute the down-mix signal 246 at block 244
   d. From the original signal 212 and/or the down-mix signal 246, estimate a first set of parameters to describe the multichannel stream (signal) 246: covariance matrices $C_x$ and/or $C_y$
   e. Transmit and/or encode either the covariance matrices $C_x$ and/or $C_y$ directly or compute the ICCs and/or ICLDs and transmit them
   f. Encode the transmitted parameters 228 in the bitstream 248 using an appropriate coding scheme
   g. Compute the down-mixed signal 246 in the time domain
   h. Transmit the side information (i.e. the parameters) and the down-mixed signal 246 in the time domain
2. On the decoder side
   a. Decode the bit stream 248 containing the side information 228 and the downmix signal 246
   b. (optional) Apply the filter bank 320 to the down-mix signal 246 in order to obtain a version 324 of the down-mix signal 246 in the frequency domain
   c. Reconstruct the covariance matrices $C_x$ and $C_y$, from the previously decoded parameters 228 and downmix signal 246
   d. Compute the prototype signal 328 from the downmix signal 246 (324)
   e. (optional) Decorrelate the prototype signal (at block 330)
   f. Apply the synthesis engine 334 on the prototype signal using $C_x$ and $C_{y_R}$ as reconstructed
   g. (optional) Apply the synthesis filter bank 338 to the output 336 of the covariance synthesis 334
   h. Obtain the output multichannel signal 340

4.5 Covariance Synthesis

In the present section there are discussed some techniques which may be implemented in the systems of FIGS. 1-3*d*. However, these techniques may also be implemented independently: for example, in some examples there is no need for the covariance computation as exercised for FIGS. 8*a*-8*c* and in equations (1)-(8). Therefore, in some examples, when reference is made to $C_{y_R}$ (reconstructed, target covariance) this may also be substituted by $C_y$ (which could also be directly provided, without reconstruction). Notwithstanding, the techniques of this section can be advantageously used together with the techniques discussed above.

Reference is now made to FIGS. 4*a*-4*d*. Here, examples of covariance synthesis blocks 388*a*-388*d* are discussed. Blocks 388*a*-388*d* may embody, for example, block 388 of FIG. 3*c* to perform covariance synthesis. Blocks 388*a*-388*d* may, for example, be part of the synthesis processor 404 and the mixing rule calculator 402 of the synthesis engine 334 and/or of the parameter reconstruction block 316 of FIG. 3*a*. In FIGS. 4*a*-4*d*, the downmix signal 324 is in the frequency domain, FD, (i.e., downstream to the filterbank 320), and is indicated with X, while the synthesis signal 336 is also in the FD, and is indicated with Y. However, it is possible to generalize these results, e.g. in the time domain. It is noted that each of the covariance synthesis blocks 388*a*-388*d* of FIGS. 4*a*-4*d* can be referred to one single frequency band (e.g., once disaggregated in 380), and the covariance matrices $C_x$ and $C_{y_R}$ (or other reconstructed information) may therefore be associated to one specific frequency band. The covariance synthesis may be performed, for example, in a frame-by-frame fashion, and in that case covariance matrices $C_x$ and $C_{y_R}$ (or other reconstructed information) are associated to one single frame (or to multiple consecutive frames): hence, the covariance syntheses may be performed in a frame-by-frame fashion or in a multiple-frame-by-multiple-frame fashion.

Figure 4A:
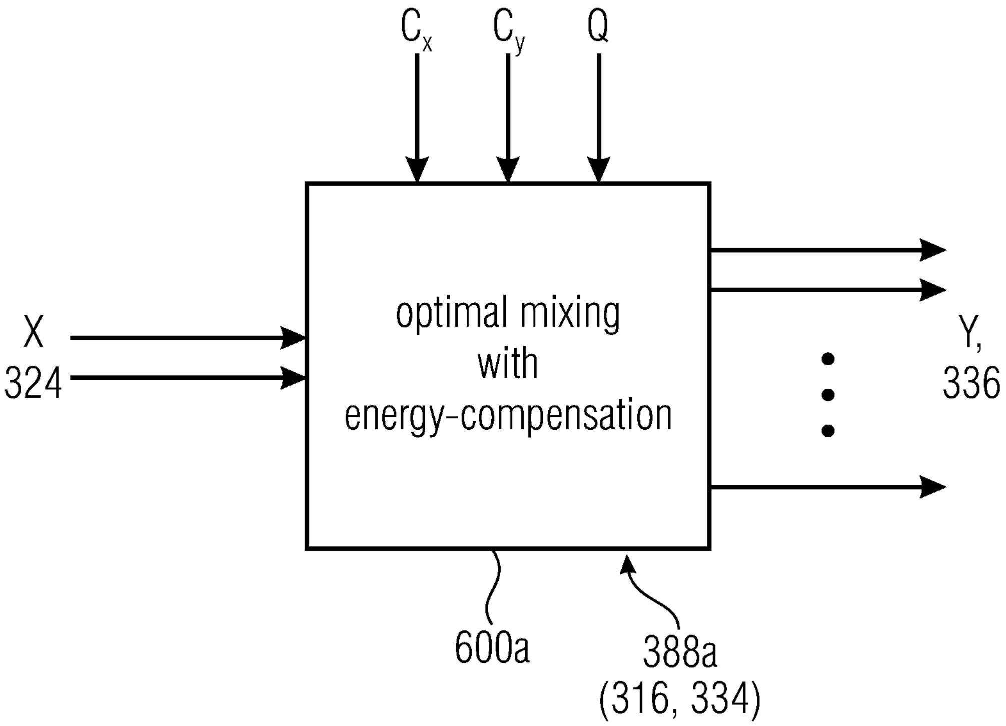

In FIG. 4*a*, the covariance synthesis block 388*a* may be constituted by one energy-compensated optimal mixing block 600*a* and lack of correlator block. Basically, one single mixing matrix M is found and the only important operation that is additionally performed is the calculation of an energy-compensated mixing matrix M'.

Figure 4B:
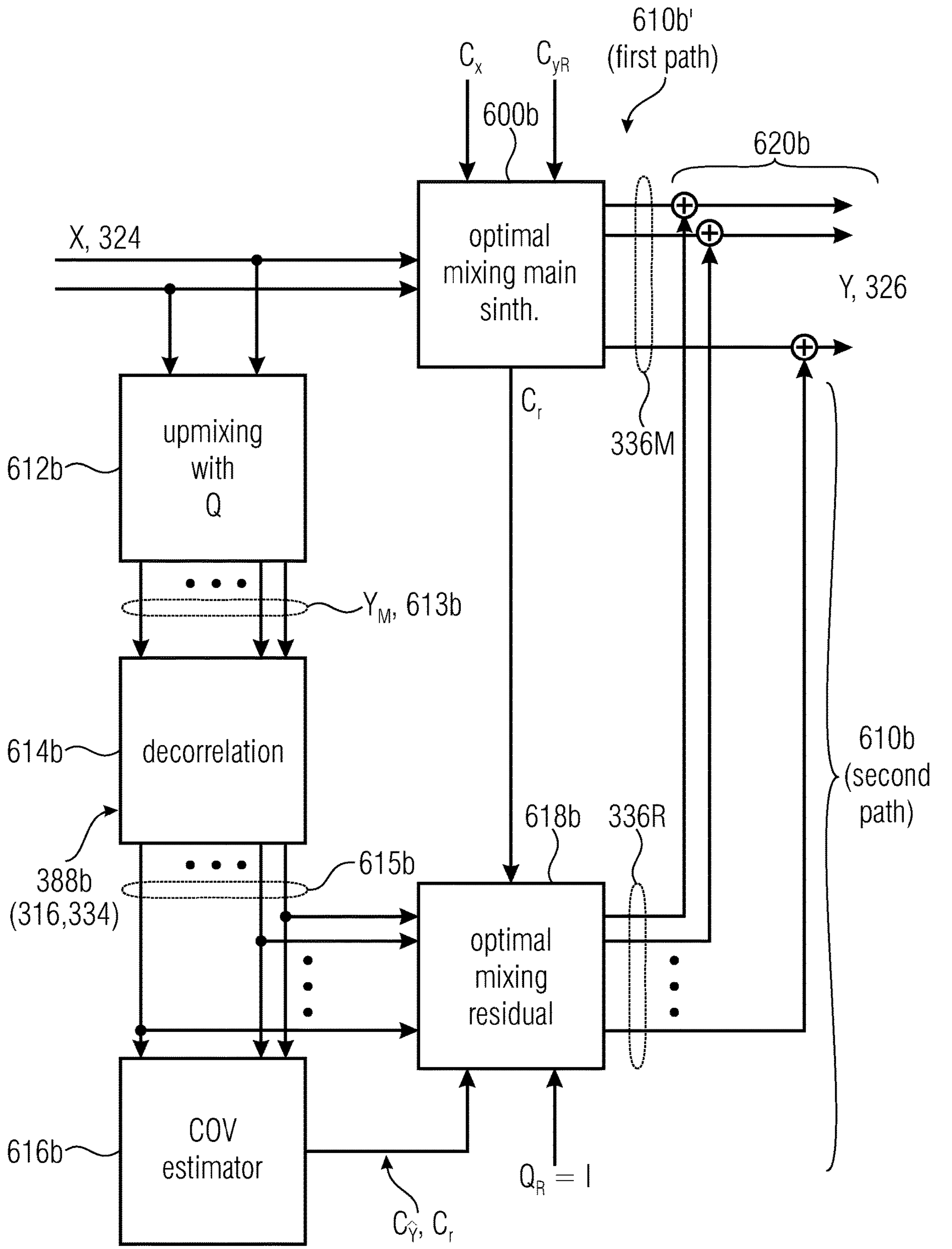

FIG. 4*b* shows a covariance synthesis block 388*b* inspired by [8]. The covariance synthesis block 388*b* may permit to obtain the synthesis signal 336 as a synthesis signal having a first, main component 336M, and a second, residual component 336R. While the main component 336M may be obtained at an optimal main component mixing matrix 600*b*, e.g. by finding out a mixing matrix $M_M$ from the covariance matrices $C_x$ and $C_{y_R}$ and without decorrelators, the residual component 336R may be obtained in another way. $M_R$ should in principle satisfy the relation $C_{y_R}=MC_xM^*$. Typically the obtained mixing matrix not fully satisfies this and a residual target covariance can be found with $C_r=C_{y_R}-MC_xM^*$. As can be seen the downmix signal 324 may be derived onto a path 610*b* (the path 610*b* can be called second path in parallel to a first path 610*b*' including block 600*b*). A prototype version 613*b* (indicated with $Y_{pR}$) of the downmix signal 324 may be obtained at prototype signal block (upmix block) 612*b*. For example, an equation such as equation (9) may be used, i.e.

$$Y_{pR}=XQ$$

Examples of Q (prototype matrix or upmixing matrix) are provided in the present document. Downstream to bock 612*b*, a decorrelator 614*b* is present, so as to decorrelate the prototype signal 613*b*, to obtain a decorrelated signal 615*b* (also indicated with $\hat{Y}$). From the decorrelated signal 615*b*, the covariance matrix $C_{\hat{Y}}$ of the decorrelated signal $\hat{Y}$ (615*b*) is estimated at block 616*b*. By using the covariance matrix $C_{\hat{Y}}$ of the decorrelated signal $\hat{Y}$ as the equivalent of $C_x$ of the main component mixing and $C_r$ as the target covariance in another optimal mixing block, the residual component 336R of the synthesis signal 336 may be obtained at an optimal residual component mixing matrix block 618*b*. The optimal residual component mixing matrix block 618*b* may be implemented in such a way that a mixing matrix $M_R$ is generated, so as to mix the decorrelated signal 615*b*, and to obtain the residual component 336R of the synthesis signal 336 (for a specific band). At adder block 620*b*, the residual component 336R is summed to the main component 336M (the paths 610*b* and 610*b*' are therefore joined together at adder block 620*b*).

Figure 4C:
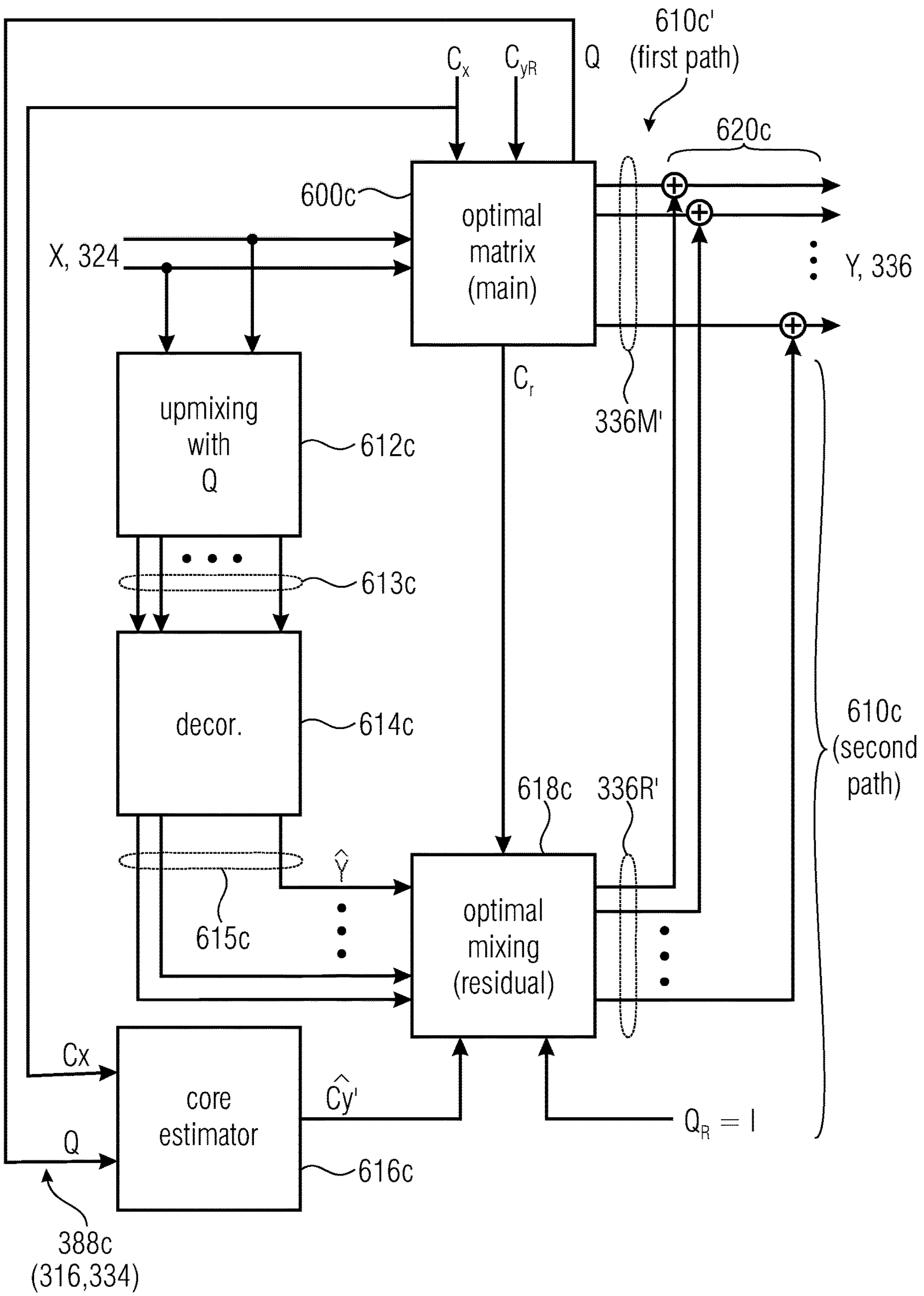

FIG. 4*c* shows an example of covariance synthesis 388*c* alternative to the covariance synthesis 388*b* of FIG. 4*b*. The covariance synthesis block 388*c* permits to obtain the synthesis signal 336 as a signal Y having a first, main component 336M', and a second, residual component 336R'. While the main component 336M' may be obtained at an optimal main component mixing matrix 600*c*, e.g. by finding out a mixing matrix $M_M$ from the covariance matrices $C_x$ and $C_{y_R}$ (or $C_y$ other information 220) and without correlators, the residual component 336R' may be obtained in another way. The downmix signal 324 may be derived onto a path 610*c* (the path 610*c* can be called second path in parallel to a first path 610*c*' including block 600*c*). A prototype version 613*c* of the downmix signal 324 may be obtained at downmix block (upmix block) 612*c*, by applying the prototype matrix Q (e.g. a matrix which upmixes the downmixed signal 234 onto a version 613*c* of the downmixed signal 234 in a number of channels which is the number of synthesis channels). For example, an equation such as equation (9) may be used. Examples of Q are provided in the present document. Downstream to bock 612*c*, a decorrelator 614*c* may be provided. In some examples, the first path has no decorrelator, while the second path has a decorrelator.

The decorrelator 614*c* may provide a decorrelated signal 615*c* (also indicated with $\hat{Y}$). However, contrary to the technique used in the covariance synthesis block 388*b* of FIG. 4*b*, in the covariance synthesis block 388*c* of FIG. 4*c* the covariance matrix $C_{\hat{Y}}$ of the decorrelated signal 615*c* is not estimated from the decorrelated signal 615*c* ($\hat{Y}$). In contrast, the covariance matrix $C_{\hat{Y}}$ of the decorrelated signal 615*c* is obtained (at block 616*c*) from:

- the covariance matrix $C_x$ of the downmix signal 324 (e.g., as estimated at block 384 in FIG. 3*c* and/or using equation (1)); and
- the prototype matrix Q.

By using the covariance matrix $C_{\hat{Y}}$ as estimated from the covariance matrix $C_x$ of the downmix signal 324 as the equivalent of $C_x$ of the main component mixing matrix and $C_r$ as the target covariance matrix, the residual component 336R' of the synthesis signal 336 is obtained at an optimal residual component mixing matrix block 618*c*. The optimal residual component mixing matrix block 618*c* may be implemented in such a way that a residual component mixing matrix $M_R$ is generated, so as to obtain the residual component 336R' by mixing the decorrelated signal 615*c* according to residual component mixing matrix $M_R$. At adder block 620*c*, the residual component 336R' is summed to the main component 336M', so as to obtain the synthesis signal 336 (the paths 610*c* and 610*c*' are therefore joined together at adder block 620*c*).

Figure 4D:
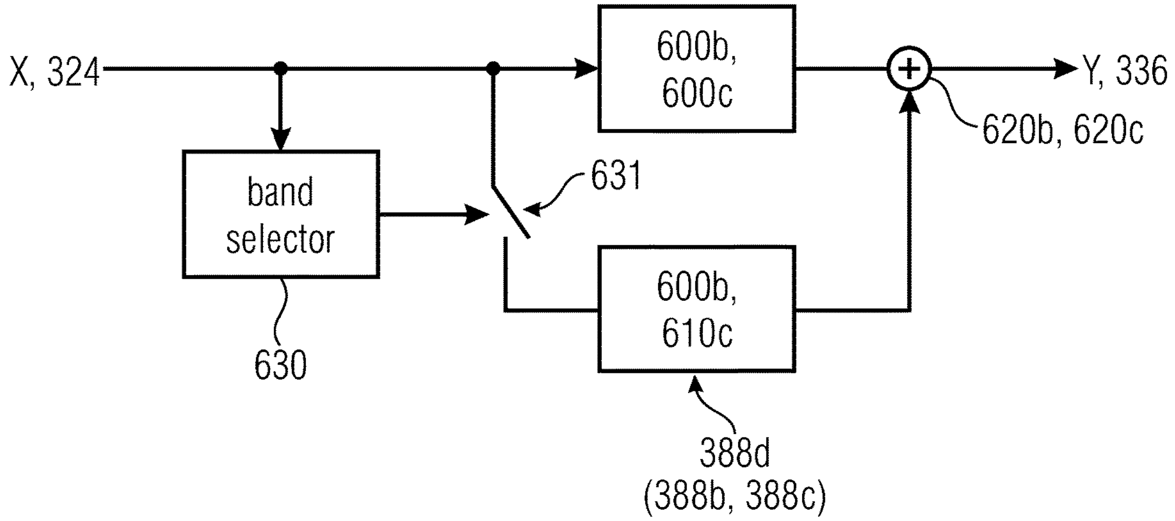

In some examples, the residual component 336R or 336R' is not always or not necessarily calculated (and the path 610*b* or 610*c* is not always used). In some examples, while for some bands the covariance synthesis is performed without calculating the residual signal 336R or 336R', for other bands of the same frame the covariance synthesis is processed also taking into account the residual signal 336R or 336R'. FIG. 4*d* shows an example of the covariance synthesis block 388*d* which may be a particular case of the covariance synthesis block 388*b* or 388*c*: here, a band selector 630 may select or deselect (in a fashion represented by switch 631) the calculation of the residual signal 336R or 336R'. For example, the path 610*b* or 610*c* may be selectively activated by selector 630 for some bands, and deactivated for other bands. In particular, the path 610*b* or 610*c* may be deactivated for bands over a predetermined threshold (e.g., a fixed threshold), which may be a threshold (e.g., a maximum) which distinguishes between bands for which the human ear is phase insensitive (bands with frequency above the threshold) and bands for which the human ear is phase sensitive (bands with frequency below the threshold), so that the residual component 336R or 336R' is not calculated for the bands with frequency below the threshold, and is calculated for bands with frequency above the threshold.

The example of FIG. 4*d* may also be obtained by substituting the block 600*b* or 600*c* with block 600*a* of FIG. 4*a* and by substituting the block 610*b* or 610*c* with the covariance synthesis block 388*b* of FIG. 4*b* or covariance synthesis block 388*c* of FIG. 4*c*.

Some indications on how to obtain the mixing rule (matrix) at any of blocks 338, 402 (or 404), 600*a*, 600*b*, 600*c*, etc. is here provided. As explained above, there are many ways for obtaining the mixing matrices, but some of them are here discussed in greater detail.

In particular, at first, reference is made to the covariance synthesis block 388*b* of FIG. 4*b*. At optimal main component mixing matrix block 600*c*, the mixing matrix M for the main component 336M of the synthesis signal 336 can be obtained, for example, from:

- the covariance matrix $C_y$ of the original signal 212 ($C_y$ may be estimated using at least some of formulas (6)-(8) discussed above, see for example FIG. 8; it may be in the so-called form "target version" $C_{y_R}$, e.g. as estimated with formula (8)); and
- the covariance matrix $C_x$ of the downmix signal 246, 324 ($C_y$ may be estimated using e.g. using formula (1)).

For example, as proposed by [8], it is admitted to decompose covariance matrices $C_x$ and $C_y$, which are Hermitian and positive semidefinite, according to the following factorization:

$$C_x = K_x K_x^*$$

$$C_y = K_y K_y^*$$

$K_x$ and $K_y$ may be obtained, for example, by applying singular value decomposition (SVD) twice from $C_x$ and $C_y$. For example:

- the SVD on $C_x$ may provide a matrix $U_{Cx}$ of singular vectors (e.g. left-singular vectors); and
- a diagonal matrix $S_{Cx}$ of singular values;
- so that $K_x$ is obtained by multiplying $U_{Cx}$ by a diagonal matrix having, in its entries, the square roots of the values in the corresponding entries of $S_{Cx}$.

Moreover, the SVD on $C_y$ may provide:

- a matrix $V_{Cy}$ of singular vectors (e.g. right-singular vectors); and
- a diagonal matrix $S_{Cy}$ of singular values,
- so that $K_y$ is obtained by multiplying $U_{Cy}$ by a diagonal matrix having, in its entries, the square roots of the values in the corresponding entries of $S_{Cy}$.

Then, it is possible to obtain a main component mixing matrix $M_M$ which, when applied to the downmix signal 324, will permit to obtain the main component 336M of the synthesis signal 336. The main component mixing matrix $M_M$ may be obtained as follows:

$$M_M = K_y P K_x^{-1}$$

If $K_x$ is a non-Invertible matrix, a regularized inverse matrix can be obtained with known techniques, and substituted instead of $K_x^{-1}$.

The parameter P is in general free, but it can be optimized. In order to arrive at P, it is possible to apply SVD on:

- $C_x$ (covariance matrix of the downmix signal 324); and
- $C_{\hat{y}}$ (covariance matrix of the prototype signal 613*b*).

Once the SVDs are performed, it is possible to obtain P as $$P=V\Lambda U^*$$

Λ is a matrix having as many rows as the number of synthesis channels, and as many columns as the number of downmix channels. Λ is an identity in its first square block, and is completed with zeroes in the remaining entries. It is now explained how V and U are obtained from $C_x$ and $C_{\hat{y}}$. V and U are matrices of singular vectors obtained from an SVD:

$$USV^*=K_x^*Q^*G_{\hat{y}}^*K_y$$

S is the diagonal matrix of singular values typically obtained through SVD. $G_{\hat{y}}$ is a diagonal matrix which normalizes the per-channel energies of the prototype signal ŷ (615*b*) onto the energies of the synthesis signal y. In order to obtain $G_{\hat{y}}$, first $C_{\hat{y}}=QC_xQ^*$ may be calculated, i.e. the covariance matrix of the prototype signal ŷ (614*b*). Then, in order to arrive at $G_{\hat{y}}$ from $C_{\hat{y}}$, the diagonal values of $C_{\hat{y}}$ are normalized onto the corresponding diagonal values of Cy, hence providing $G_{\hat{y}}$. An example is that the diagonal entries of $G_{\hat{y}}$ *are calculated as*

$$g_{\hat{y}_{ii}}=\sqrt{\frac{c_{y_{ii}}}{c_{\hat{y}_{ii}}}},$$

where $c_{y_{ii}}$ are values of the diagonal entries of $C_y$, and $c_{\hat{y}_{ii}}$ are values of the diagonal entries of $C_{\hat{y}}$.

Once $M_M=K_yPK_x^{-1}$ is obtained, the covariance matrix $C_r$ of the residual component is obtained from $$C_r=C_y-M_MC_xM_M^*$$

Once $C_r$ is obtained, it is possible to obtain a mixing matrix for mixing the decorrelated signal 615*b* to obtain the residual signal 336R where in an identical optimal mixing $C_r$ has the same role as $C_{y_R}$ in the main optimal mixing and the covariance of the decorrelated prototypes $C_{\hat{y}}$ takes the role of the input signal covariance $C_x$ had the main optimal mixing.

However, it has been understood that, as compared to the technique of FIG. 4*b*, the technique of FIG. 4*c* presents some advantages. In some examples, the technique of FIG. 4*c* is the same of the technique of FIG. 4*c* at least for calculating the main matrix and for generating the main component of the synthesis signal. To the contrary, the technique of FIG. 4*c* differs from the technique of FIG. 4*b* in the calculation of the residual mixing matrix and, more in general, for generating the residual component of the synthesis signal. Reference is now made to FIG. 11 in connection with FIG. 4*c* for the calculation of the residual mixing matrix. In the example of FIG. 4*c*, a decorrelator 614*c* in the frequency domain is used that ensures decorrelation of the prototype signal 613*c* but retains the energies of the prototype signal 613*b* itself.

Furthermore, in the example of FIG. 4*c* we can assume (at least by approximation) that the decorrelated channels of the decorrelated signal 615*c* are mutually incoherent and therefore that all non-diagonal elements of the covariance matrix of the decorrelated signals are zero. With both assumptions we can simply estimate the covariance of the decorrelated prototypes from applying Q on $C_x$ and take only the main diagonal of that covariance (i.e. the energies of the prototype signals). This technique of FIG. 4*c* is more efficient than the estimation of the example of FIG. 4*b*, from the decorrelated signal 615*b*, where we would need to do the same band/slot aggregation that was already done for $C_x$. Hence, in the example of FIG. 4*c*, we can simply apply a matrix multiplication of the already aggregated $C_x$. Hence, the same mixing matrix is calculated for all bands of the same aggregated group of bands.

So, the covariance 711 ($C_{\hat{y}}$) of the decorrelated signal can be estimated, at 710, using $$P_{decorr}=\mathrm{diag}(QC_xQ^*)$$

as the main diagonal of a matrix with all non-diagonal elements set to zero which is used as input signal covariance $C_{\hat{Y}}$. In examples in which $C_x$ is smoothed for performing the synthesis of the main component 336M' of the synthesis signal, the technique may be used according to which the version of $C_x$ that is used to calculate $P_{decorr}$ is the non-smoothed $C_x$.

Now, a prototype matrix $Q_r$ should be used. However, it has been noted that, for the residual signal, $Q_r$ is the identity matrix. The knowledge of the properties of $C_{\hat{y}}$ (diagonal matrix) and $Q_r$ (identity matrix) leads to further simplification in the computation of the mixing matrix (at least one SVD can be omitted), see the following technique and Matlab Listing.

At first, similarly to the example of FIG. 4*b*, the residual target covariance matrix $C_r$ (Hermitian, positive semi definite) of the input signal 212 can be decomposed as $C_r=K_rK_r^*$. The matrix $K_r$ can be obtained through SVD (702): the SVD 702 applied to $C_r$ generates:

- a matrix $U_{Cr}$ of singular vectors (e.g. left-singular vectors);
- a diagonal matrix $S_{Cr}$ of singular values;
- so that $K_r$ is obtained (at 706) by multiplying $U_{Cr}$ by a diagonal matrix having, in its entries, the square roots of the values in the corresponding entries of $S_{Cr}$ (the latter having been obtained at 704).

At this point, it could be theoretically possible to apply another SVD, this time to the covariance of the decorrelated prototypes ŷ.

However, in this example (FIG. 4*c*), in order to reduce the computational effort, a different path has been chosen. $C_{\hat{y}}$, as estimated from $P_{decorr}=\mathrm{diag}(QC_xQ^*)$, is a diagonal matrix and therefore no SVD is needed (SVD of a diagonal matrix gives the singular values as a sorted vector of the diagonal elements and the left and right singular vectors just indicate the index of the sorting). By calculating (at 712) the square root of each value at the entries of the diagonal of $\hat{C}\hat{y}$, a diagonal matrix $\hat{K}_y$ is obtained. This diagonal matrix $\hat{K}_y$ is such that $\hat{K}_y\hat{K}_y^*=C_{\hat{y}}$, with the advantage that no SVD has been necessary for obtaining $\hat{K}_y$. From the diagonal covariance of the decorrelated signals $C_{\hat{y}}$, an estimated covariance matrix $\widehat{C_y}$ of the decorrelated signal 615*c* is calculated. But since the prototype matrix is $Q_r$ (i.e. the idendity matrix), it is possible to directly use $C_{\hat{y}}$ for formulating $\widehat{G_y}$ as $$\widehat{g_{y_{ii}}}=\sqrt{\frac{c_{r_{ii}}}{\widehat{c_{y_{ii}}}}},$$

where $c_{r_{ii}}$ are values of the diagonal entries of $C_r$, and $\widehat{c_{y_{ii}}}$ are values of the diagonal entries of $C_{\hat{y}}$. $G_{\hat{y}}$ is a diagonal matrix (obtained at 722) which normalizes the per-channel energies of the decorrelated signal ŷ (615*b*) onto the desired energies of the synthesis signal y.

At this point, it is possible (at 734) to multiply $\hat{K}_y$ by $\widehat{G_y}$ (also the result 735 of the multiplication 734 is called $\hat{K}_y$). Then (736), $K_r$ is multiplied by $\hat{K}_y$ to obtain $K'_y$ (i.e. $K'_y=K_r\hat{K}_y$). From $K'_y$, an SVD (738) may be performed, so as to obtain a left singular vector matrix U and a right singular vector matrix V. By multiplying (740) V and U*, a matrix P is obtained ($P=VU^H$). Finally (742), it is possible to obtain the mixing matrix $M_R$ for the residual signal by applying:

$$M_R=K_rP\hat{K}_y^{-1}$$

where $\hat{K}_y^{-1}$ (obtained at 745) can be substituted by the regularized inverse. $M_R$ may therefore be used at block 618*c* for the residual mixing.

A Matlab code for performing covariance synthesis as discussed above is here provided. It is noted that it the code the asterisk (*) means multiplication, and the apex (') means the Hermitian matrix.

```
%Compute residual mixing matrix
function [M] =
ComputeMixingMatrixResidual(C__hat__y,Cr,reg__sx,reg__ghat)
EPS__= single(1e-15);                    %Epsilon to avoid
divisions by zero
num__outputs = size(Cr,1);
%Decomposition of Cy
[U__Cr, S__Cr] = svd(Cr);
Kr = U__Cr*sqrt(S__Cr);
%SVD of a diagonal matrix is the diagonal elements ordered,
%we can skip the ordering and get Kx directly form Cx
K__hat__y=sqrt(diag(C__haty)) ;
limit=max(K__hat__y)*reg__sx+EPS__;
S__hat__y__reg__diag=max(K__hat__y,limit);
%Formulate regularized Kx
K__hat__y__reg__inverse=1./S__hat__y__reg__diag;
% Formulate normalization matrix G hat
% Q is the identity matrix in case of the residual/diffuse part so
% Q*Cx*Q' = Cx
Cy__hat__diag = diag(C__hat__y);
limit = max(Cy__hat__diag)*reg__ghat+EPS__;
Cy__hat__diag = max(Cy__hat__diag,limit);
G__hat = sqrt(diag(Cr)./Cy__hat__diag);
%Formulate optimal P
%Kx, G__hat are diagonal matrixes, Q is I...
K__hat__y=K__hat__y.*G__hat;
for k =1:num__outputs
        Ky__dash(k,:)=Kr(k,:)*K__hat__y(k);
end
[U,~,V] = svd(Ky__dash);
P=V*U';
%Formulate M
M=Kr*P;
for k = 1:num__outputs
    M(:,k)=M(:,k)*K__hat__y__reg__inverse(k);
end
end
```

A discussion on the covariance synthesis of FIGS. 4*b* and 4*c* is here provided. In some examples, two ways of synthesis can be considered for every band, for some bands the full synthesis including the residual path from FIG. 4*b* is applied, for bands, typically above a certain frequency where the human ear is phase insensitive, to reach the desired energies in the channel an energy compensation is applied.

So also in the example of FIG. 4*b*, for bands below a certain (fixed, known to the decoder) band border (threshold) the full synthesis according to FIG. 4*b* may be carried out (e.g., in the case of FIG. 4*d*). In the example of FIG. 4*b*, the covariance $C_{\hat{y}}$ of the decorrelated signal 615*b* is derived from the decorrelated signal 615*b* itself. In contrast, in the example of FIG. 4*c*, a decorrelator 614*c* in the frequency domain is used that ensures decorrelation of the prototype signal 613*c* but retains the energies of the prototype signal 613*b* itself.

Further considerations:

- In both the examples of FIGS. 4*b* and 4*c*: at the first path (610*b*', 610*c*') a mixing matrix $M_M$ is generated (at block 600*b*, 600*c*) by relying on the covariance $C_y$ of the original signal 212 and the covariance $C_x$ of the downmix signal 324;
- In both the examples of FIGS. 4*b* and 4*c*: at the second path (610*b*, 610*c*), there is a decorrelator (614*b*, 614*c*), and a mixing matrix $M_R$ is generated (at block 618*b*, 618*c*), which should keep into account the covariance $C_{\hat{y}}$ of the decorrelated signal (616*b*, 616*c*); but
  - In the example of FIG. 4*b*, the covariance $C_{\hat{y}}$ of the decorrelated signal (616*b*, 616*c*) is calculated, as intuitive, using the decorrelated signal (616*b*, 616*c*), and is weighted in the energies of the original channel y;
  - In the example of FIG. 4*c*, the covariance of the decorrelated signal (616*b*, 616*c*) is calculated, counter intuitively, by estimating it from the matrix $C_x$, and is weighted in the energies of the original channel y.

It is noted that the covariance matrix ($C_{y_R}$) may be the reconstructed target matrix discussed above (e.g., obtained from the channel level and correlation information 220 written in the side information 228 of the bitstream 248), and may therefore be considered to be associated to the covariance of the original signal 212. Anyway, as it shall be used for the synthesis signal 336, the covariance matrix ($C_{y_R}$) may also be considered to be the covariance associated to the synthesis signal. The same applies to the residual covariance matrix $C_r$, which can be understood as the residual covariance matrix ($C_r$) associated to the synthesis signal, and the main covariance matrix, which can be understood as the main covariance matrix associated to the synthesis signal.

5. Advantages

5.1 Reduced Use of Decorrelation and Optimal Use of the Synthesis Engine

Given the proposed technique, as well as the parameters that are used for the processing and the way those parameters are combined with the synthesis engine 334, it is explained that the need for strong decorrelation of the audio signal (e.g. in its version 328) is reduced and also that the impact of the decorrelation (e.g. artefacts or degradations of spatial properties or degradations of signal quality) is diminished, if not removed, even in the absence of the decorrelation module 330.

More precisely, as it was stated before, the decorrelation part 330 of the processing is optional. In fact, the synthesis engine 334 takes care of decorrelating the signal 328 by using the target covariance matrix $C_y$ (or a subset of it) and ensures that the channels that compose the output signal 336 are properly decorrelated between them. The values in the covariance matrix $C_y$ represent the energy relations between the different channels of our multichannel audio signal that is why it used as a target for the synthesis.

Furthermore, the encoded (e.g. transmitted) parameters 228 (e.g. in their version 314 or 318) combined with the synthesis engine 334 may ensure a high quality output 336 given the fact the synthesis engine 334 uses the target covariance matrix $C_y$ in order to reproduce an output multichannel signal 336 whose spatial characteristics and sound quality are as close as possible as the input signal 212.

5.2 Down-Mix Agnostically Processing

Given the proposed technique, as well as the way the prototype signals 328 are computed and how they are used with the synthesis engine 334, it is here explained that the proposed decoder is agnostic of the way the down-mixed signals 212 are computed at the encoder.

This means that, the proposed invention at the decoder 300 can be carried independently of the way the down-mixed signals 246 are computed at the encoder and that the output quality of the signal 336 (or 340) is not relying on a particular down-mixing method.

5.3 Scalability of the Parameters

Given the proposed technique, as well as the way the parameters (28, 314, 318) are computed and the way they are used with the synthesis engine 334, as well as the way they are estimated on the decoder side, it is explained that the parameters used to describe the multichannel audio signals are scalable in number and in purpose.

Typically, only a subset of the parameters (e.g., a subset of $C_y$ and/or $C_x$, e.g. elements of) estimated on the encoder side is encoded (e.g. transmitted): this permits to reduce the bit rates used by the processing. Hence, the amount of parameters (e.g., elements of $C_y$ and/or $C_x$) encoded (e.g. transmitted) can be scalable, given the fact that the non-transmitted parameters are reconstructed on the decoder side. This gives to opportunity to scale the whole processing in terms of output quality and bit rates, the more parameters transmitted, the better output quality and vice-versa.

Also, those parameters (e.g., $C_y$ and/or $C_x$ or elements thereof) are scalable in purpose, meaning that they could be controlled by user input in order to modify the characteristics of the output multichannel signal. Furthermore, those parameters may be computed for each frequency bands and hence allow a scalable frequency resolution.

E.g. it could be possible to decide to cancel one loudspeaker in the output signal (336, 340) and hence it could possible to directly manipulate the parameters at the decoder side, to achieve such a transformation.

5.4 Flexibility of the Output Setup

Given the proposed technique, as well as the synthesis engine 334 used and the flexibility of the parameters (e.g., $C_y$ and/or $C_x$ or elements thereof), it is explained here that the proposed invention allows a large spectrum of rendering possibilities concerning the output setup.

More precisely, the output setup does not have to be the same as the input setup. It is possible to manipulate the reconstructed target covariance matrix that is fed into the synthesis engine in order to generate an output signal 340 on a loudspeaker setup that is greater or smaller or simply with a different geometry than the original one. This is possible because of the parameters that are transmitted and also because the proposed system is agnostic of the down-mixed signal (c.f. 5.2).

For those reasons, it is explained that the proposed invention is flexible from the output loudspeakers setup point of view.

5. Some Examples of Prototype Matrices

Here below tables for 5.1 already, but with the LFE left out, we since then also included the LFE in the processing (with only one ICC for the relation LFE/C and the ICLD for the LFE sent only in the lowest parameter band and set to 1 and zero respectively for all other bands in the synthesis at the decoder side). Channel naming and orders follow the CICPs found in ISO/IEC 23091-3, "Information technology—Coding independent code-points—Part 3: Audio", Q is used both as prototype matrix in the decoder and downmix matrix in the encoder. 5.1 (CICP6). $\alpha_i$ are to be used for calculating the ICLDs.

$$Q = \begin{pmatrix} 1 & 0 & \sqrt{2} & \sqrt{2} & 1 & 0 \\ 0 & 1 & \sqrt{2} & \sqrt{2} & 0 & 1 \end{pmatrix}$$

$$\alpha_i = [0.4444 \ \ 0.4444 \ \ 0.2 \ \ 0.2 \ \ 0.4444 \ \ 0.4444]$$

7.1 ($CICP$12)

$$Q = \begin{pmatrix} 1 & 0 & \sqrt{2} & \sqrt{2} & 1 & 0 & 1 & 0 \\ 0 & 1 & \sqrt{2} & \sqrt{2} & 0 & 1 & 0 & 1 \end{pmatrix}$$

$$\alpha_i = [0.2857 \ \ 0.2857 \ \ 0.5714 \ \ 0.5714 \ \ 0.2857 \ \ 0.2857 \ \ 0.2857 \ \ 0.2857]$$

5.1 + 4 ($CICP$16)

$$Q = \begin{pmatrix} 1 & 0 & \sqrt{2} & \sqrt{2} & 1 & 0 & 1 & 0 & 1 & 0 \\ 0 & 1 & \sqrt{2} & \sqrt{2} & 0 & 1 & 0 & 1 & 0 & 1 \end{pmatrix}$$

$$\alpha_i = [0.1818 \ \ 0.1818 \ \ 0.3636 \ \ 0.3636 \ \ 0.1818 \ \ 0.1818 \ \ 0.1818 \ \ 0.1818 \ \ 0.1818 \ \ 0.1818]$$

7.1 + 4 ($CICP$19)

$$Q = \begin{pmatrix} 1 & 0 & \sqrt{2} & \sqrt{2} & 1 & 0 & 1 & 0 & 1 & 0 & 1 & 0 \\ 0 & 1 & \sqrt{2} & \sqrt{2} & 0 & 1 & 0 & 1 & 0 & 1 & 0 & 1 \end{pmatrix}$$

$$\alpha_i = [0.1538 \ \ 0.1538 \ \ 0.3077 \ \ 0.3077 \ \ 0.1538 \ \ 0.1538 \ \ 0.1538 \ \ 0.1538 \ \ 0.1538 \ \ 0.1538 \ \ 0.1538 \ \ 0.1538]$$

6. Methods

Although the techniques above have mainly been discussed as components or function devices, the invention may also be implemented as methods. The blocks and elements discussed above may also be understood as steps and/or phases of methods.

For example, there is provided a decoding method for generating a synthesis signal from a downmix signal, the synthesis signal having a number of synthesis channels the method comprising:

- receiving a downmix signal (246, x), the downmix signal (246, x) having a number of downmix channels, and side information (228), the side information (228) including:
  - channel level and correlation information (220) of an original signal (212, y), the original signal (212, y) having a number of original channels;
- generating the synthesis signal using the channel level and correlation information (220) of the original signal (212, y) and covariance information ($C_r$) associated with the signal (246, x).

The decoding method may comprise at least one of the following steps:

- calculating a prototype signal from the downmix signal (246, x), the prototype signal having the number of synthesis channels;
- calculating a mixing rule using the channel level and correlation information of the original signal (212, y) and covariance information associated with the downmix signal (246, x); and
- generating the synthesis signal using the prototype signal and the mixing rule.

There is also provided a decoding method for generating a synthesis signal (336) from a downmix signal (324, x) having a number of downmix channels, the synthesis signal (336) having a number of synthesis channels, the downmix signal (324, x) being a downmixed version of an original signal (212) having a number of original channels, the method comprising the following phases:

- a first phase (610*c*') including:
  - synthesizing a first component (336M') of the synthesis signal according to a first mixing matrix ($M_M$) calculated from:
    - a covariance matrix ($C_{y_R}$) associated to the synthesis signal (e.g. the reconstructed target version of the covariance of the original signal); and
    - a covariance matrix ($C_r$) associated to the downmix signal (324).
- a second phase (610*c*) for synthesizing a second component (336R') of the synthesis signal, wherein the second component (336R') is a residual component, the second phase (610*c*) including:
  - a prototype signal step (612*c*) upmixing the downmix signal (324) from the number of downmix channels to the number of synthesis channels;
  - a decorrelator step (614*c*) decorrelating the upmixed prototype signal (613*c*);
  - a second mixing matrix step (618*c*) synthesizing the second component (336R') of the synthesis signal according to a second mixing matrix ($M_R$) from the decorrelated version (615*c*) of the downmix signal (324), the second mixing matrix ($M_R$) being a residual mixing matrix,
- wherein the method calculates the second mixing matrix ($M_R$) from:
  - the residual covariance matrix ($C_r$) provided by the first mixing matrix step (600*c*); and
  - an estimate of the covariance matrix of the decorrelated prototype signals ($C_{\hat{y}}$) obtained from the covariance matrix ($C_r$) associated to the downmix signal (324),
- wherein the method further comprises an adder step (620*c*) summing the first component (336M') of the synthesis signal with the second component (336R') of the synthesis signal, thereby obtaining the synthesis signal (336).

Moreover, there is provided an encoding method for generating a downmix signal (246, x) from an original signal (212, y), the original signal (212, y) having a number of original channels, the downmix signal (246, x) having a number of downmix channels, the method comprising:

- estimating (218) channel level and correlation information (220) of the original signal (212, y),
- encoding (226) the downmix signal (246, x) into a bitstream (248), so that the downmix signal (246, x) is encoded in the bitstream (248) so as to have side information (228) including channel level and correlation information (220) of the original signal (12, y).

These methods may be implemented in any of the encoders and decoder discussed above.

7. Storage Units

Moreover, the invention may be implemented in a non-transitory storage unit storing instructions which, when executed by a processor, cause the processor to perform a method as above.

Further, the invention may be implemented in a non-transitory storage unit storing instructions which, when executed by a processor, cause the processor to control at least one of the functions of the encoder or the decoder.

The storage unit may, for example, be a part of the encoder 200 or the decoder 300.

8. Other Aspects

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some aspects, some one or more of the most important method steps may be executed by such an apparatus.

Depending on certain implementation requirements, aspects of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some aspects according to the invention comprise a data carrier having electronically readable control signals, which are capable of cooperating with a programmable computer system, such that one of the methods described herein is performed.

Generally, aspects of the present invention can be implemented as a computer program product with a program code, the program code being operative for performing one of the methods when the computer program product runs on a computer. The program code may for example be stored on a machine-readable carrier.

Other aspects comprise the computer program for performing one of the methods described herein, stored on a machine-readable carrier.

In other words, an aspect of the inventive method is, therefore, a computer program having a program code for performing one of the methods described herein, when the computer program runs on a computer.

A further aspect of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further aspect of the inventive method is, therefore, a data stream or a sequence of signals representing the computer program for performing one of the methods described herein. The data stream or the sequence of signals may for example be configured to be transferred via a data communication connection, for example via the Internet.

A further aspect comprises a processing means, for example a computer, or a programmable logic device, configured to or adapted to perform one of the methods described herein.

A further aspect comprises a computer having installed thereon the computer program for performing one of the methods described herein.

A further aspect according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some aspects, a programmable logic device (for example a field programmable gate array) may be used to perform some or all of the functionalities of the methods described herein. In some aspects, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY & REFERENCES

[1] J. Herre, K. Kjörling, J. Breebart, C. Faller, S. Disch, H. Purnhagen, J. Koppens, J. Hilpert, J. Rödén, W. Oomen, K. Linzmeier and K. S. Chong, "MPEG Surround—The ISO/MPEG Standard for Efficient and Compatible Multichannel Audio Coding," *Audio English Society*, vol. 56, no. 11, pp. 932-955, 2008.

[2] V. Pulkki, "Spatial Sound Reproduction with Directional Audio Coding," *Audio English Society*, vol. 55, no. 6, pp. 503-516, 2007.

[3] C. Faller and F. Baumgarte, "Binaural Cue Coding—Part II: Schemes and Applications," *IEEE Transactions on Speech and Audio Processing*, vol. 11, no. 6, pp. 520-531, 2003.

[4] O. Hellmuth, H. Purnhagen, J. Koppens, J. Herre, J. Engdegård, J. Hilpert, L. Villemoes, L. Terentiv, C. Falch, A. Hölzer, M. L. Valero, B. Resch, H. Mundt and H.-O. Oh, "MPEG Spatial Audio Object Coding—The ISO/MPEG Standard for Efficient Coding of Interactive Audio Scenes," in AES, San Fransisco, 2010.

[5] L. Mikko-Ville and V. Pulkki, "Converting 5.1. Audio Recordings to B-Format for Directional Audio Coding Reproduction," in *ICASSP*, Prague, 2011.

[6] D. A. Huffman, "A Method for the Construction of Minimum-Redundancy Codes," *Proceedings of the IRE*, vol. 40, no. 9, pp. 1098-1101, 1952.

[7] A. Karapetyan, F. Fleischmann and J. Plogsties, "Active Multichannel Audio Downmix," in 145*th Audio Engineering Society*, New York, 2018.

[8] J. Vilkamo, T. Bäckström and A. Kuntz, "Optimized Covariance Domain Framework for Time-Frequency Processing of Spatial Audio," *Journal of the Audio Engineering Society*, vol. 61, no. 6, pp. 403-411, 2013.

What is claimed is:

1. An audio synthesizer for generating a synthesis signal from a downmix signal, the synthesis signal comprising a at least three synthesis channels, the audio synthesizer comprising:

an input interface configured for receiving the downmix signal, the downmix signal comprising a plural number of downmix channels and side information, the side information comprising channel level and correlation information of an original signal, the original signal comprising a plural number of original channels;

a prototype signal calculator configured for calculating a prototype signal from the downmix signal, the prototype signal comprising the number of synthesis channels, the prototype signal calculator being configured to apply a prototype matrix to the downmix signal to obtain the prototype signal; and a synthesis processor configured for generating the synthesis signal by applying, to the prototype signal, at least one mixing rule in form of a matrix, the mixing rule being obtained from:

channel level and correlation information of the original signal, the channel level and correlation information being written in the bitstream; and covariance information of the downmix signal, wherein the audio synthesizer is configured to reconstruct a target version of the covariance information based on an estimated version of the original covariance information; reported to the number of synthesis channels, wherein the audio synthesizer is configured, in order to reconstruct the target version of the covariance information, to:

acquire the estimated version of the original covariance information by applying, to the covariance information of the downmix signal, the prototype matrix for calculating a prototype signal, so as to report the estimated version of the original covariance information to the number of synthesis channels, normalize first values of the estimated version of the original covariance information reported to the number of original channels;

retrieve further normalized values of the original covariance information from the channel level and correlation information of the original signal written in the side information, and assign the further normalized values of the original covariance information to channels of the synthesis channels, thereby reporting the further normalized values of the original covariance information to the number of original channels;

denormalize the first normalized values and the further normalized values, to acquire a denormalized version of the original covariance information reported to the number of original channels thereby retrieving the target version of the covariance information, to thereby derive the mixing rule using the target version of the covariance information, so that the synthesis processor generates the synthesis signal using the prototype signal and the at least one mixing rule.

2. The audio synthesizer of claim 1, configured to reconstruct the target version of the covariance information adapted to the number of channels of the synthesis signal by generating the target version of the covariance information for the number of original channels and subsequently applying a downmixing rule or upmixing rule and energy compensation to arrive at the target version of the covariance for the synthesis channels.

3. The audio synthesizer of claim 1, configured to normalize, for at least one couple of channels, at least one first value of the estimated version of the original covariance information onto the square roots of the levels of the channels of the couple of channels.

4. The audio synthesizer of claim 3, configured to construe a matrix with the normalized first values of the estimated version of the original covariance information.

5. The audio synthesizer of claim 4, configured to complete the matrix by inserting the further normalized values of the original covariance information acquired in the side information of the bitstream.

6. The audio synthesizer of claim 3, configured to denormalize the matrix by scaling the estimated version of the original covariance information by the square root of the levels of the channels forming the couple of channels.

7. The audio synthesizer of claim 1, wherein the reconstructed target version of the covariance information describes an energy relationship between a couple of channels or is based, at least partially, on levels associated to each channel of the couple of channels.

8. The audio synthesizer of claim 1, configured to acquire a frequency domain, FD, version of the downmix signal, the FD version of the downmix signal being divided into bands or groups of bands, wherein different channel level and correlation information are associated to different bands or groups of bands, wherein the audio synthesizer is configured to operate differently for different bands or groups of bands, to acquire different mixing rules for different bands or groups of bands.

9. The audio synthesizer of claim 1, wherein the downmix signal is divided into slots, wherein different channel level and correlation information are associated to different slots, and the audio synthesizer is configured to operate differently for different slots, to acquire different mixing rules for different slots.

10. The audio synthesizer of claim 1, wherein the downmix signal is divided into frames and each frame is divided into slots, wherein the audio synthesizer is configured to, when the presence and the position of the transient in one frame is signalled as being in one transient slot:

associate the current channel level and correlation information to the transient slot and/or to the slots subsequent to the frame's transient slot; and associate, to the frame's slot preceding the transient slot, the channel level and correlation information of the preceding slot.

11. The audio synthesizer of claim 1, configured to choose the prototype matrix for calculating a prototype signal on the basis of the number of synthesis channels.

12. The audio synthesizer of claim 11, configured to choose the prototype matrix among a plurality of prestored prototype matrixes.

13. The audio synthesizer of claim 12, wherein the prototype matrix is a matrix with a first dimension and a second dimension, the first dimension being the number of downmix channels, and the second dimension being the number of synthesis channels, wherein the audio synthesizer is configured to multiply a covariance matrix obtained from the covariance information of the downmix signal by the prototype matrix, and by its conjugate transpose version, to obtain the estimated version of the original covariance information.

14. The audio synthesizer of claim 1, configured to define a prototype matrix on the basis of a manual selection.

15. The audio synthesizer of claim 1, configured to operate at a bitrate equal or lower than 160 kbit/s.

16. The audio synthesizer of claim 1, further comprising an entropy decoder for acquiring the downmix signal with the side information.

17. The audio synthesizer of claim 1, further comprising a decorrelation module to reduce the amount of correlation between different channels.

18. The audio synthesizer of claim 1, wherein the prototype signal is directly provided to the synthesis processor without performing decorrelation.

19. The audio synthesizer of claim 1, wherein at least one of the channel level and correlation information of the original signal and the covariance information of the downmix signal is in the form of a matrix.

20. The audio synthesizer of claim 1, wherein the side information comprises an identification of the original channels;

wherein the audio synthesizer is further configured for calculating the at least one mixing rule using at least one of the channel level and correlation information of the original signal, a covariance information of the downmix signal, the identification of the original channels, and an identification of the synthesis channels.

21. The audio synthesizer of claim 1, configured to calculate the at least one mixing rule by singular value decomposition, SVD.

22. The audio synthesizer of claim 1, wherein the downmix signal is divided into frames, the audio synthesizer being configured to smooth a received parameter, or an estimated or reconstructed value, or a mixing matrix, using a linear combination with a parameter, or an estimated or reconstructed value, or a mixing matrix, acquired for a preceding frame.

23. The audio synthesizer of claim 22, configured to, when the presence and/or the position of a transient in one frame is signalled, to deactivate the smoothing of the received parameter, or estimated or reconstructed value, or mixing matrix.

24. The audio synthesizer of claim 1, wherein the downmix signal is divided into frames and the frames are divided into slots, wherein the channel level and correlation information of the original signal is acquired from the side information of the bitstream in a frame-by-frame fashion, the audio synthesizer being configured to use, for a current frame, a mixing rule acquired by scaling, the mixing rule, as calculated for the present frame, by an coefficient increasing along the subsequent slots of the current frame, and by adding the mixing rule used for the preceding frame in a version scaled by a decreasing coefficient along the subsequent slots of the current frame.

25. The audio synthesizer of claim 1, wherein the number of synthesis channels is greater than the number of original channels.

26. The audio synthesizer of claim 1, wherein the number of synthesis channels is smaller than the number of original channels.

27. The audio synthesizer of claim 1, wherein the at least one mixing rule comprises a first mixing matrix and a second mixing matrix, the audio synthesizer comprising:

a first path comprising-:

a first mixing matrix block configured for synthesizing a first component of the synthesis signal according to the first mixing matrix calculated from:

a covariance matrix of the synthesis signal, the covariance matrix being reconstructed from the channel level and correlation information; and a covariance matrix of the downmix signal, a second path for synthesizing a second component of the synthesis signal, the second component being a residual component, the second path comprising:

a prototype signal block configured for upmixing the downmix signal from the number of downmix channels to the number of synthesis channels;

a decorrelator configured for decorrelating the upmixed prototype signal;

a second mixing matrix block configured for synthesizing the second component of the synthesis signal according to a second mixing matrix from the decorrelated version of the downmix signal, the second mixing matrix being a residual mixing matrix, wherein the audio synthesizer is configured to estimate the second mixing matrix from:

a residual covariance matrix provided by the first mixing matrix block; and an estimate of the covariance matrix of the decorrelated prototype signals acquired from the covariance matrix of the downmix signal, wherein the audio synthesizer further comprises an adder block for summing the first component of the synthesis signal with the second component of the synthesis signal.

28. The audio synthesizer of claim 1, wherein the audio synthesizer is agnostic of the decoder.

29. The audio synthesizer of claim 1, configured to acquire a frequency domain, FD, version of the downmix signal, the FD version of the downmix signal being divided into bands or groups of bands, wherein the bands are aggregated with each other into groups of aggregated bands, wherein information on the groups of aggregated bands is provided in the side information of the bitstream, wherein the channel level and correlation information of the original signal is provided per each group of bands, so as to calculate the at least one mixing rule for different bands of the same aggregated group of bands.

30. The audio synthesizer of claim 1, wherein the channel level and correlation information of the original signal including channel level information of the original signal and correlation information of the original signal, wherein the channel level information of the original signal includes information on the level of each channel of the original signal, wherein the correlation information of the original signal includes information on correlation between at least one couple of the channels of the original signal, but not information on correlations between all the couples of the channels of the original signal.

31. The audio synthesizer of claim 1, further configured to read, from the channel level information, a logarithmic version of the level of each channel of the original signal, and to apply an exponentiation operation to obtain a normalized version of the level.

32. The audio synthesizer of claim 1, further configured to denormalize the normalized version of the level through a Pam,; value, which is a linear combination of the values of the covariance information of the downmix signal.

33. A non-transitory digital storage medium having a computer program stored thereon to perform the method for generating a synthesis signal from a downmix signal, the synthesis signal comprising at least three synthesis channels, the method comprising: calculating a prototype signal from the downmix signal by applying a prototype matrix to the downmix signal to obtain the prototype signal, the prototype signal comprising the number of synthesis channels;

receiving a downmix signal, the downmix signal comprising a plural number of downmix channels, and side information, the side information comprising channel level and correlation information of an original signal, the original signal comprising a plural number of original channels;

generating the synthesis signal by applying at least one mixing matrix to the prototype signal, the at least one mixing matrix being obtained from the channel level and correlation information of the original signal and covariance information of the downmix signal, the method further comprising:

reconstructing a target version of the covariance information of the original signal based on an estimated version of the original covariance information reported to the number of synthesis channels, wherein reconstructing includes:

acquiring the estimated version of the original covariance information from the covariance information of the downmix signal, wherein the estimated version of the original covariance information is acquired by applying, to the covariance information of the downmix signal, the prototype matrix, so as to report the estimated version of the original covariance information, normalizing first values of the estimated version of the original covariance information reported to the number of original channels;

retrieving further normalized values of the original covariance information from the channel level and correlation information of the original signal written in the side information;

retrieving further normalized values of the original covariance information from the channel level and correlation information of the original signal written in the side information, assigning the further normalized values of the original covariance information to channels of the synthesis channels, thereby reporting the further normalized values of the original covariance information to the number of original channels; and thereby retrieving the target version of the covariance information, to thereby derive the at least one mixing matrix using the target version of the covariance information, so that the generating step generates the synthesis signal using the prototype signal and the at least one mixing matrix, when said computer program is run by a computer.

34. A method for generating a synthesis signal from a downmix signal, the synthesis signal comprising at least three synthesis channels, the method comprising:

calculating a prototype signal from the downmix signal by applying a prototype matrix to the downmix signal to obtain the prototype signal, the prototype signal comprising the number of synthesis channels;

receiving a downmix signal, the downmix signal comprising a plural number of downmix channels, and side information, the side information comprising channel level and correlation information of an original signal, the original signal comprising a plural number of original channels;

generating the synthesis signal by applying at least one mixing matrix, as the at least one mixing rule, to the prototype signal, the mixing matrix being obtained from the channel level and correlation information of the original signal and covariance information of the downmix signal, the method further comprising:

reconstructing a target version of the covariance information of the original signal based on an estimated version of the original covariance information reported to the number of synthesis channels, wherein reconstructing includes:

acquiring the estimated version of the original covariance information from the covariance information of the downmix signal, wherein the estimated version of the original covariance information is acquired by applying, to the covariance information of the downmix signal, the prototype matrix, so as to report the estimated version of the original covariance information, normalizing first values of the estimated version of the original covariance information reported to the number of original channels;

retrieving further normalized values of the original covariance information from the channel level and correlation information of the original signal written in the side information, assigning the further normalized values of the original covariance information to channels of the synthesis channels, thereby reporting the further normalized values of the original covariance information to the number of original channels; and denormalizing the first normalized values and the further normalized values, to acquire a denormalized version of the original covariance information reported to the number of original channels, thereby retrieving the target version of the covariance information, to thereby derive the at least one mixing matrix using the target version of the covariance information, so that the generating step generates the synthesis signal using the prototype signal and the at least one mixing rule.

* * * * *